(12) United States Patent
Yang et al.

(10) Patent No.: US 7,885,325 B2
(45) Date of Patent: Feb. 8, 2011

(54) APPARATUS FOR AND METHOD OF CONTROLLING A FEEDFORWARD FILTER OF AN EQUALIZER

(75) Inventors: Xiaojun Yang, Port Barrington, IL (US); Richard W. Citta, Oak Park, IL (US); Scott M. Lopresto, Chicago, IL (US)

(73) Assignee: Trident Microsystems (Far East) Ltd., Grand Cayman (KY)

( * ) Notice: Subject to any disclaimer, the term of this patent is extended or adjusted under 35 U.S.C. 154(b) by 723 days.

(21) Appl. No.: 11/547,937

(22) PCT Filed: Apr. 8, 2005

(86) PCT No.: PCT/US2005/011912
§ 371 (c)(1),
(2), (4) Date: Jan. 16, 2007

(87) PCT Pub. No.: WO2005/101654
PCT Pub. Date: Oct. 27, 2005

(65) Prior Publication Data
US 2008/0260014 A1 Oct. 23, 2008

Related U.S. Application Data

(60) Provisional application No. 60/561,085, filed on Apr. 9, 2004, provisional application No. 60/601,026, filed on Aug. 12, 2004.

(51) Int. Cl.
*H03H 7/30* (2006.01)
(52) U.S. Cl. ...................................... 375/233; 708/323
(58) Field of Classification Search .................. 375/233, 375/232, 229, 231; 708/323
See application file for complete search history.

(56) References Cited

U.S. PATENT DOCUMENTS

| | | |
|---|---|---|
| 4,871,974 A | 10/1989 | Davis et al. |
| 4,926,499 A | 5/1990 | Kobayashi et al. |
| 5,233,634 A | 8/1993 | Vaisanen |
| 5,282,225 A | 1/1994 | Nikias et al. |
| 5,537,419 A | 7/1996 | Parr et al. |
| 5,550,596 A | 8/1996 | Strolle et al. |
| 5,642,382 A | 6/1997 | Juan |
| 5,675,612 A | 10/1997 | Solve et al. |
| 5,706,057 A | 1/1998 | Strolle et al. |
| 5,796,786 A | 8/1998 | Lee |
| 5,805,242 A | 9/1998 | Strolle et al. |

(Continued)

OTHER PUBLICATIONS

International Search Report and Written Opinion in PCT/US05/28907, both dated Jan. 30, 2006.

(Continued)

*Primary Examiner* — Temesghen Ghebretinsae
(74) *Attorney, Agent, or Firm* — DLA Piper LLP (US)

(57) ABSTRACT

A method of synchronizing a feedforward filter (46) that receives a signal resulting from the transmission of a series of symbols through a channel, wherein the series of symbols includes a predetermined sequence of symbols includes the step of developing a plurality of samples from the received symbols (60), wherein a sequence of samples corresponds to the predetermined sequence of symbols. The method further includes the steps of estimating a channel impulse response from the plurality of samples, calculating a characteristic of the channel impulse response, and synchronizing (54) the feedforward filter in accordance with the estimated channel impulse response.

24 Claims, 44 Drawing Sheets

U.S. PATENT DOCUMENTS

| | | | |
|---|---|---|---|
| 5,832,045 | A | 11/1998 | Barber |
| 5,835,532 | A | 11/1998 | Strolle et al. |
| 5,841,484 | A | 11/1998 | Hulyalkar et al. |
| 5,852,630 | A | 12/1998 | Langberg et al. |
| 5,894,334 | A | 4/1999 | Strolle et al. |
| 5,903,610 | A | 5/1999 | Sköld et al. |
| 5,940,450 | A | 8/1999 | Koslov et al. |
| 5,991,349 | A | 11/1999 | Chen |
| 6,133,965 | A | 10/2000 | Dobrovolny |
| 6,147,555 | A | 11/2000 | Posner et al. |
| 6,175,279 | B1 | 1/2001 | Ciccarelli et al. |
| 6,219,379 | B1 | 4/2001 | Ghosh |
| 6,259,743 | B1 | 7/2001 | Garth |
| 6,313,698 | B1 | 11/2001 | Zhang et al. |
| 6,313,885 | B1 | 11/2001 | Patel et al. |
| 6,314,148 | B1 | 11/2001 | Fulghum |
| 6,356,598 | B1 | 3/2002 | Wang |
| 6,411,659 | B1 | 6/2002 | Liu et al. |
| 6,421,379 | B1 | 7/2002 | Vannatta et al. |
| 6,434,205 | B1 | 8/2002 | Taura et al. |
| 6,438,164 | B2 | 8/2002 | Tan et al. |
| 6,522,243 | B1 | 2/2003 | Saulnier et al. |
| 6,650,699 | B1 | 11/2003 | Tierno |
| 6,671,314 | B1 | 12/2003 | Abe et al. |
| 6,671,342 | B2 | 12/2003 | Lin et al. |
| 6,734,920 | B2 | 5/2004 | Ghosh et al. |
| 6,771,719 | B1 | 8/2004 | Koyama et al. |
| 6,775,334 | B1 | 8/2004 | Liu et al. |
| 6,823,489 | B2 | 11/2004 | Wittig et al. |
| 6,842,495 | B1 | 1/2005 | Jaffe et al. |
| 7,313,182 | B2 * | 12/2007 | Fimoff et al. ............... 375/233 |
| 2002/0141483 | A1 | 10/2002 | Doetsch et al. |
| 2002/0150185 | A1 | 10/2002 | Meehan et al. |
| 2002/0172275 | A1 | 11/2002 | Birru |
| 2002/0186762 | A1 | 12/2002 | Xia et al. |
| 2003/0058962 | A1 | 3/2003 | Baldwin |
| 2003/0058967 | A1 | 3/2003 | Lin et al. |
| 2003/0161421 | A1 | 8/2003 | Schmidt et al. |
| 2003/0212947 | A1 | 11/2003 | Schenk et al. |
| 2003/0223517 | A1 | 12/2003 | Fimoff et al. |
| 2004/0077324 | A1 | 4/2004 | Wieck |
| 2004/0151236 | A1 | 8/2004 | Lilleberg et al. |

OTHER PUBLICATIONS

International Preliminary Report on Patentability in PCT/US05/28907 dated Feb. 22, 2007.

"ATSC Digital Television Standard", ATSC Doc. A/53, Sep. 16, 1995.

"An Advanced Digital Television Broadcasting System", Zhang et al., Supplement to Proceedings, $7^{th}$ Int. Symp. On Broad. Tech. Aug. 25, 2001, 13 pages.

"Results of the Laboratory Evaluation of an 8MHz ADTB-T Television System for Terrestrial Broadcasting", Communications Research Centre Canada, Jan. 15, 2003, 19 pages.

* cited by examiner

APPARATUS FOR AND METHOD OF CONTROLLING A FEEDFORWARD FILTER OF AN EQUALIZER

CROSS REFERENCE TO RELATED APPLICATIONS

This application claims the benefit of U.S. Provisional Application No. 60/561,085, filed Apr. 9, 2004, and entitled "Advanced Digital Receiver" and further claims the benefit of U.S. Provisional Application No. 60/601,026, filed Aug. 12, 2004, and entitled "Advanced Digital Receiver." The present application also incorporates by reference U.S. application Ser. No. 10/408,053, filed Apr. 4, 2003, and entitled "Carrier Recovery for DTV Receivers," U.S. application Ser. No. 09/875,720, filed Jun. 6, 2001, and entitled "Adaptive Equalizer Having a Variable Step Size Influenced by Output from a Trellis Decoder," (now U.S. Pat. No. 6,829,297), U.S. application Ser. No. 10/407,634, filed Apr. 4, 2003, and entitled "System and Method for Symbol Clock Recovery," U.S. application Ser. No. 09/884,256, filed Jun. 19, 2001, and entitled "Combined Trellis Decoder and Decision Feedback Equalizer," and U.S. application Ser. No. 10/407,610, filed Apr. 4, 2003, and entitled "Transposed Structure for a Decision Feedback Equalizer Combined with a Trellis Decoder."

REFERENCE REGARDING FEDERALLY SPONSORED RESEARCH OR DEVELOPMENT

Not applicable

SEQUENTIAL LISTING

Not applicable

BACKGROUND OF THE INVENTION

1. Field of the Invention

The present invention relates generally to digital communication techniques, and more particularly, to an apparatus for and method of synchronizing a feedforward filter of an equalizer.

2. Description of the Background of the Invention

Discrete data transmission is the transmission of messages from a transmitter to a receiver through a communication channel. A message sender or sending device, located at the transmitter, communicates with a message receiver by selecting a message and sending a corresponding signal or waveform that represents this message through the communication channel. The receiver determines the message sent by observing the channel output. Successive transmission of discrete data messages is known as digital communication. Channel noise often interferes with the transmission and degrades the transmitted message and leads to some uncertainty as to the content of the original message at the receiver. The receiver uses a procedure known as detection to decide which message, or sequence of messages, the sender transmitted. Optimum detection minimizes the probability of an erroneous receiver decision on which message was transmitted.

Messages are comprised of digital sequences of bits converted into electrical signals that are sent through the channel. These bits are typically encoded prior to modulation. Encoding is the process of converting the messages from an innate form, typically bits, into values that represent the messages. Modulation is a procedure for converting the values into analog signals for transmission through the channel. The channel distorts the transmitted signals both deterministically and with random noise. Those conditions that interfere with proper reception include additive white Gaussian noise (AWGN) and coherent noise, frequency dependent channel distortion, time dependent channel distortion, and fading multipath. Because of these effects, there is some probability that the sent message is corrupted when it reaches the receiver.

Upon reception, the receiver demodulates the incoming waveform. In general, demodulation attempts to recover the original transmitted signals as accurately as possible and converts the recovered signals to estimates of the values. There are several steps to this process, including downmixing the radio frequency (RF) and near-baseband intermediate frequency (IF) signals to the baseband representation, channel equalization, and decoding. Symbol and carrier recovery are undertaken so that the discrete time samples are at the correct symbol rate and the signal is moved exactly down to baseband. The receiver employs a detector to probabilistically determine the value estimates. It is important that the methods of demodulating and detecting the received signal as employed by the receiver consider both the possible transmitted values and potential for channel-induced errors. The value estimates are then decoded by converting the value estimates back into the innate form of the message.

Digital communications systems receive the transmitted information by periodically sampling the output of the demodulator once per symbol interval. This requires the receiver design to overcome the problems associated with system synchronization, as related to symbol-timing and carrier recovery, under non-ideal transmission channel conditions. The optimal times for the receiver to sample the received signal are generally unknown due to the propagation delay from the transmitter to the receiver and the influence of channel conditions such as multipath. The propagation delay in the transmitted signal also results in a carrier phase offset. For those transmission systems requiring a receiver to employ a phase-coherent detector, the receiver develops an estimate of the propagation delay and derives an estimate of the transmitted symbol timing and phase error directly from the received signal. The exception to this is the case where pilot or control signals are embedded in the transmitted signal. In such a case, the receiver uses the embedded pilot or control signal to synchronize the receiver to the transmitter. In either case, the receiver overcomes the system synchronization obstacles by performing three basic functions: carrier recovery, timing recovery, and channel equalization.

As noted above, the carrier recovery process includes a number of steps whereby the received radio frequency (RF) signal is demodulated. In part, the near-baseband signal is demodulated so as to recover the information-bearing baseband signal and to remove any residual carrier phase offset. This final step is often referred to as phase-locking.

The timing recovery process is used to recover the transmitter time base and synchronize the receiver and transmitter clocks. Once achieved, this synchronization permits the receiver to sample the received signal at optimum points in time and reduce slicing errors.

The channel equalization process attempts to compensate for the imperfections within the transmission channel, which change the amplitude and phase of the received signal as it traverses the channel. These imperfections are generally frequency dependent, time dependent, and dynamic. Because of this, it is advantageous to employ an adaptive equalizer filter system to remove the amplitude and phase distortions from the channel.

There are a number of phase-locked loop (PLL) techniques in existence. A limited list of example approaches that will be appreciated by those skilled in the art, are Costas loops, squaring loops, and, more generally, decision directed and non-decision directed loops.

Phase-locking mechanisms typically involve three common elements. They are phase error detection/generation, phase error processing, and local phase reconstruction. The phase error detection operation, as implemented by a phase detector, derives a phase difference measurement between the transmitted signal phase, as detected at the receiver, and a phase estimate of the incoming signal as developed by the receiver. The phase error measurement is the difference between the phase of the received and the actual transmitted signal.

The phase error processing operation, commonly embodied by an integrator or low-pass loop filter, extracts the essential phase difference trends by averaging, over a period of time or within a time window, the magnitude of the phase error. Properly designed, the phase error processing operation rejects random noise and other undesirable components of the phase error signal. In order to insure stability, the loop filter absorbs gain resident in the phase detector. There are analog, digital and hybrid analog-digital phase error detection methods utilized within phase-locked loops. These methods use components including, but not limited to, modulo-$2\pi$ phase detectors, binary phase detectors, phase-splitting filters, and maximum-likelihood carrier phase estimators. The local phase reconstruction operation is responsible for controlling the generation and phase of a local oscillator. The local oscillator is used to demodulate the near-baseband signal with a locally generated oscillator frequency having the same frequency and phase as the near-baseband signal. When locked, the resulting local oscillator signal has the same frequency and phase characteristics as the signal being demodulated to baseband. The local oscillator may be implemented using either analog or digital means. Various types of voltage controlled crystal oscillators and numerically controlled oscillators, VCXO's and NCO's, respectively, may be used to regenerate the local carrier.

In the case of an analog circuit, the local phase reconstruction operation is implemented using a voltage-controlled oscillator. The VCXO uses the processed phase error information to regenerate the local phase of the incoming signal by forcing the phase error to zero.

Any phase-locking mechanism has some finite delay in practice so that the mechanism attempts to predict the incoming phase and then measures the accuracy of that prediction in the form of a new phase error. The more quickly the phase-lock mechanism tracks deviations in phase, the more susceptible the mechanism is to random noise and other imperfections. This is all the more the case where the received signal exists in a strong multipath environment. Thus, an appropriate trade-off is made between these two competing effects when designing a synchronization system.

Timing recovery, or synchronization, is the process whereby a receiver synchronizes the local time base thereof to the transmitter symbol rate. This allows for precise sampling time instants during the symbol period so as to maximize the likelihood of correctly determining the value of the transmitted symbol. As previously described, the PLL subsystem is insufficient to recover the symbol rate. Instead, a separate symbol-timing recovery function is added in combination with the PLL to provide timing recovery. Improper symbol-timing recovery is one source of intersymbol interference (ISI) and significantly degrades the performance of the receiver.

As those skilled in the art will appreciate, proper sampling of the demodulator output is directly dependent upon proper timing recovery. There are a number of methods utilized by systems to perform local clock recovery. In a first system, various types of clocking signals are encoded into the bit stream. In a second system, no predefined synchronization symbols are transmitted and only data are sent and the locked local clock is derived from the received data stream. It should be noted that the latter system appears to be more prevalent due to the desire for bandwidth efficiency.

In addition, timing recovery methods are also distinguishable as to their use of the decision device output of the receiver. A non-decision aided methodology does not depend upon the output of the decision device. An example of such a methodology is the square-law timing recovery method. Also, envelope-timing recovery is an equivalent square-law timing recovery method utilized in a Quadrature Amplitude Modulation (QAM) receiver.

Decision directed (also known as decision-aided) timing recovery uses the decision device output. One example of a decision directed timing recovery method minimizes the mean-square error, over the sampling time phase, between the output of either a linear equalizer (LE) or a decision feedback equalizer (DFE) and the decision device output.

The decision device is responsible for assigning a symbol value to each sample obtained from the demodulator. There are both hard and soft decision devices. An example of a hard decision device is a decision slicer or a Viterbi decoder. In the case of decision directed timing recovery methods, care is taken to ensure that there is not excessive delay between the decision device output and the input sampling function. Excessive delay degrades the overall performance of the receiver or, in the worst-case, causes the phase-locked loop to become unstable. As will be appreciated by those skilled in the art, the quality of the symbol-timing estimates is dependent upon the overall signal-to-noise ratio (SNR) and is a function of the signal pulse shape and the channel characteristics.

There are numerous sources of channel distortion and interference that may result in poor receiver performance, as measured by either bit error rate (BER) or overall data transfer rates of a receiver design. Factors include noise, AWGN, inter-symbol interference (ISI) and multipath conditions.

Receivers also compensate for channels having significant multipath characteristics. There are various means of classifying or describing multipath phenomenon, depending upon the channel frequency response and time varying multipath effects. Four common categorizations, familiar to those skilled in the art, are slow changing frequency non-selective fading, fast changing frequency-non selective fading, slow changing frequency selective fading, and fast changing frequency selective fading.

Typically, multipath is the result of the transmitted signal arriving at the receiver via different transmission paths, each having a unique composite propagation time to the receiver. The multipath induced ISI results in the receiver contending with non-constant amplitude and non-linear phase response of the channel. The second effect is referred to as fading. Fading is due to the propagation delay associated with each propagation path resulting in constructive and destructive interference at the receiver. Fading causes degradation of SNR.

This simplistic description is further refuted into four categories, familiar to those skilled in the art, as summarized by the practical implications thereof. In practice, a channel exhibiting slowly changing, frequency non-selective fading means that all of the propagation paths are received within one symbol period and that the channel equally affects all the signal frequency components. This is considered the most easily compensated fading channel phenomenon. Fast changing, frequency non-selective fading arises where the channel varies during the symbol period. Fast fading is very difficult to compensate effectively.

A channel may be characterized as having slow, frequency-selective multipath when the channel distorts the received symbol in the frequency domain and not all the frequency components are equally affected. As a consequence, the baseband pulse shape is distorted and intersymbol interference results. Finally, fast changing, frequency-selective fading is considered the worst-case type of channel, and results when the received symbol is spread over many symbol periods and the channel characteristics also vary during the symbol period.

Fading is also roughly divided into large- and small-scale fading categories as shown in FIG. 1. Large motions of the receiver, such as occur in mobile applications, cause large-scale fading, whereas small-scale fading is due to motion of the receiver. Large-scale fading is also called log-normal fading, because the amplitude thereof has a log-normal probability density function. Small-scale fading is usually described as Rayleigh- or Ricean-fading, depending on which probability distribution function (pdf) best describes it. In addition, a Nakagami-m distribution has also been used to characterize some multipath channel conditions.

Many modern digital communications systems employ adaptive equalization to compensate for the effects of changing conditions and disturbances in the signal transmission channel. Equalization is used to remove the baseband intersymbol interference caused by transmission channel distortion and may be performed on baseband or passband signals. Equalization is often performed on the near-baseband signal prior to carrier recovery and the down mixing to produce a baseband signal. This is particularly the case in a decision directed carrier recovery process, as will be appreciated by those skilled in the art, which requires at least a partially open eye.

A representation of an 8-VSB, vestigial sideband, eye diagram is shown in FIG. 2. The eye diagram is the overlay of many traces of the received RF signal amplitude at the instant of sampling. The convergence of the many signal traces forms seven "eyes" that coincide with the occurrence of clock pulses in the receiver. At each sampling time, the demodulated RF amplitude assumes one of eight possible levels. If the 8-VSB signal is corrupted during transmission, these "eyes" will close up and disappear, as the RF signal will no longer possess the correct amplitude at the right instant.

An adaptive equalizer filter system is essentially an adaptive digital filter having a modifiable frequency and phase response that compensates for channel distortions. As will be appreciated by those skilled in the art, several architectures, methods and algorithms are available to implement this function. In one embodiment, a feed-forward equalizer (FFE) develops a partially equalized signal that is provided to a decision feedback equalizer (DFE). In typical systems of this type, the FFE is responsible for minimizing or eliminating ghosts resulting from precursor inter-symbol interference (ISI) while the DFE is responsible for minimizing or eliminating ghosts resulting from postcursor ISI. In another system, the FFE reduces or eliminates ghosts due to precursor and some postcursor ISI while the DFE reduces or eliminates ghosts resulting from postcursor ISI.

The impact on receiver performance of multipath induced ISI is reduced by the application of channel estimation and equalization. The effectiveness of the channel estimate has a direct relationship to elimination of ISI. An ideal channel estimate, in theory, would allow complete removal of the ISI. Obtaining an ideal channel estimate, however, is problematic when presented with particularly odious channel characteristics.

Another approach to improving performance in the presence of multipath interference is based on the diversity principle. The different propagation paths are used in combination to mitigate the multipath fading. This is possible because the propagation paths are usually not correlated, meaning it is unlikely that all of them fade simultaneously. The diversity concept models the channel fading mechanism as a channel burst error. Thus, providing temporally or frequency-based redundant copies of the transmitted information improves the likelihood of successful data transmission.

Diversity techniques include temporal diversity and frequency diversity. Frequency diversity requires that the same information be transmitted over a number of carriers where the spacing of successive carriers equals or exceeds the coherent bandwidth of the information channel. Temporal diversity employs the use of a number (L) of independently fading versions of the same information-bearing signal transmitted into L different time slots, where the separation between successive time slots equals or exceeds the coherence time of the channel. Thus, L copies of the transmitted information are presented to the receiver at varying times based on the transmission path.

One realization of this concept is a Rake Receiver. The Rake Receiver exploits the multipath phenomenon to improve system performance. Multiple baseband correlators are used to individually process multiple multipath components. The correlator outputs are then added to increase total signal strength.

The above characterizations are intended only as a partial, non-limiting list of example techniques that may be employed and are not intended in any way to represent any limitation upon the disclosed invention.

Despite the numerous techniques available in the present state of the art, receivers exhibit significant performance degradation in the presence of strong multipath environments. This is particularly true in the case of terrestrial digital broadcasting systems. In particular, the present state of the art receiver using an equalizer typically uses subtractive methods to remove interfering multipath signals. This has a distinct disadvantage in a changing multipath fading environment. In particular, these receiver systems attempt to identify and lock onto the single strongest received signal coming through a given transmission path or channel. This is accomplished at start up of the equalizer by establishing a tap of unity magnitude at a center point of the FFE. Upon reception, signals corresponding to other transmission paths are subtractively removed from the incoming total signal. This effectively removes all diversity from the receiving process (if diversity is used in the system). Also, the receiver can lose lock as the strength of the primary multipath signal fades or a new stronger signal appears. This introduces significant carrier phase offset at the receiver. Changing multipath conditions thus often necessitate a receiver to reacquire carrier lock, resulting in a possibly noticeable disruption in information flow to a user at the receiver.

SUMMARY OF THE INVENTION

According to one aspect of the present invention, a method of controlling a feedforward filter that receives a signal resulting from the transmission of a series of symbols through a channel, wherein the series of symbols includes a predetermined sequence of symbols, includes the step of developing a plurality of samples from the received symbols, wherein a sequence of samples corresponds to the predetermined sequence of symbols. The method further includes the steps of estimating a channel impulse response from the plurality of samples, calculating a characteristic of the channel impulse response, and synchronizing the feedforward filter in accordance with the estimated channel impulse response.

According to another aspect of the present invention, an apparatus for controlling a feedforward filter that receives a signal resulting from the transmission of a series of symbols through a channel, wherein the series of symbols includes a predetermined sequence of symbols, includes means for developing a plurality of samples from the received symbols, wherein a sequence of samples corresponds to the predetermined sequence of symbols. The apparatus further includes means for estimating a channel impulse response from the plurality of samples, means for calculating a characteristic of the channel impulse response, and means for synchronizing the feedforward filter in accordance with the estimated channel impulse response.

According to yet another aspect of the present invention, a computer-readable medium for controlling a feedforward filter that receives a signal resulting from the transmission of a series of symbols through a channel, wherein the series of symbols includes a predetermined sequence of symbols includes programming for implementing multiple routines. A first routine develops a plurality of samples from the received symbols, wherein a sequence of samples corresponds to the predetermined sequence of symbols, and a second routine estimates a channel impulse response from the plurality of samples. A third routine calculates a characteristic of the channel impulse response and a fourth routine synchronizes the feedforward filter in accordance with the estimated channel impulse response.

Other aspects and advantages of the present invention will become apparent upon consideration of the following detailed description.

DETAILED DESCRIPTION OF THE PREFERRED EMBODIMENTS

Figure 1:
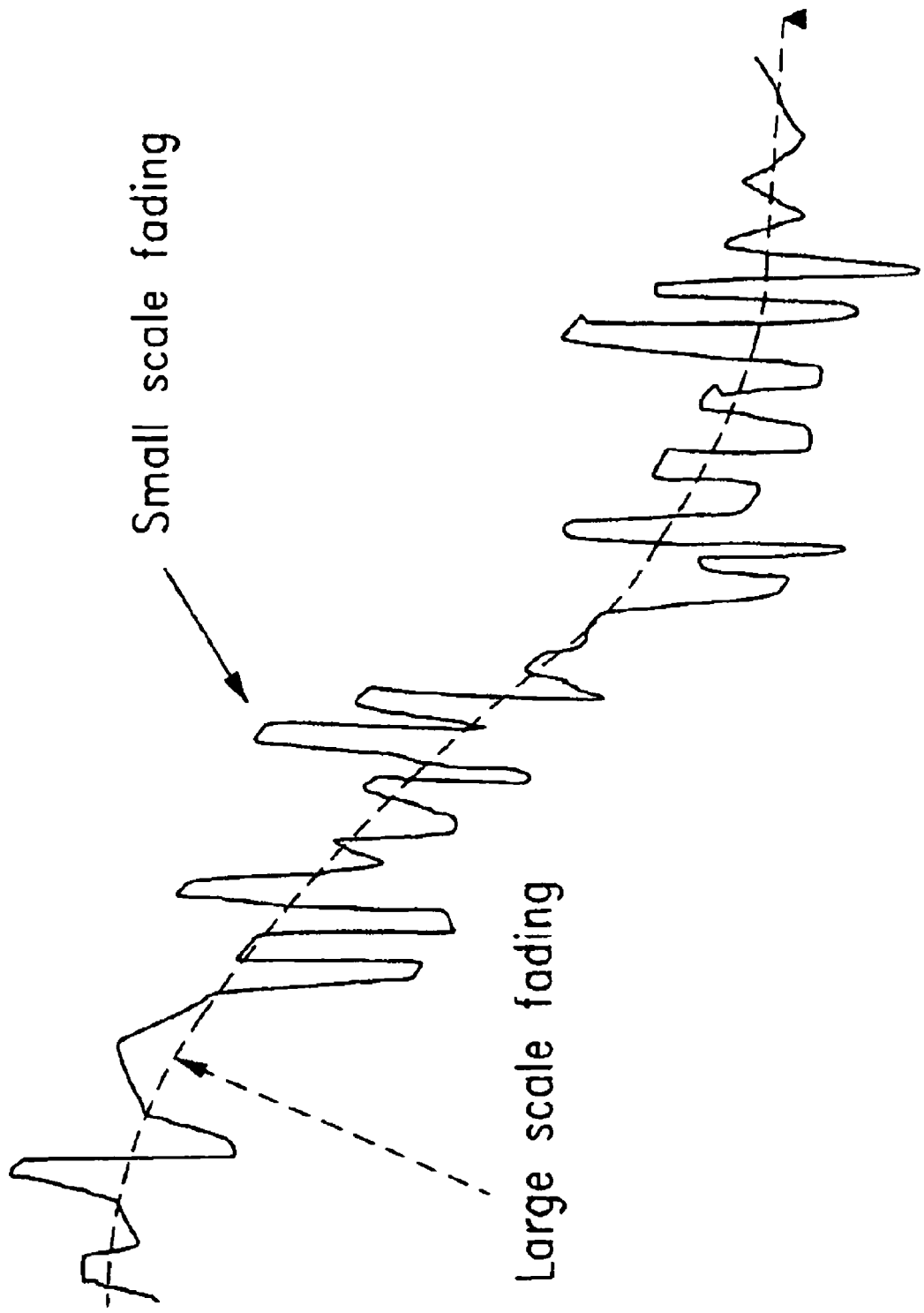
FIG. 1 is a graph showing the relationship between small- and large-scale fading over time.
Figure 2:
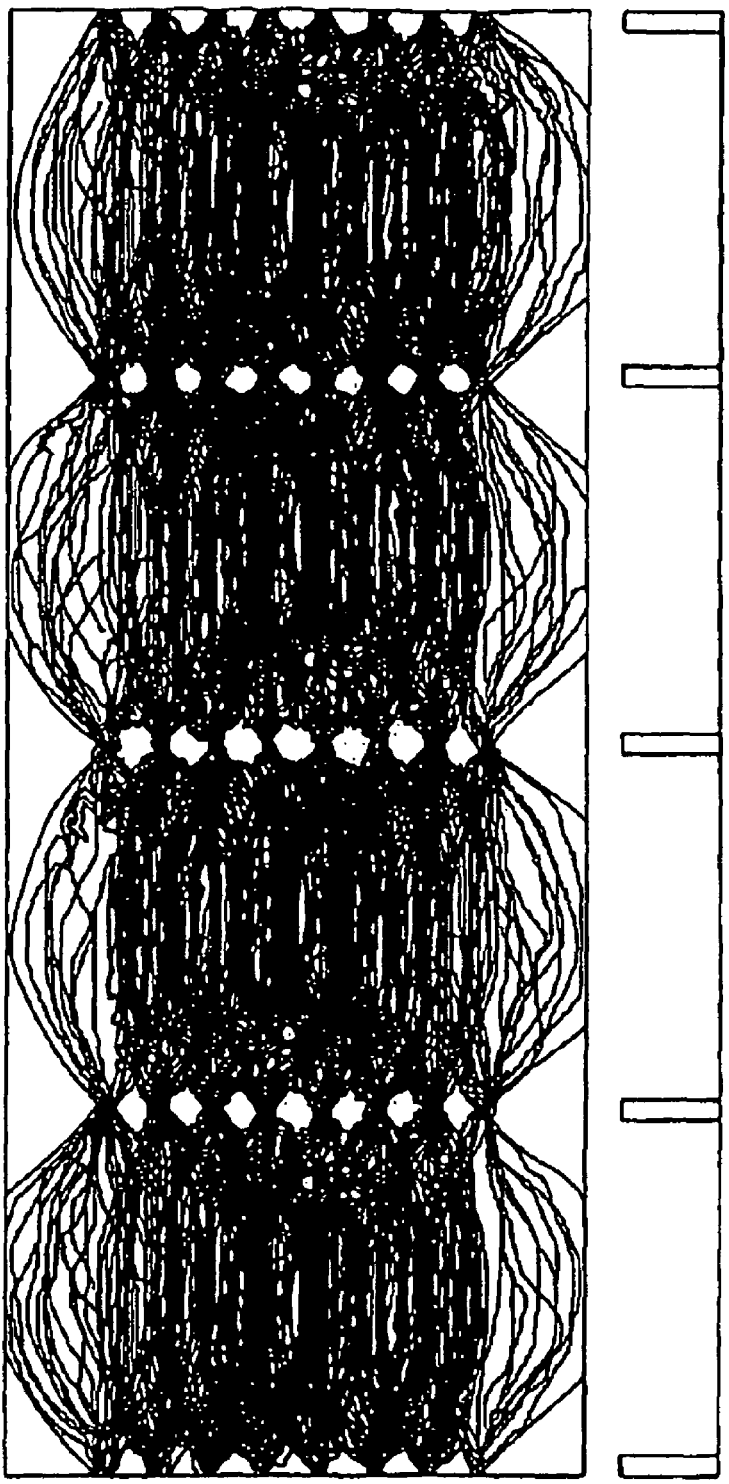
FIG. 2 is a graph showing an eight-VSB modulated open eye pattern.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations to and further modification of the described embodiments, and any further applications of the principles of the invention as described herein are contemplated as would normally occur to one skilled in the art to which the invention relates.

Figure 3:
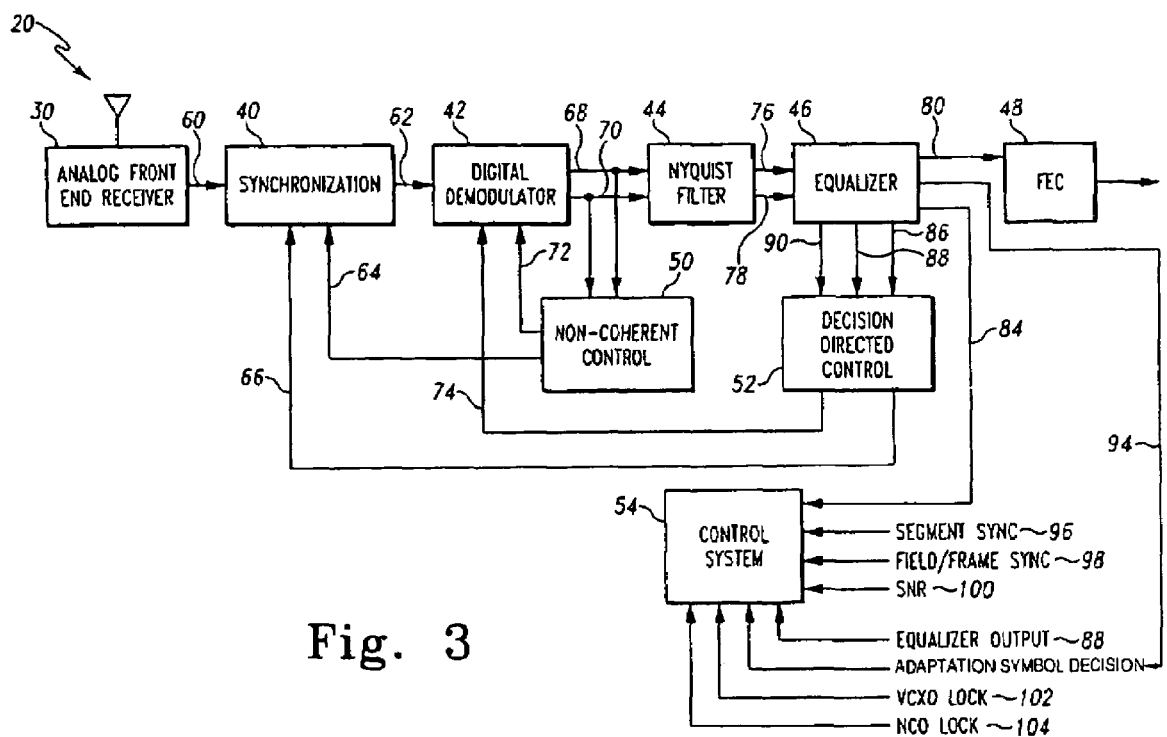
FIG. 3 is a schematic block diagram of an advanced digital receiver according to the present invention.
Figure 4:
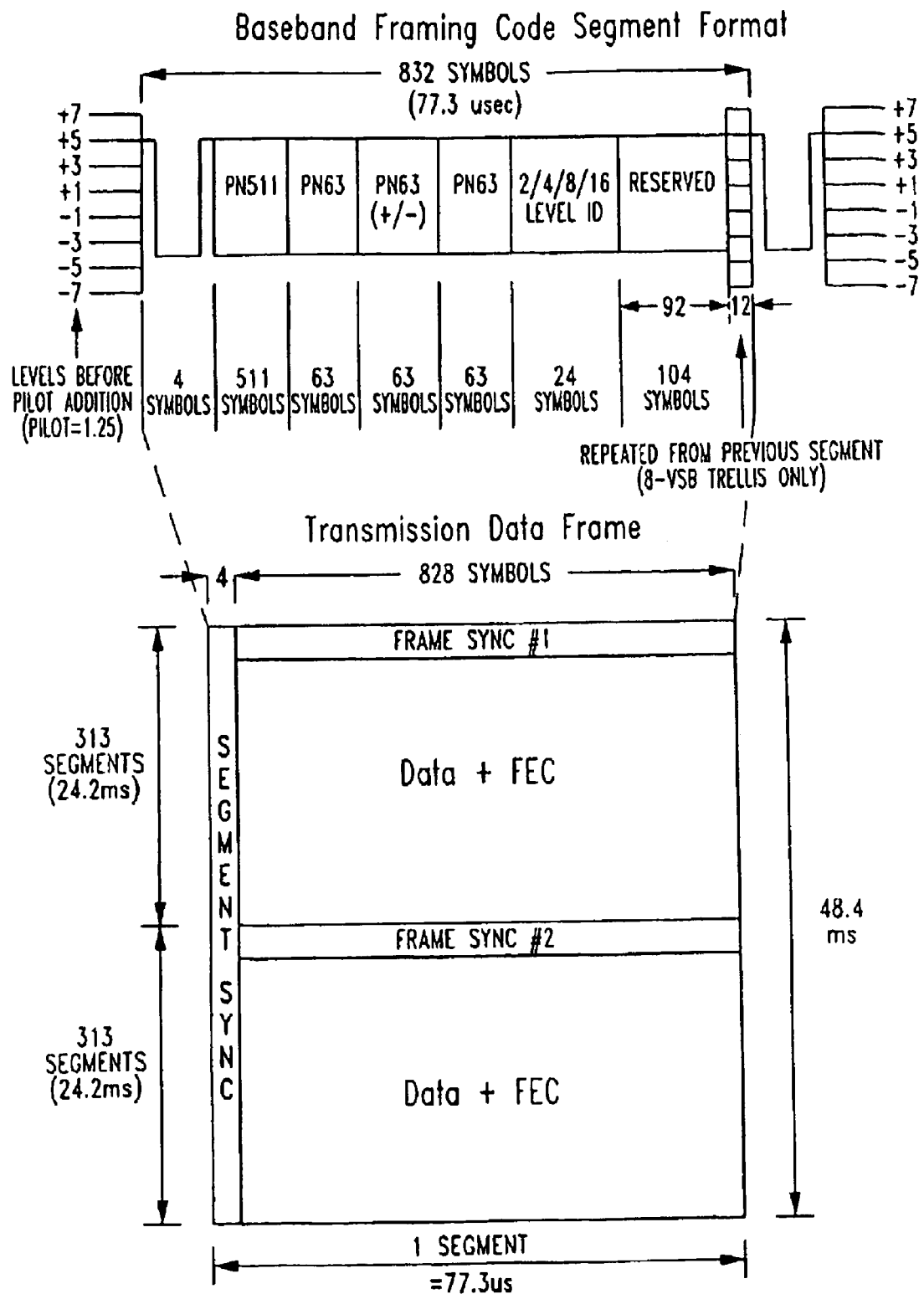
FIG. 4 is a diagram of the ATSC baseband framing code segment format showing the data segment and frame sync structure.

One aspect of the present system illustrated in FIG. 3 is a digital receiver system with significantly improved stability and performance when receiving modulated signals in severe multipath environments. The techniques, devices, and systems embodied in this new digital receiver may be adapted to various modulation formats, including, but not limited to, QAM, offset-QAM and VSB. Illustratively, one non-limiting example transmission standard of interest is the ATSC standard adopted for HDTV broadcast in the United States. The ATSC transmission standard utilizes a suppressed carrier 8-VSB signal having a pilot signal at the suppressed carrier frequency for use in achieving carrier lock in a VSB receiver. As shown in FIG. 4, the ATSC data transmission format comprises two fields per frame. Each field has 313 segments consisting of 832 multilevel symbols. Each segment has a four symbol segment sync character followed by a payload of 828 symbols. The first segment of each field contains a field sync segment while the remaining segments are used to transport data packets. The field sync is characterized by a predetermined 511 symbol pseudorandom number (PN) sequence and three predetermined 63-symbol long (PN) sequences. The middle 63-symbol long (PN) sequence is inverted in each successive field. A VSB mode control signal (defined in the VSB constellation size) follows the last 63 PN sequence, which is followed by 92 reserved symbols and 12 symbols copied from the previous field. It will be understood by those skilled in the art that the present invention is adaptable to other transmission standards without undue experimentation.

One embodiment of the present invention is system 20, shown in FIG. 3. System 20 receives and processes an ATSC broadcast signal and includes an analog front end receiver 30, synchronization 40, digital demodulator 42, Nyquist Root Filter (NRF) 44, equalizer 46, forward error correction (FEC) 48, non-coherent control (NCC) 50, decision directed control (DDC) 52 and control system 54. Further embodiments of system 20 also detect the presence of a segment sync, field/frame sync, and the signal-to-noise ratio, SNR, at various points in system 20. Illustratively, some embodiments of system 20 determine the SNR of the received data. Other embodiments determine the SNR of the received signal based on the received synchronization signals. Certain other embodiments quantify performance of the equalizer based upon the data error rate. Similarly, other elements of system 20 also use a data error rate to quantify the performance thereof. Still other embodiments, also use performance metrics developed by the trellis decoder in the equalizer as described in U.S. Pat. No. 6,829,297.

Some embodiments of system 20 also detect a frame or field sync signal in one of the outputs of equalizer 46. Other embodiments of system 20 determine whether the synchronization 40 or digital demodulator 42 is locked to the received signal.

The control system 54 connects (not shown) to the various elements of system 20 and generally directs the function of system 20. Illustratively, in some embodiments, control system 54 oversees system startup, operational mode selection, and adaptation of equalizer coefficients. As described later, control system 54 receives a channel delay estimate 84 (CDE), equalizer output 88, and adaptation symbol decision 94. Control system 54 also receives signals segment sync 96, field/frame sync 98, SNR 100, VCXO lock 102, and NCO lock 104. Segment sync 96 is a signal indicating that a valid segment sync was detected at a desired output of equalizer 46 or other elements of system 20. Field/frame sync 98 is a signal indicating that a valid field/frame sync was detected at a desired output of equalizer 46 or other elements of system 20. Similarly, SNR 100 is an estimated SNR of the received signal at a desired output of equalizer 46. VCXO lock 102 is a signal indicating that synchronization 40 has locked to the time base of the incoming signal. Finally, NCO lock 104 is a signal indicating the digital demodulator 42 is locked to the incoming carrier.

The input of analog front end receiver 30 connects to an antenna or other signal source receiving a broadcast signal. The analog front end receiver 30 tunes to a desired RF broadcast signal, provides automatic gain control (AGC) and signal amplification, and converts the received signal to an intermediate frequency (IF) to be used in the demodulation process. The analog front end receiver 30 may include RF tuning circuits, IF circuitry, and automatic gain control circuitry to optimize the received signal in the presence of noise. Analog front end receiver 30 also down-converts the received signal into a near-baseband signal. Illustratively, the received IF passband signal of a near-baseband carrier suppressed 8-VSB signal adopted in the ATSC standard may be roughly centered at 5.38 MHz.

In accordance with the present invention, synchronization 40 is part of the overall timing recovery function responsible for sampling the incoming signal and synchronizing system 20 to the time base of the incoming signal. Synchronization 40 receives an analog near-baseband signal 60 from analog front end receiver 30, and produces a digitized near-baseband signal 62. Synchronization 40 also receives decision directed synchronization feedback signal 66 from decision directed control 52, and a non-coherent synchronization feedback signal 64 from non-coherent control 54.

In some embodiments of the present invention, the synchronization 40 includes an A/D converter (not shown) sampling the incoming analog near-baseband signal 60 to produce a digital near-baseband signal 60 based on a sample clock produced by a feedback-controlled VCXO. Control system 54 controls synchronization 40 to select either decision directed synchronization feedback signal 66 or non-coherent synchronization feedback signal 64 to control the phase and frequency of the A/D sample clock. In other embodiments, synchronization 40 also receives a correlation directed control feedback signal (not shown). The selected feedback signal is filtered to produce a control signal that governs the VCXO output frequency and phase.

Illustratively, in certain embodiments control system 54 initially configures synchronization 40 to use non-coherent synchronization feedback signal 64 to govern the VCXO operation. The analog near-baseband signal 60 is sampled by synchronization 40 based on the feedback-controlled VCXO sample clock. After system 20 has at least partially converged, control system 54 selectively configures synchronization 40 to use decision directed synchronization feedback signal 66 to govern the VCXO operation. Illustratively, some embodiments of synchronization 40 adapted for an ATSC system include a VCXO driving A/D sampling at a rate of approximately 21.52 MHz, which is twice the symbol rate of the received signal in an ATSC system. After the VCXO has locked to the time base of the received signal, control system 54 receives a positive indication from VCXO Lock 102. It will be appreciated that there are numerous techniques available to those skilled in the art for determining whether a VCXO is locked to an incoming signal.

In other embodiments, the synchronization 40 re-samples the output of a fixed sampling rate A/D. Illustratively, an A/D samples the incoming signal 60 at a fixed rate. The sample rate converter re-samples the digitized near-baseband signal to develop a desired output sample rate that is synchronized to the incoming symbol rate. Similar to that discussed above, control system 54 selectively controls the re-sampling process using either non-coherent synchronization feedback signal 64 or decision directed synchronization feedback signal 66 based on the operational state of system 20.

Digital demodulator 42 is part of the overall carrier tracking and recovery function of system 20 and demodulates the near-baseband output of synchronization 40 to baseband. As shown in FIG. 3, the digital demodulator 42 receives the digitized near-baseband signal 62 from synchronization 40, a decision directed carrier tracking feedback signal 74 from decision directed control 52, and non-coherent carrier tracking feedback signal 72 from non-coherent control 50. Although not shown, other embodiments of digital demodulator 42 also receive a correlation directed control feedback signal. According to one embodiment, the digital demodulator 42 digitally down modulates the near-baseband signal 62 to a two times over-sampled complex baseband output having an in-phase component signal 68 and quadrature component signal 70. Prior to filtering steps, discussed later, the in-phase component signal 68 and quadrature component signal 70 have both negative and positive frequency components. The output of digital demodulator 42 is lowpass-filtered by Nyquist Root Filter 44 to remove out-of-band signals.

As explained later, control system 54 selectively controls the feedback signal governing the operation of digital demodulator 42. During initial system startup, digital demodulator 42 operation is governed by a non-coherent carrier tracking feedback signal from NCC 50. The NCC 50 tracks the received carrier frequency and governs the down mix frequency produced by a NCO portion of the digital demodulator. After system 20 is at least partially converged, control system 54 configures digital demodulator 42 to utilize the decision directed controlled feedback loop signal to provide improved carrier tracking and governs the down conversion process. At some desired point of digital demodulation operation, NCO Lock 104 indicates to control system 54 that the NCO is locked to the carrier of the received signal.

In some embodiments of the present invention, only the in-phase component signal 68 is used by the equalizer 46 to reduce the complexity of the system. Alternatively, other embodiments of the present invention utilize the oversampled baseband signal in conjunction with a fractionally spaced FFE incorporated into equalizer 46 of system 20.

Demodulator 42 provides in-phase component signal 68 and quadrature component signal 70 as inputs to both NRF 44 and NCC 50. NRF 44 filters out the high frequency components from the demodulated signal to produce a filtered in-phase baseband signal $(I_F)$ 76 and filtered quadrature baseband signal $(Q_F)$ 78 as inputs to equalizer 46. In some embodiments, NRF 44 is a low-pass filter with a 5.38 MHz double-sided bandwidth and 11% rolloff.

As described in inventor's co-pending applications, U.S. application Ser. No. 10/408,053 entitled "Carrier Recovery for DTV Receivers" and U.S. application Ser. No. 10/407,634 entitled "System and Method for Symbol Clock Recovery" herein incorporated, NCC 50 utilizes the pilot signal and redundant information on the upper and lower Nyquist slopes to develop a non-coherent carrier tracking feedback signal and a non-coherent symbol timing synchronization signal. As mentioned earlier, NCC 50 provides the non-coherent carrier tracking feedback signal 72 as an input to the digital demodulator 42 and the non-coherent synchronization feedback signal 64 as an input to synchronization 40.

As illustrated in FIG. 3, equalizer 46 receives the baseband component signal $I_F$ 76 and $Q_F$ 78 from the NRF 44. In some embodiments, equalizer 46 utilizes $I_F$ 76 and $Q_F$ 78. In other embodiments, equalizer 46 only utilizes $I_F$ 76, also referred to as the real component of the demodulated signal.

Some embodiments of equalizer 46 establish and update coefficients using feed forward techniques, while others use feedback techniques such as LMS fitting. Certain embodiments estimate the channel delay as part of this process. Equalizer 46 provides control system 54 with the CDE 84. Control system 54 then directs the equalizer coefficient adaptation process through an LMS algorithm to develop a virtual channel response that creates a stable received signal by advantageously combining a multiplicity of received ghost signals.

In other embodiments, equalizer 46 includes a trellis decoder integrated into the equalizer structure. In some embodiments the output of the trellis decoder is used to update the data samples in the equalizer DFE or direct the equalizer coefficient adaptation process on an ongoing basis. In other embodiments, intermediate trellis decoder stage outputs are used to direct the equalizer. Still other embodiments, as shown in U.S. patent application Ser. No. 10/407,610, entitled "Transposed Structure for Decision Feedback Equalizer Combined with Trellis Decoder", include a combined DFE-trellis decoder structure. In yet further embodiments, as shown in U.S. patent application Ser. No. 09/884,256, outputs from intermediate stages of a trellis encoder are coupled via a mapper to inputs of certain stages of the DFE.

As described herein, equalizer 46 includes techniques for estimating the channel delay of the transmission channel through which the information-bearing signal is transmitted. Equalizer 46 provides control system 54 with the CDE 84, which is used in conjunction with other equalizer adaptation techniques to evolve the tap coefficients of equalizer 46. Control system 54 uses the CDE 84 to align the equalizer relative to the channel. The CDE 84 is developed from an estimate of the channel impulse response (CIR). Some embodiments estimate the CIR by correlating sync signal arrivals. Certain embodiments use the field/frame sync signal. Other embodiments use a segment sync signal. Still other embodiments utilize both segment sync and frame sync to train the coefficients of equalizer 46. In addition, other embodiments estimate the CIR by correlating other signals within the received signal.

Some embodiments of equalizer 46 have no center tap or reference tap. This advantageously allows the equalizer to remain stable even when a multipath ghost significantly diminishes the main received signal. Other embodiments include an overlapped equalizer with a virtual center output. In an overlapped equalizer, some samples contained in the FFE and DFE portions of equalizer 46 are temporally related. The overlapped equalizer structure permits the virtual center to be strategically placed within the equalizer to minimize the effect of noise and improve overall performance. In addition, some embodiments of equalizer 46 also include a decision directed phase tracker to remove any residual phase noise not eliminated by the digital demodulator 42. Certain of these embodiments also include techniques for linking the operation of the decision directed carrier tracking feedback signal 74 to the operation of the decision directed phase tracker.

As illustrated in FIG. 3, in some embodiments of system 20, equalizer 46 provides to decision directed control 52 a synchronization symbol decision 86 and a corresponding equalized data signal 88. As described herein, the equalized data signal 88 is the data signal provided to the decision device (not shown) of the equalizer. The synchronization symbol decision 86 is the value produced by a decision device within the equalizer. In some embodiments, the synchronization symbol decision 86 is the output of a decision slicer. In other embodiments the synchronization symbol decision 86 is the output from a selected stage of a trellis decoder. In certain embodiments of the present invention equalizer 46 provides to decision directed control 52 an intermediate equalized signal 90 corresponding to the synchronization symbol decision 86. As described later, in some embodiments intermediate equalized signal 90 comes from the output of an FFE. In other embodiments, intermediate equalized signal 90 is the phase-corrected FFE output.

In some embodiments, adaptation symbol decision 94 is a known training signal, such as a generated synchronization signal. In other embodiments adaptation symbol decision 94 is the output of a decision slicer of equalizer 46. In certain embodiments, adaptation symbol decision 94 is the output of a trellis decoder of equalizer 46 or an intermediate state or other stage of the trellis decoder. In still other embodiments, adaptation symbol decision 94 depends upon the operational state of system 20 or equalizer 46.

Decision directed control 52 generates decision directed carrier tracking feedback signal 74 and decision directed synchronization feedback signal 66. The decision directed carrier tracking feedback signal 74 is a decision weighted carrier tracking error estimate for a particular received symbol. Similarly, the decision directed synchronization feedback signal 66 represents a decision weighted timing error estimate for a received symbol.

The input of FEC 48 receives the FEC symbol decision 80 of equalizer 46. The FEC performs a number of post signal processing steps to correct for errors contained in the received data. Illustratively, the FEC 48 performs frame synchronization, data de-interleaving, and Reed-Solomon forward error correction.

Figure 5:
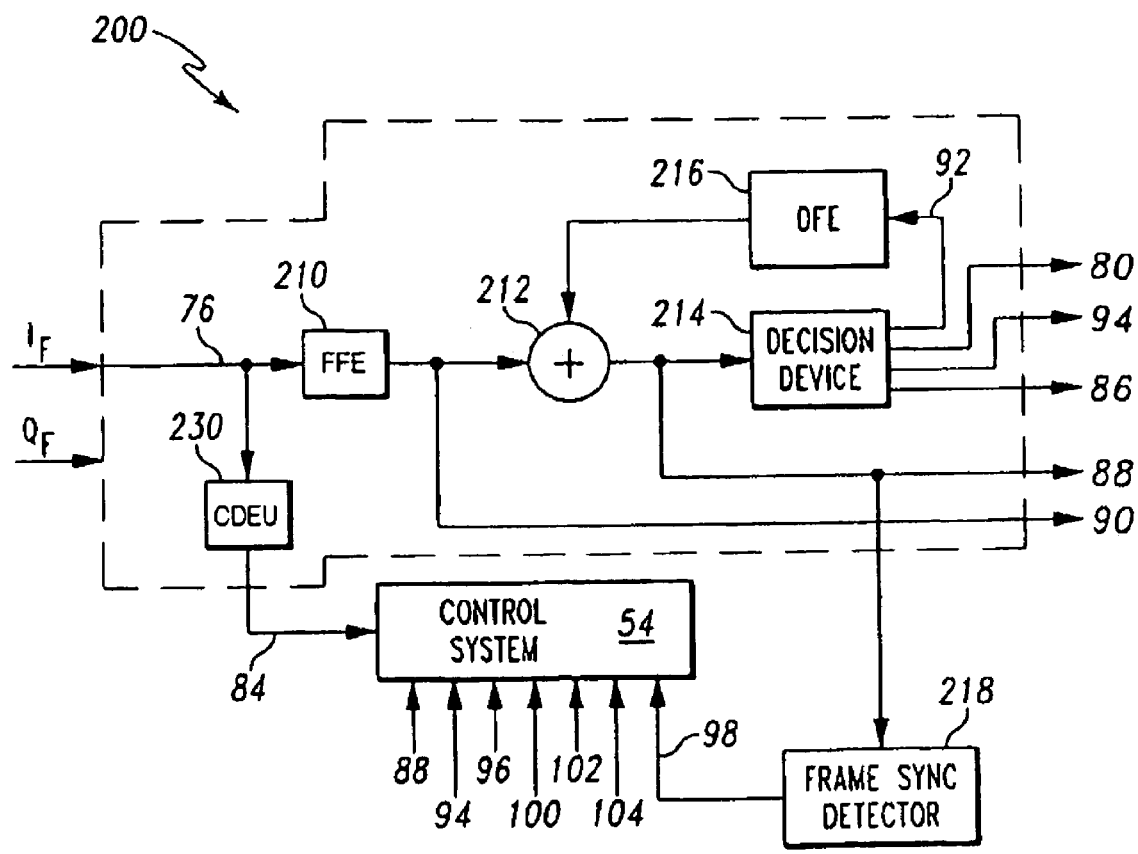
FIG. 5 is a schematic of one embodiment of an equalizer for use in the advanced digital receiver of FIG. 3.

One embodiment of equalizer 46, illustrated as equalizer 200 in FIG. 5, receives as inputs filtered in-phase baseband signal ($I_F$) 76 and filtered quadrature baseband signal ($Q_F$) 78, and provides as outputs FEC symbol decision 80, synchronization symbol decision 86, equalized data signal 88, intermediate equalized signal 90, and adaptation symbol decision 94. As explained herein, some embodiments of equalizer 200 do not process $Q_F$.

Equalizer 200 further includes a feedforward equalizer (FFE) 210, adder 212, decision device 214, DFE 216, and control system 54. As illustrated in FIG. 5, in some embodiments of equalizer 200, FFE 210 receives as an input the filtered in-phase baseband signal 76. Although not shown in FIG. 5 for the sake of clarity, some embodiments of FFE 210 also receive $Q_F$. The output of FFE 210 provides intermediate equalized signal 90 to the first input of adder 212. The output of DFE 216 provides the second input of adder 212. The output of adder 212 is equalized signal 88, which serves as the input to decision device 214. Although not shown, control system 54 connects to the various elements of equalizer 200, governs the operation of equalizer 200, and adapts the coefficients of FFE 210 and DFE 216. The FFE is one of a class of filters known in the art that includes feedforward filters (FFF's) and finite impulse response (FIR) filters and it would be apparent to one of ordinary skill in the art to use an FFF or a FIR filter as an appropriate substitute for the FFE as used herein.

As illustrated in FIG. 5, decision device 214 provides a variety of outputs including FEC symbol decision 80, synchronization symbol decision 86, equalizer feedback symbol output 92, and adaptation symbol decision 94. Equalizer feedback symbol output 92 is the decision device output provided to DFE 216. FEC symbol decision 80 is the final output of equalizer 200 provided to FEC 48, while synchronization symbol decision 86 is provided to decision directed control 52 (see FIG. 3). In some embodiments, synchronization symbol decision 86 is the output of a decision slicer circuit. In other embodiments, synchronization symbol decision 86 is obtained from the output or a selected stage of a trellis or Viterbi decoder. In still other embodiments, synchronization symbol decision 86 is selectively obtained from either a decision slicer circuit or the output or state of a trellis decoder depending upon the operational state of equalizer 200. In the embodiment described herein, synchronization symbol decision 86 may provide different outputs to the carrier tracking and synchronization feedback loops, respectively.

In some embodiments, equalizer feedback symbol output 92 is obtained from the output of a decision slicer circuit. In other embodiments, equalizer feedback symbol output 92 is obtained from the output or a selected stage of a trellis or Viterbi decoder. In yet other embodiments, equalizer feedback symbol output 92 updates the values in DFE 216 as they are corrected. Alternatively, control system 54 selectively chooses the data source for equalizer feedback symbol output 92 depending upon the system operational state.

Control system 54 adapts the coefficients of equalizer 200 using adaptation symbol decision 94. Similar to synchronization symbol decision 86, in some embodiments, adaptation symbol decision 94 is the output of a decision slicer circuit. In other embodiments, adaptation symbol decision 94 is obtained from the output or a selected stage of a trellis decoder. In yet other embodiments, adaptation symbol decision 94 is a training symbol. In still other embodiments, adaptation symbol decision 94 is selectively obtained from the decision device decision slicer circuit, an intermediate trellis decoder stage, or trellis decoder output depending upon the operational state of equalizer 200.

In certain embodiments, FEC symbol decision 80, synchronization symbol decision 86, equalizer feedback symbol output 92, and adaptation symbol decision 94 are the same signal from the decision slicer output of decision device 214.

In certain other embodiments FEC symbol decision 80, synchronization symbol decision 86, equalizer feedback symbol output 92, and adaptation symbol decision 94 are functionally different and are obtained from different stages of decision device 216 as described above.

As a non-limiting example, in some embodiments of the present invention decision device 214 is a trellis decoder and selectively controls the source of the respective outputs. Illustratively, synchronization symbol decision 86 may be selectively obtained from a desired portion of a trellis decoder. In a first instance, control system 54 selectively controls synchronization symbol decision 86 to be a decision slicer output of decision device 216. In a second instance, control system 54 selectively controls synchronization symbol decision 86 to be a partially or fully error-corrected symbol from the trellis decoder of decision device 216.

As shown in FIG. 5, DFE 216 receives as an input equalizer feedback symbol output 92. In certain embodiments, for example when decision device 214 includes a trellis decoder, the feedback symbol output 92 is selectively controlled. Illustratively, in certain embodiments of the present invention equalizer feedback symbol output 92 may be the output of a decision slicer portion of a trellis decoder. As the equalizer coefficients are adapted to remove a portion of the transmission channel distortion, the control system 54 may selectively update the values in DFE 216 from the corrected symbols of the trellis decoder. In certain other embodiments, as described in inventor's co-pending U.S. application Ser. No. 10/407,610 entitled "Transposed Structure for a Decision Feedback Equalizer Combined with a Trellis Decoder," decision device 214 provides an error-corrected symbol output to DFE 216 from one of the trace memories of the trellis decoder. In still other embodiments, as described in inventor's co-pending U.S. application Ser. No. 09/884,256, entitled "Combined Trellis Decoder and Decision Feedback Equalizer," the outputs of stages of the trellis decoder are used to develop inputs to at least a portion of the stages of the DFE.

In the system shown in FIG. 5, control system 54 is connected to FFE 210, decision device 214, DFE 216 and CDEU 230, though for clarity not all of the connections are shown. In addition, control system 54 receives CDE 84, equalized data signal 88, adaptation symbol decision 94, segment sync signal 96 from a segment sync detector (not shown), field/frame sync signal 98 from a field/frame sync detector 218, and SNR signal 100.

Among other things, control system 54 initializes and controls various stages and portions of equalizer 200, clock generation, and initialization and operation of system 20. As described later, control system 54 also develops or adapts filter coefficients of equalizer 200 to eliminate the effect of pre-ghost and post-ghost signals.

Equalizer 200 further includes CDEU 230, which includes techniques for estimating the CIR of a transmission channel that is subsequently used to estimate the channel delay of the transmission channel. In some embodiments, CDEU 230 receives as inputs filtered in-phase baseband signal, $I_F$, 76 and filtered quadrature baseband signal, $Q_F$, 78 and provides the CDE 84 developed from the estimate of the CIR as an output to control system 54. In certain other embodiments CDEU 230 does not utilize the filtered quadrature baseband signal 78. In still other embodiments, FFE 210 receives both $I_F$ and $Q_F$. As can be appreciated by those skilled in the art, the representation of equalizer 200 operating on $I_F$ is for the sake of simplicity of explanation and not a limitation.

As described later, CDEU 230 provides the CDE 84 representing the composite delay at the input of FFE 210 to control system 54. As described below, the composite delay reflects the delay associated with the ghost signals present in the channel. Based on the CDE 84, control system 54 determines the desired temporal location of the segment sync and frame sync signals at the output of equalizer 200 using any of the techniques described herein. Control system 54 adapts the coefficients of FFE 210 and DFE 216 based on the difference between equalized data signal 88 and adaptation symbol decision 94. Some embodiments include an optional segment sync signal 96 and a field/frame sync signal 98 that provides an indication to control system 54 that a field/frame sync signal 98 was detected (by field/frame sync detector 218). Finally, SNR signal 100 provides an indication to control system 54 of the relative signal-to-noise ratio and/or data error rate of the equalized signal at the output of equalizer 46.

Figure 6:
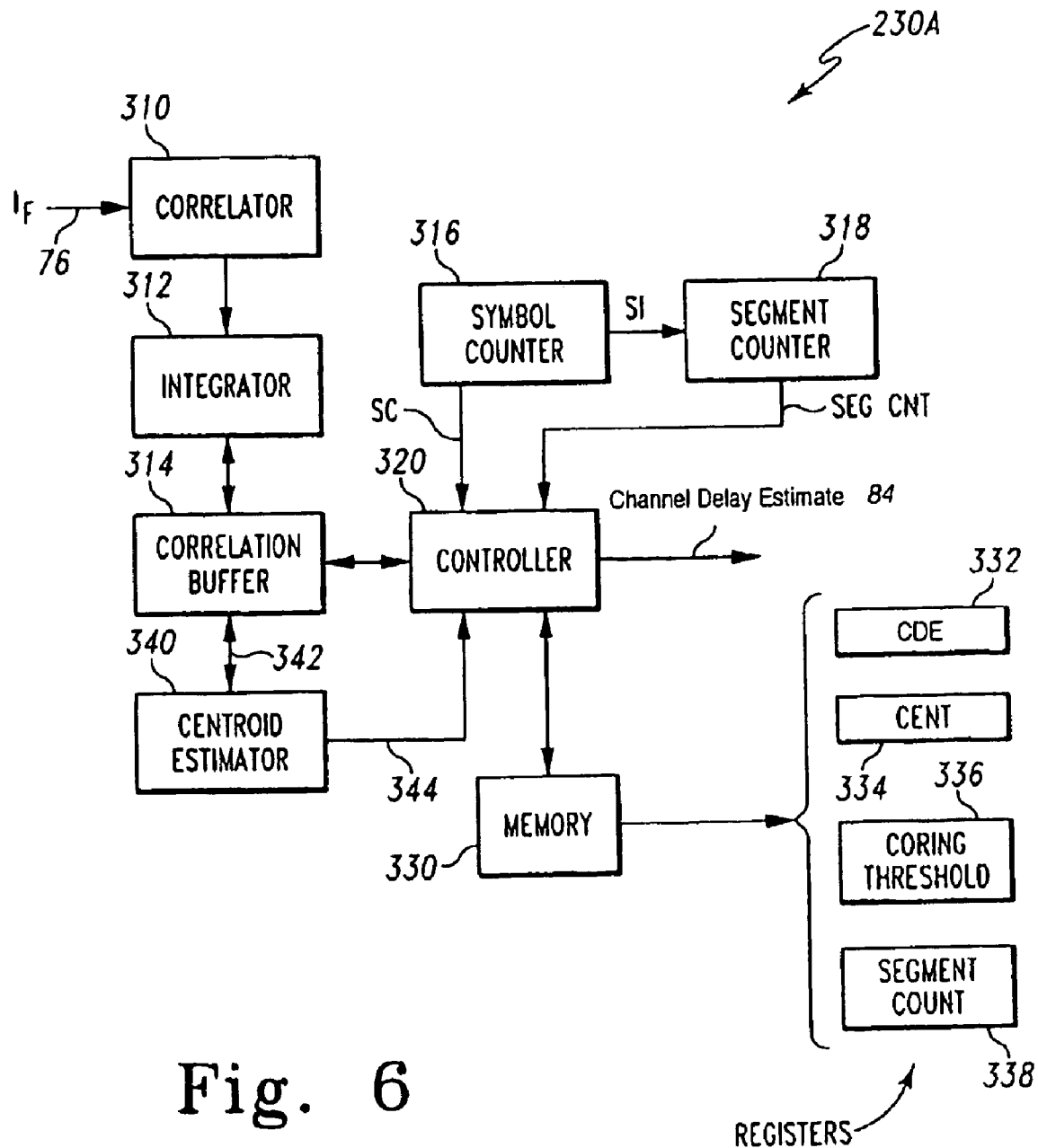
FIG. 6 is a block diagram of one embodiment of a segment sync based channel delay estimation unit (CDEU)

One embodiment of CDEU 230 is shown in FIG. 6. as CDEU 230A, which estimates the channel delay of the channel by detecting the correlation strength and relative delay of segment sync sequences of the various ghost signals received at the input of FFE 210 within a segment period. As described in greater detail below, CDEU 230A correlates the received signal for a given symbol time in a segment period with the known segment sync sequence. The correlation strengths represent an estimate of the CIR of the transmission channel. The correlation strengths for each symbol time are then temporally filtered over a sequence of segment periods. As will be described in relation to FIG. 7, CDEU 230A then develops the CDE 84 by calculating the centroid of the temporally filtered correlation strengths within a data segment period relative to the local time base. Although specific embodiments of CDEU 230 are described with specific hardware and software partitions, this is by way of example and not limitation. It can be appreciated that other partitioning and configuration are contemplated as would normally occur to those skilled in the art.

Figure 7:
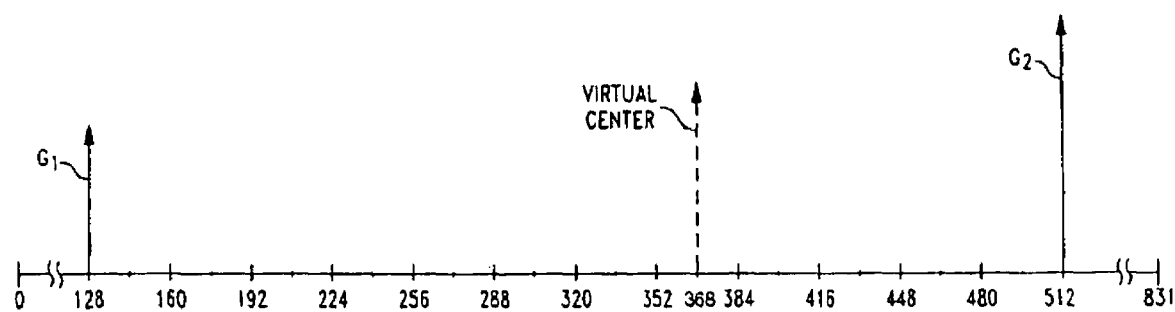
FIG. 7 is a diagram showing the relative position of a virtual center relative to ghosts detected in a transmission channel.

As a first non-limiting example, illustrated in FIG. 7, system 20 receives an ATSC signal transmitted through a channel. The received signal includes a first ghost $G_1$ and a second ghost $G_2$. The relative delay between the arrival of $G_1$ and $G_2$ is the estimated delay in arrival of the segment sync sequence of each ghost at the receiver within a segment period. The strength or magnitude of each ghost is estimated from the correlation strength of the segment sync sequence arriving at a particular symbol time slot in a segment period. Illustratively, $G_1$ and $G_2$ are located at symbol times 128 and 512, respectively, within an 832 symbol clock segment period. As shown, the correlation of a segment sync sequence of $G_1$ is 60% of the magnitude of the correlation of a segment sync sequence associated with $G_2$. Applying a weighted average or centroid calculation, the CDE of the channel is estimated to correspond to symbol time 368.

Figure 8:
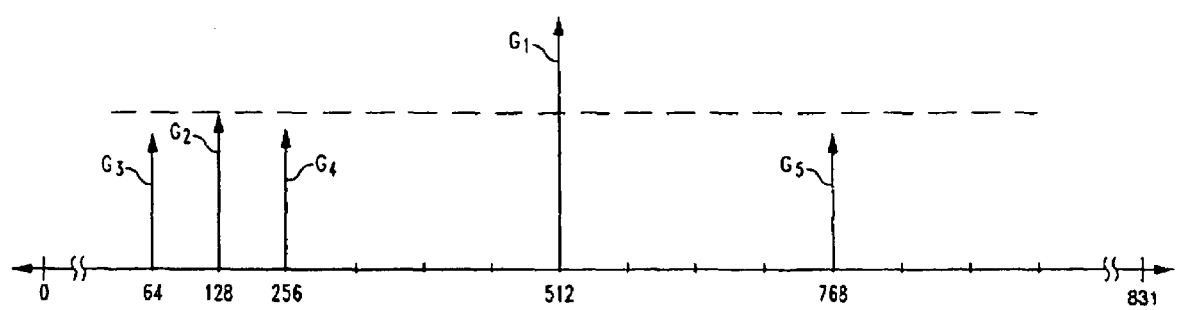
FIG. 8 is a diagram showing the relative positions of ghosts detected in a transmission channel.

In a further example illustrated in FIG. 8, the channel of FIG. 7 also includes ghost signals $G_3$, $G_4$ and $G_5$ at data segment symbol times 64, 256 and 768, respectively. In some embodiments of the present invention, $G_3$, $G_4$ and $G_5$ are also considered when calculating the CDE. In other embodiments, a threshold function is applied that filters out consideration of such smaller-magnitude ghost signals.

Returning to FIG. 6, the CDEU 230A is adapted for operating in the presence of ghost signals in the transmission channel of a terrestrial ATSC broadcast system. CDEU 230A includes correlator 310, integrator 312, correlation buffer 314, symbol counter 316, segment counter 318, controller 320, memory 330, and centroid estimator 340. CDEU 230A receives filtered in-phase baseband signal $I_F$ 76 as an input to correlator 310. Integrator 312 receives the output of correlator 310 and provides an output thereof to correlation buffer 314.

Similarly, centroid estimator 340 receives the output of correlation buffer 314 through interface 342. In the illustrated embodiment, interface 342 is unidirectional, and centroid estimator 340 only reads the contents of correlation buffer 314. In other embodiments, interface 342 is bi-directional, and centroid estimator 340 both reads and writes the contents of correlation buffer 314.

In some embodiments, symbol counter 316 is a modulo counter that receives input from a symbol clock (not shown) and develops a symbol count output (SC) corresponding to the number of symbols received during a data segment period. The symbol clock provides a clock edge every symbol time. Illustratively, an ATSC system segment period consists of 832 symbol times. Thus, one embodiment of a symbol counter adapted to an ATSC system is a modulo 832 counter with output values from 0 to 831. The symbol count output is incremented each symbol time; however, it is not necessarily aligned with the segment sync. In addition, some embodiments of symbol counter 316 include a segment indicator output (SI) that is asserted every 832 symbol times. The segment indicator output is timed relative to the first symbol counted by symbol counter 316.

One embodiment of segment counter 318 receives the segment indicator output SI of symbol counter 316. Segment counter 318 counts the number of segment indications produced by the symbol counter and provides a segment count, SEGCNT, corresponding to the number of received segment indications within a frame time. In still other embodiments, segment counter 318 is a modulo 313 counter corresponding to the 313 segments per data field in an ATSC transmission. In an alternative embodiment, segment counter 318 receives an input from a symbol clock and increments every 832 symbol times.

Controller 320 includes a first control interface operably connected to control system 54 for communications with other elements of equalizer 200 (see FIG. 5), and further may include a second control interface for communications with other elements of CDEU 230A, including correlator 310, integrator 312, correlation buffer 314, symbol counter 316, segment counter 318, memory 330 and centroid estimator 340. The second control interface resets the memory and buffer to zero and controls the various elements of CDEU 230A including, but not limited to, reading and writing configuration registers, controlling the reset signal, controlling access to memory and register locations, buffer management of the various devices and other controls and techniques as may be envisioned by those skilled in the art. Controller 320 also receives the signals SC and SEGCNT from symbol counter 316 and segment counter 318 respectively.

As further illustrated in FIG. 6, some embodiments of CDEU 230A connect controller 320 and correlation buffer 314. Correlation buffer 314 has memory locations corresponding to the number of symbol times in a data segment period, denoted herein as array M(i) where i is the index of the array. The maximum value of i corresponds to the number of symbol times contained in a data segment. Although not shown, the index variable i is provided to correlation buffer 314 by controller 320. As explained herein, in some instances the index variable i has the same value as SC provided by symbol counter 316. However, in other instances index variable i is provided by controller 320 to calculate the CDE 84.

Illustratively, one embodiment of the present invention adapted to the ATSC standard includes correlation buffer 314 with 832 memory locations corresponding to the 832 symbols per data segment. As will be appreciated by those skilled in the art, in certain embodiments controller 320 exclusively governs the operation of correlation buffer 314. Other embodiments permit integrator 312, controller 320 and centroid estimator 340 to access correlation buffer 314. Various techniques, interfaces, buffer management techniques, memory organizations and types are used in various embodiments as would occur to one skilled in the art and all illustrations herein are by way of example and are not intended as limitations.

Controller 320 also connects to memory 330 and centroid estimator 340. Other embodiments of CDEU 230A allow control system 54 to access memory 330. As shown in FIG. 6, one embodiment of memory 330 includes CDE register 332, centroid estimate (CENT) register 334, coring threshold register 336, and segment count register 338. As explained later in detail, CDE register 332 holds the current estimated delay associated with the channel delay measured at the input of FFE 210. CENT register 334 contains the centroid estimate generated by centroid estimator 340 corresponding to the value stored in CDE register 332. As described later, coring threshold register 336 contains a coring threshold variable used to filter out or minimize false segment sync detection. Finally, the content of segment count register 338 is the number of segments N over which CDEU 230A integrates the correlation values produced by correlator 310 to produce a set of temporally filtered segment sync correlation values for each symbol time within a segment period. In some alternative embodiments, the values of the coring threshold and N are static.

Figure 9:
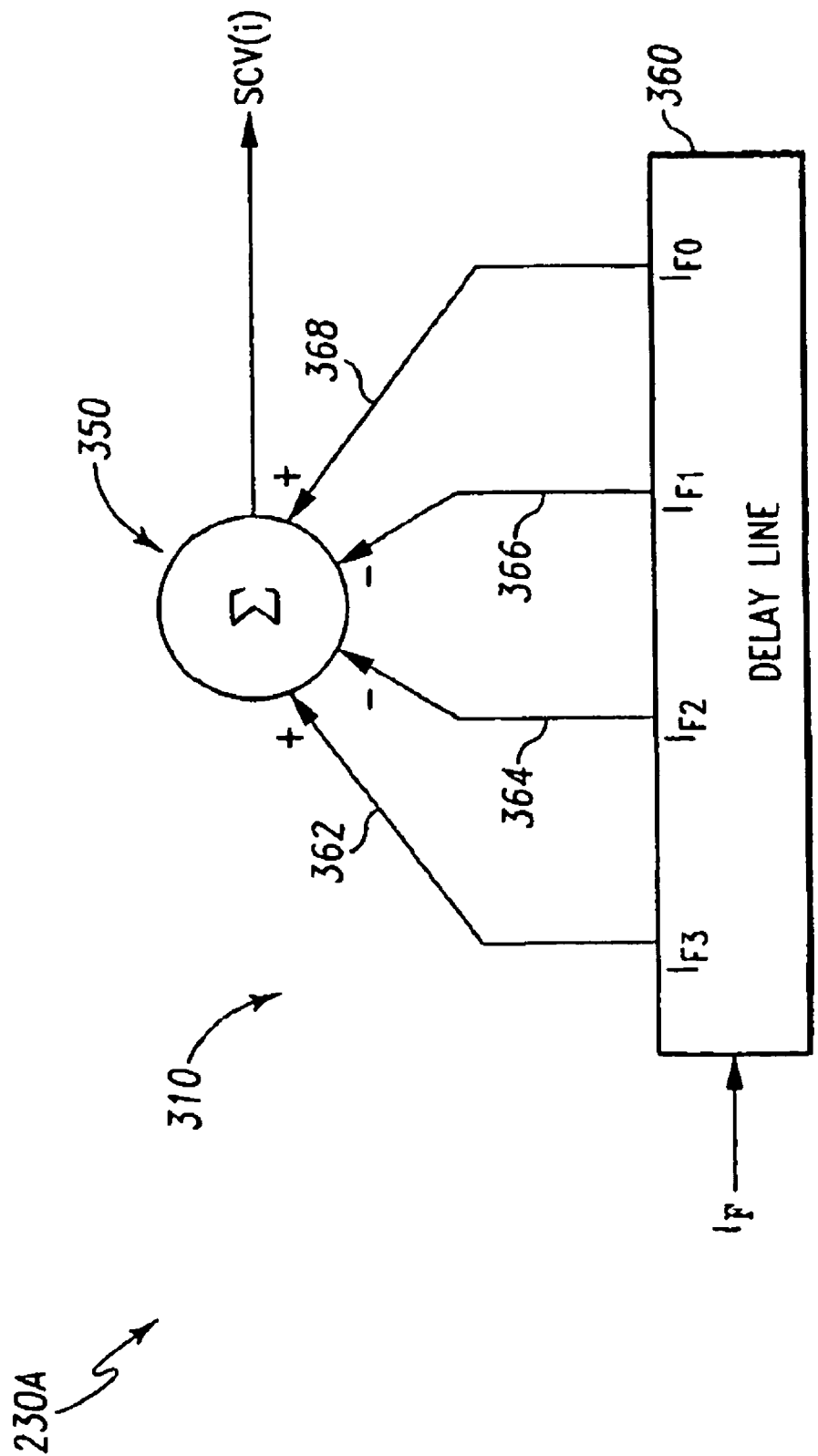
FIG. 9 is a block diagram of one embodiment of an ATSC segment sync correlator.

Functionally, correlator 310 receives and correlates the four most recently received values of $I_F$ 76 with a known segment sync sequence to produce a symbol correlation value, SCV(i). Illustratively, in some embodiments, SCV(i) is the symbol correlation value for the $i^{th}$ symbol time in a data segment and corresponds to the output of symbol count 316 and the $i^{th}$ array location M(i) in correlation buffer 314. As shown in FIG. 9, one embodiment of correlator 310 is designed for an ATSC system, and includes summer 350 and delay line 360. Delay line 360 has first, second, third and fourth delay elements (not shown) where the first delay element receives $I_F$ 76 as an input and has a first delay output 362. The second delay element receives first delay output 362 and provides second delay output 364. The third delay element receives second delay output 364 and provides third delay output 366 to the fourth delay element, which, in turn provides fourth delay output 368. The outputs of the first, second, third and fourth delay elements correspond to the four most recently received values of $I_F$, denoted as $I_{F3}$, $I_{F2}$, $I_{F1}$ and $I_{F0}$, respectively. Summer 350 generates output SCV(i) from inputs $I_{F3}$, $I_{F2}$, $I_{F1}$ and $I_{F0}$. The output of summer 350 at symbol time i is SCV(i)=$I_{F3}$−$I_{F2}$−$I_{F1}$+$I_{F0}$. As will be understood by those skilled in the art, the relatively short length of the segment sync sequence, four symbol times, will often lead to noisy correlations SCV(i). Illustratively, data passing through correlator 310 (see FIG. 6) will align itself in a manner to cause a maximum correlation output value. Integrating the values of SCV(i) over a number of segment periods averages out these noisy correlation values.

Figure 10:
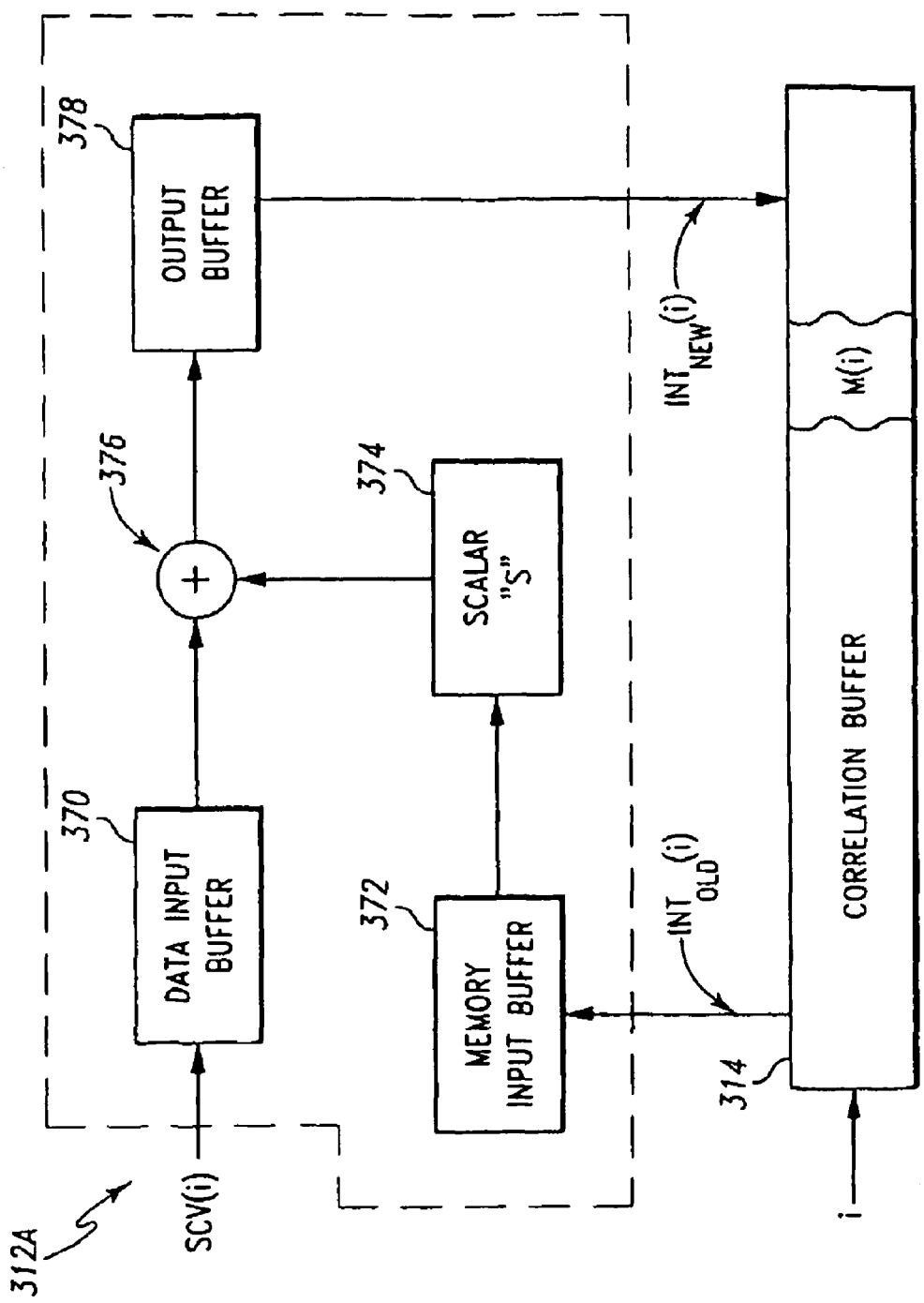
FIG. 10 is a block diagram of one embodiment of a "leaky" integrator.

In one embodiment, integrator 312 is a perfect integrator. In another embodiment of integrator 312, integrator 312A as shown in FIG. 10, is a "leaky" integrator and includes data input buffer 370, memory input buffer 372, scalar 374, adder 376 and output buffer 378. Integrator 312A receives SCV(i) at data input buffer 370 from correlator 310 (see FIG. 9) corresponding to SC of symbol counter 316. INT(i) is the temporally averaged value of SCV(i) obtained by integrating the value of SCV(i) over time and is stored in array M(i) of correlation buffer 314. Integrator 312A receives the previously calculated integration value, denoted as $INT_{OLD}(i)$ for clarity and also corresponding to the symbol count of symbol counter 316 at memory input buffer 372. It can be understood that SCV(i) and $INT_{OLD}(i)$ correspond to the same symbol time within a data segment period. Memory input buffer 372 provides $INT_{OLD}(i)$ to scalar 374. Scalar 374 multiplies $INT_{OLD}(i)$ by the desired scalar S and provides the product to adder 376. Adder 376 also receives the output of data input buffer 370 and provides the sum $INT_{NEW}(i)=SCV(i)+(S \cdot INT_{OLD}(i))$ to output buffer 378. Output buffer 378 provides $INT_{NEW}(i)$ to correlation buffer 314, which stores $INT_{NEW}(i)$ in M(i).

In some embodiments, where integrator 312A is a perfect integrator, the scalar value is unity (S=1). In those embodiments having a leaky integrator, the scalar value is less than one. Illustratively, one embodiment of the present invention uses S=255/256. Integrating the values of SCV(i) over a number of segment periods filters out noise in the received data within correlator 310.

Figure 11:
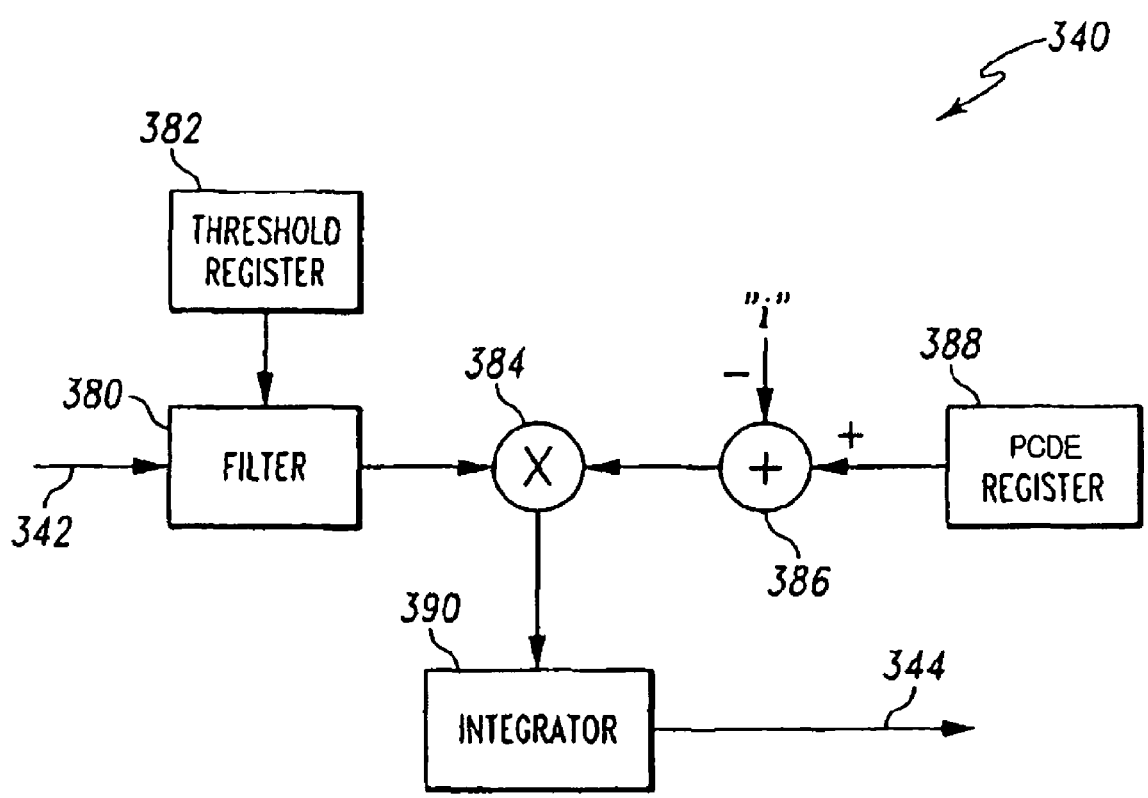
FIG. 11 is a block diagram of one embodiment of a centroid estimator.

As illustrated in FIG. 11, at least one embodiment of centroid estimator 340 includes filter 380, threshold register 382, multiplier 384, subtractor 386, PCDE register 388 and integrator 390. Controller 320 (see FIG. 6) reads and writes parameters to threshold register 382 and PCDE register 388. As explained below, integrator 390 provides a centroid error estimate 344 to controller 320. In some embodiments, controller 320 writes the variable threshold, from coring threshold register 336 (see FIG. 6) into threshold register 382. In other embodiments threshold register 382 is equivalent to coring threshold register 336. PCDE register 388 contains the proposed channel delay estimate (PCDE) under evaluation. In some embodiments of the present invention PCDE register 388 is the equivalent of CDE register 332 (see FIG. 6).

Controller 320 (FIG. 6) provides the index variable i to centroid estimator 340 of FIG. 11, and the centroid estimator 340 further receives INT(i) from correlation buffer 314 at a first input 342 of filter 380. Filter 380 also includes a second input that receives the variable threshold from threshold register 382 and provides an output to the first input of multiplier 384. PCDE register 388 provides the variable PCDE to the positive input of subtractor 386. The negating input of subtractor 388 receives the index variable i from controller 320. The output of subtractor 386 is a distance from the PCDE used to calculate the "moment" (in the mathematical sense) corresponding to INT(i). The output of subtractor 386 is provided as the second input to multiplier 384, which provides the product to the input of integrator 390.

As described below, controller 320 searches for a PCDE value that minimizes the absolute magnitude of a metric denoted herein as CCE(PCDE). Other embodiments of the present invention look for a change in the sign of CCE(PCDE) to select the CDE without regard to the absolute magnitude of the CDE. Filter 380 performs the filter function F(INT(i), threshold) on the absolute value of INT(i) values stored in correlation buffer 314. Illustratively, in some embodiments, filter 380 takes the absolute value of INT(i) and compares it to threshold. The output of filter 380 is F(INT(i), threshold)=0 for those values of |INT(i)|<threshold; filter 380 has an output F(INT(i), threshold)=|INT(i)| for |INT(i)|>threshold.

In other embodiments, filter 380 compares the squared value of INT(i) to threshold such that if $INT(i)^2 \geq$ threshold, then the output of the filter 380 is equal to $INT(i)^2$, otherwise such output is equal to zero. In yet other embodiments, filter 380 has an output F(INT(i), threshold)=$|INT(i)|^2$ for $|INT(i)|^2$>threshold. Otherwise, filter 380 has an output F(INT(t), threshold)=0 for $|INT(i)|^2 \leq$ threshold.

Subtractor 386 develops a sample distance difference (PCDE-i), which represents the delay or number of samples between the proposed CDE location and the $i^{th}$ sample corresponding to INT(i). Multiplier 384 multiplies the sample distance difference signal by the output of filter 380. The multiplier product provides an input to integrator 390, which performs the summation:

$$CCE(PCDE) = \sum_{i=0}^{i=831} F(INT(i)\text{threshold}) \times Dist(PCDE, i)$$

where CCE(PCDE) is a CIR centroid error estimate and reflects the distance of PCDE from the position of the centroid of the CIR (i.e., the CDE). Function $Dist(x_0, x_1)$ calculates the number of samples from a first symbol time, $x_0$, to a second symbol time, $x_1$, in a data segment. Illustratively, in some embodiments of ATSC systems Dist(PCDE, i) is defined to have a negative sign for [(PCDE+416) mod 832]$\leq$i<PCDE and a positive sign for PCDE$\leq$i<(PCDE+416) mod 832.

As a non-limiting example, at least one embodiment of a system adapted for an ATSC standard broadcast includes a correlation buffer 314 (see FIG. 6) with 832 memory locations. Assuming the present value of PCDE=26, $$Dist(PCDE, i) = \begin{cases} d(PCDE, i) & \forall i: 26 \leq i \leq 442 \\ -d(PCDE, i) & \text{else} \end{cases}$$

where d(PCDE, i) is a non-negative distance metric $d(x_0,x_1)=|x_0-x_1|$ and $0 \leq i \leq 831$. It will be appreciated that different boundary conditions and techniques for calculating a weighted average or centroid estimate appear in various embodiments and can be implemented by those skilled in the art without undue experimentation. Some alternative embodiments of the system include a non-linear distance metric function. In some embodiments the distance metric function $d_K(x_0,x_1)=|x_0-x_1|^K$. Illustratively, in some embodiments K=2. In other embodiments K is a fractional number.

One embodiment of CDEU 230A will now be discussed with continuing reference to elements of FIG. 6, and with reference to the flow chart of FIG. 12, which illustrates the operation of a system 400 adapted for an ATSC broadcast system to estimate the channel delay. At 402, "Initialization," controller 320 initializes CDEU 230A including, but not limited to, the contents of correlation buffer 314, symbol counter 316, segment counter 318 and integrator 382. In various embodiments this also includes the proper initialization of the various control registers. In some embodiments, receiving the first three symbol times of data from filtered in-phase baseband signal $I_F$ 76 initializes correlator 310. After initialization of CDEU 230A, control proceeds to 404.

At 404, "SCV," correlator 310 receives a new symbol from filtered in-phase baseband signal $I_F$ 76 and calculates the value of SCV(i) corresponding to the symbol count produced by symbol counter 316. Illustratively, at initial startup correlator 310 produces SCV(0) where SC=0. System 400 transitions to 406 after calculating SCV(i).

At 406, "Integration," integrator 312 receives SCV(i) from correlator 310 and $INT_{OLD}(i)$ from array M(i) of correlation buffer 314. At initial startup each INT(i)=0. Otherwise, INT(i) corresponds to the previously stored integration value. Integrator 312 adds SCV(i) to a scaled value of $INT_{OLD}(i)$ to produce $INT_{NEW}(i)$ at output buffer 378. Integrator 312 then updates the value of INT(i) stored in array M(i) with $INT_{NEW}(i)$. System 400 then proceeds to 410.

At 410, "SC=831," controller 320 determines whether SC, which is also the same as the index variable i, equals the maximum output of symbol counter output 816. On the condition SC=831(YES), where the range of SC is 0 to 831, system 400 transitions to 414. Otherwise, on a negative decision (NO) system 400 transitions to 412. CDEU 230A then increments segment counter 316. Upon receiving the new value of SC, controller 320 increments the index variable i and transitions system 400 back to 404.

At 414, "SEGCNT<N," controller 320 compares the output of segment counter 318, SEGCNT, to the value N stored in segment count register 338. On a positive decision SEGCNT<N (YES), controller 320 branches CDEU 230A operation to 416 where segment counter 318 is incremented by one. In addition, the output of symbol counter 315 is set to zero (i.e., SC=0). However, on a negative decision SEGCNT<N (NO), it has been determined that SEGCNT=N, and control passes to 420.

At 420, "Find Initial CDE," controller 320 searches correlation buffer 314 for the location in array M(i) containing the maximum value of INT(i). The index variable i corresponding to the maximum magnitude of INT(i) is chosen as the initial value of channel delay estimate (CDE) and placed in CDE register 332 and/or PCDE register 388.

At 422, "CDEU," centroid estimator 340 calculates the CCE(PCDE) for the proposed CDE value. At 424, "Found CDE," controller 320 evaluates whether CCE(PCDE)=0 or SGN(CCE)≠SGN(CENT), where SGN( ) is the signum( ) function that returns the sign of the number in the parentheses. If either condition is found to be true, the operation of system 400 branches to 432. Otherwise, the operation of system 400 branches to 426.

At 426, "CCE(PCDE)>0," controller 320 determines whether CCE(PCDE)>0. On a positive decision (YES), operation of CDEU 230A branches to 430. Otherwise, on a negative decision (NO), CDEU 230A branches to 428. At 428, "Increment PCDE," controller 320A writes the current values of PCDE and CCE(PCDE) into CDE register 332 and CENT register 334, respectively, and increments the value of PCDE stored in PCDE register 388. The operation of system 400 then proceeds to 422, and CDEU 230A continues searching for the CDE.

At 430, "Decrement PCDE," controller 320A writes the current values of PCDE and CCE(PCDE) into CDE register 332 and CENT register 334, respectively, and decrements the value of PCDE stored in PCDE register 388. The operation of system 400 then returns to 422, and CDEU 230A continues searching for the CDE.

At 432, "CCE(PCDE)=0," controller 320 evaluates whether CCE(PCDE)=0. On a positive decision (YES), the PCDE value is the desired value and CDEU 230A proceeds to 434, where controller 320 writes the value of PCDE into CDE register 332 and proceeds to Exit. Otherwise, on a negative decision (NO), system 400 proceeds to 436.

At 436, "Select Nearest," controller 320 determines whether CENT<CCE(PCDE). On a positive decision, the value stored in CDE register 332 is the desired value of the CDE and CDEU 230A proceeds to Exit. Otherwise, the PCDE value is the desired value of the CDE (see 434), and hence, controller 320 writes the value of PCDE register 388 into CDE register 332. System 400 then proceeds to Exit. Other search algorithms for selecting PCDE values are or will become apparent to those skilled in the art for use in this system, and the preceding is not intended as a limitation.

Figure 13:
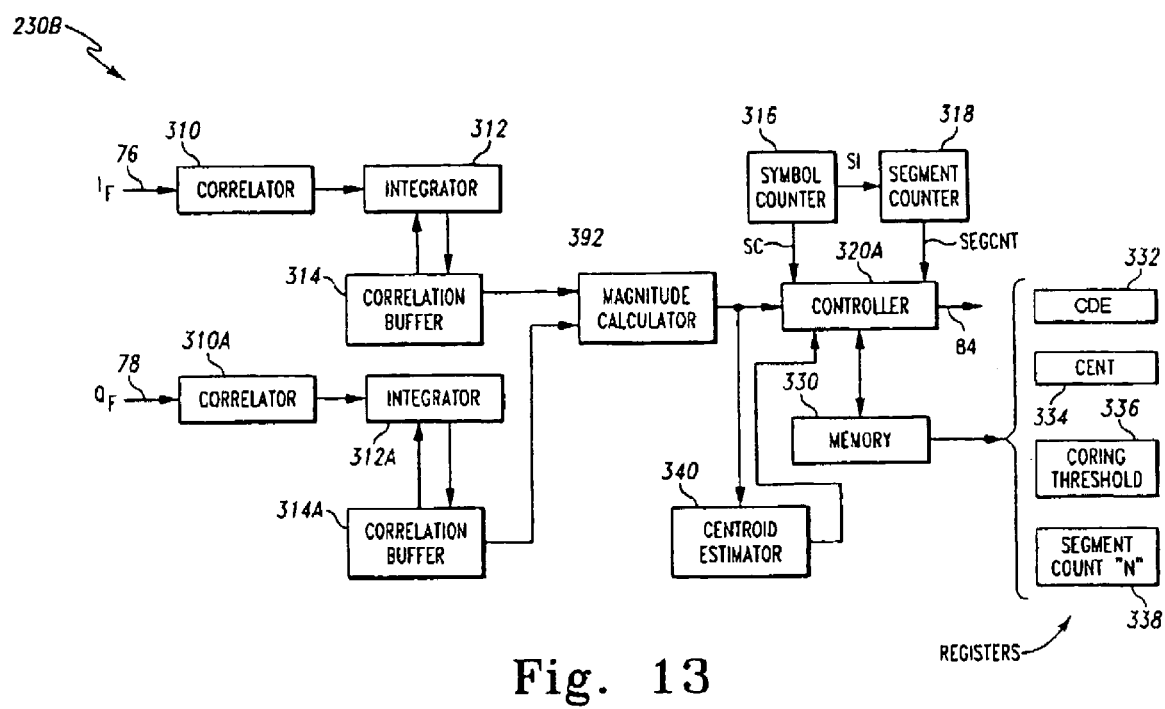
FIG. 13 is a block diagram of another embodiment of a segment sync based CDEU.

Another embodiment of CDEU 230, as illustrated in FIG. 13, is CDEU 230B, which is adapted for operating in the presence of ghost signals such as exist in a terrestrial ATSC broadcast. CDEU 230B develops an estimated CDE using both baseband component signals $I_F$ 76 and $Q_F$ 78 from the Nyquist Root Filter 44 (see FIG. 3). The function and operation of CDEU 230B is similar to that of CDEU 230A, except that CDEU 230B also uses both $I_F$ 76 and $Q_F$ 78 to calculate the correlation of the received signal with the segment sync sequence. CDEU 230B also adds the correlation results of the corresponding $I_F$ and $Q_F$ signals for each symbol time.

Thus, similar to CDEU 230A, CDEU 230B includes first correlator 310, first integrator 312, first correlation buffer 314, symbol counter 316, segment counter 318, controller 320A, memory 330, and centroid estimator 340. In addition, CDEU 230B includes second correlator 310A, second integrator 312A, and second correlation buffer 314A. CDEU 230B receives filtered baseband signals $I_F$ 76 and $Q_F$ 78 as inputs to first correlator 310 and second correlator 310A, respectively. Similar to integrator 312, integrator 312A receives the output of correlator 310A, and $SCV_Q(i)$ and $INT_{QOLD}(i)$ from correlation buffer 314A. Integrator 312A provides $INT_{QNEW}(i)$ as an output to correlation buffer 314. $SCV_Q(i)$ is the symbol correlation value for the $i^{th}$ symbol time in a data segment with $Q_F$ and corresponds to the output of symbol counter 316 and the $i^{th}$ array location $M_Q(i)$ in correlation buffer 314A.

Correlator 310, integrator 312 and correlation buffer 314 have similar function and operation as previously described in relation to CDEU 230A. Similarly, correlator 310A, integrator 312A, and correlation buffer 314A are functionally equivalent and perform similar operations and functions as correlator 310, integrator 312 and correlation buffer 314 in CDEU 230A; however, they are adapted to operate on quadrature baseband signal $Q_F$ 78. Illustratively, correlation buffer 314 holds the correlation values $INT_I(i)$ corresponding to $I_F$ 76, and correlation buffer 314A holds the correlation values $INT_Q(i)$ corresponding to $Q_F$ 78.

The outputs of correlation buffers 314 and 314A provide $INT_I(i)$ and $INT_Q(i)$, respectively, to the inputs of magnitude calculator 392. The output of magnitude calculator 392 provides MAG(i), a composite magnitude of $INT_I(i)$ and $INT_Q(i)$, to centroid estimator 340 and controller 320A. Otherwise, controller 320A is functionally and operationally similar to previously described controller 320. Other embodiments calculate $MAG(i)=INT_I(i)^2+INT_Q(i)^2$. Still other embodiments calculate $MAG(i)=|INT_I(i)|+|INT_Q(i)|$. As will be appreciated, other metrics for the composite magnitude are used in still other embodiments.

Otherwise, CDEU 230B operates much in the same fashion as CDEU 230A, except that it uses the output of magnitude calculator 392, MAG(i), to calculate the centroid, whereas CDEU 230A only uses the magnitude of INT(i). Illustratively, after a sufficient number of segment periods, controller 320A determines the initial position of PCDE by determining the value of index variable i corresponding to the maximum magnitude of MAG(i).

Figure 14:
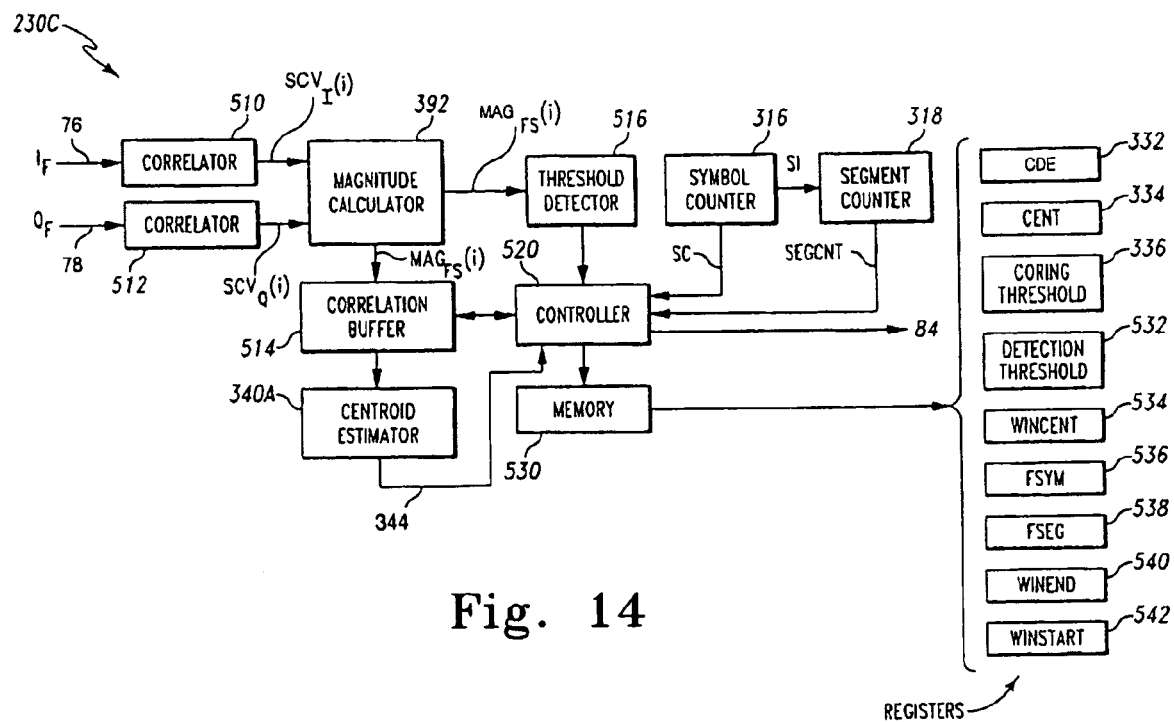
FIG. 14 is a block diagram of an embodiment of a frame sync based CDEU.

Yet another embodiment of CDEU 230, illustrated in FIG. 14, is CDEU 230C, which is also adapted for an ATSC broadcast system. CDEU 230C estimates the position of the channel delay by detecting the correlation strength of various received ghost signals with the known frame sync sequence, PN511, within a desired sample window. It will be understood that the ATSC frame sync contains a pseudorandom sequence with a cyclic convolution property. Some embodiments of the present invention advantageously calculate the correlation strength of a particular ghost by using a matched filter to take advantage of the relatively long length of the field/frame sync sequence. Other embodiments develop a correlation strength estimate by correlating the received signal with the expected PN511 sequence.

Figure 15:
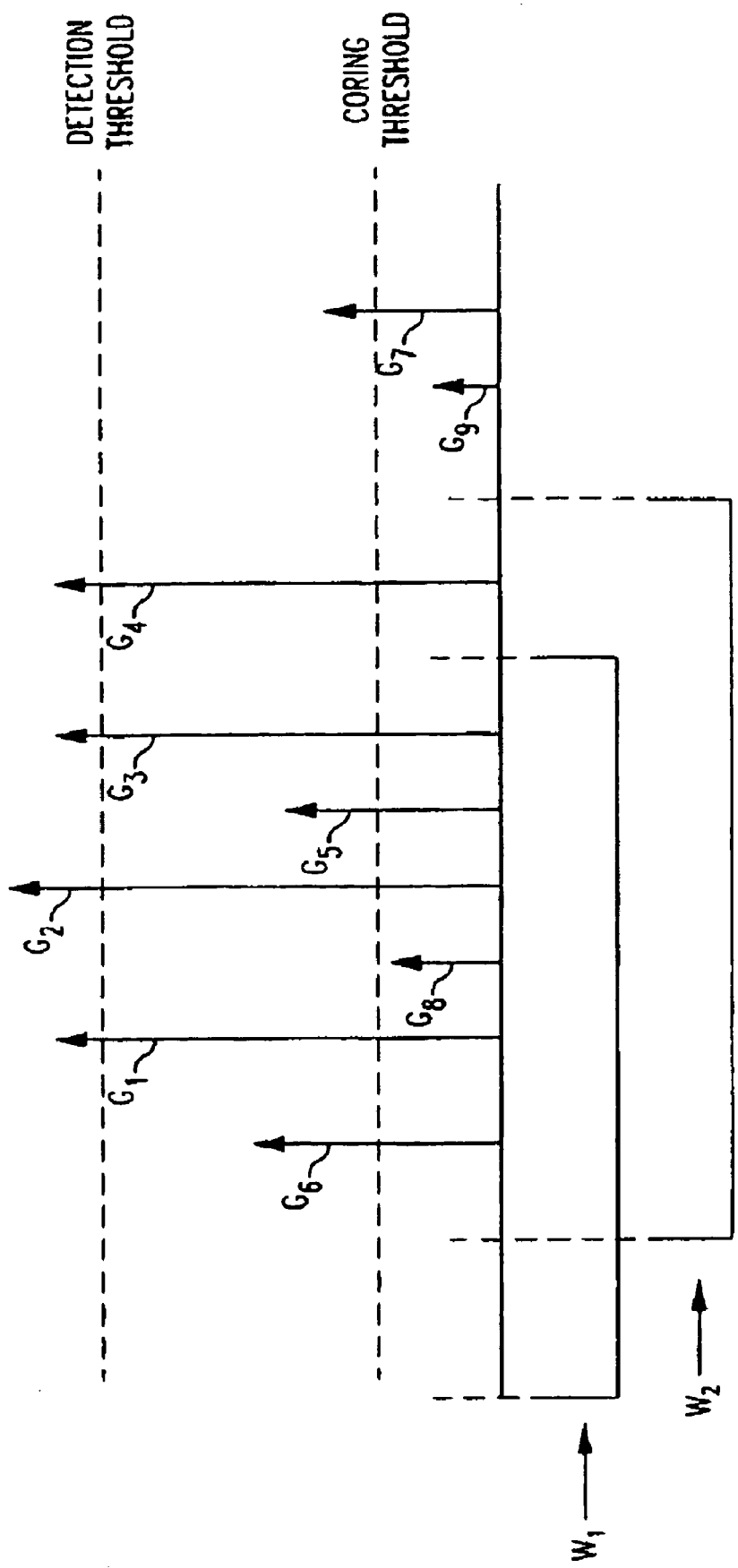
FIG. 15 shows the location of ghost signals in a transmission channel relative to windowing functions.

As illustrated in FIG. 15, another non-limiting example transmission channel includes ghosts $G_1$, $G_2$, $G_3$ and $G_4$, each having correlation strengths above a detection threshold level. The channel also includes ghosts $G_5$, $G_6$ and $G_7$, each having correlation strengths below the detection threshold but above the coring threshold level. Finally, the example channel has ghosts $G_8$ and $G_9$ below the coring threshold level. The relative multipath delay of each ghost is reflected in their relative position along the horizontal axis.

Some embodiments of CDEU 230C apply a windowing function to the received ghost signals. The ghost signals within the window are used to calculate the channel delay estimate. In some embodiments, the span of the window is based on the first detected ghost signal that has a frame sync correlation strength above the detection threshold. As illustrated in FIG. 15, CDEU 230C first detects $G_1$, with correlation strength above the detection threshold. CDEU 230C then selects a window span $W_1$ centered about $G_1$. Those ghosts outside the window are not considered when estimating the location of the channel delay. It will be appreciated that $G_4$ is not within $W_1$ and is not considered when estimating the location of the channel delay.

Other embodiments of CDEU 230C select a window centered about a ghost with a maximum or locally maximum correlation strength. As illustrated in FIG. 15, CDEU 230C initially detects $G_1$ and selects $W_1$ as the current window, centered about $G_1$. Subsequently, CDEU 230C detects $G_2$, with a correlation strength greater than that of $G_1$. CDEU 230C then selects a new window, $W_2$, centered about $G_2$. As a result, $G_7$ and $G_9$ are still not considered in the channel delay estimation; however, $G_4$ is considered because it falls within $W_2$.

Referring back to FIG. 14, CDEU 230C includes symbol counter 316, segment counter 318, centroid estimator 340A, magnitude calculator 392, correlators 510 and 512, correlation buffer 514, threshold detector 516, controller 520 and memory 530. CDEU 230C receives filtered baseband signals $I_F$ 76 and $Q_F$ 78 as inputs to first correlator 510 and second correlator 512, respectively. Correlators 510 and 512 provide $SCV_I(i)$ and $SCV_Q(i)$ to magnitude calculator 392

Correlators 510 and 512 are similar to correlators 310 and 312 of FIG. 13, except that they are adapted to provide a correlation between the received $I_F$ 76 and $Q_F$ 78 signals and frame or field sync sequence. $SCV_I(i)$ and $SCV_Q(i)$ are the correlation strength of the received $I_F$ 76 and $Q_F$ 78 with a frame or field sync sequence. Magnitude calculator 392 provides $MAG_{FS}(i)$ as an output to threshold detector 516 and correlation buffer 514. $MAG_{FS}(i)$ is similar in form and function to MAG(i) of FIG. 13, but operates directly on $SCV_I(i)$ and $SCV_Q(i)$ instead of the integrated values. Correlation buffer 514 operably connects to centroid estimator 340A. Controller 520 interfaces with memory 530 and receives the values of SC and SEGCNT from symbol counter 316 and segment counter 318, respectively. Similar to controller 320 of FIG. 13, controller 520 provides channel delay estimate 84 and has a first control interface connected to control system 54 (see FIG. 3). Controller 520 also has a second interface (not shown for the sake of simplicity) to the control interfaces of correlator 510, correlator 512, correlation buffer 514, threshold detector 516, memory 530, symbol counter 316, segment counter 318, and centroid estimator 340A.

The second control interface of controller 520 governs the operation of various elements of CDEU 230C including, but not limited to, reading and writing configuration registers, issuing reset signals, controlling access to memory and registers, managing buffers of the various devices and other functions as will occur to those skilled in the art. In various alternative embodiments, the first and second control interfaces of controller 520 include separate data buses, or utilize a single data bus, or are each comprised of a plurality of individual data channels between components, as would occur to those of skill in the art.

Finally, memory 530 includes CDE register 332, CENT register 334, coring threshold register 336, detection threshold register 532 containing the variable detection threshold $T_{DET}$, window center register 534 containing variable WINCENT, frame sync symbol position (FSYM) register 536 containing variable FSYM, and frame sync segment position (FSEG) register 538 containing variable FSEG. Some embodiments include window end register 540 containing variable WINEND and window start register 542 containing variable WINSTART.

The detection threshold $T_{DET}$ is the minimum output value of magnitude calculator 392 that will be deemed to correspond to the detection of a frame sync sequence in the incoming data stream. WINCENT corresponds to the memory position in correlation buffer 514 that is the center of the windowing function. FSYM and FSEG are the values of symbol counter 315 and segment counter 318, respectively, corresponding to the symbol time that is located at the center of the windowing function. Finally, the variables WINSTART and WINEND correspond to the first and last memory locations of the desired window in correlation buffer 514.

In some embodiments correlation buffer 514 is configured as a circular buffer having 2n memory locations addressed by index variable i with values 0 to 2n−1. In other embodiments correlation buffer 514 holds 2n+1 correlation values. As a non-limiting example, for a transmission channel with a centroid at WINCENT, WEND=(WINCENT+n) modulo (2n) and WSTART=(WINCENT+n+1) modulo (2n).

Figure 16:
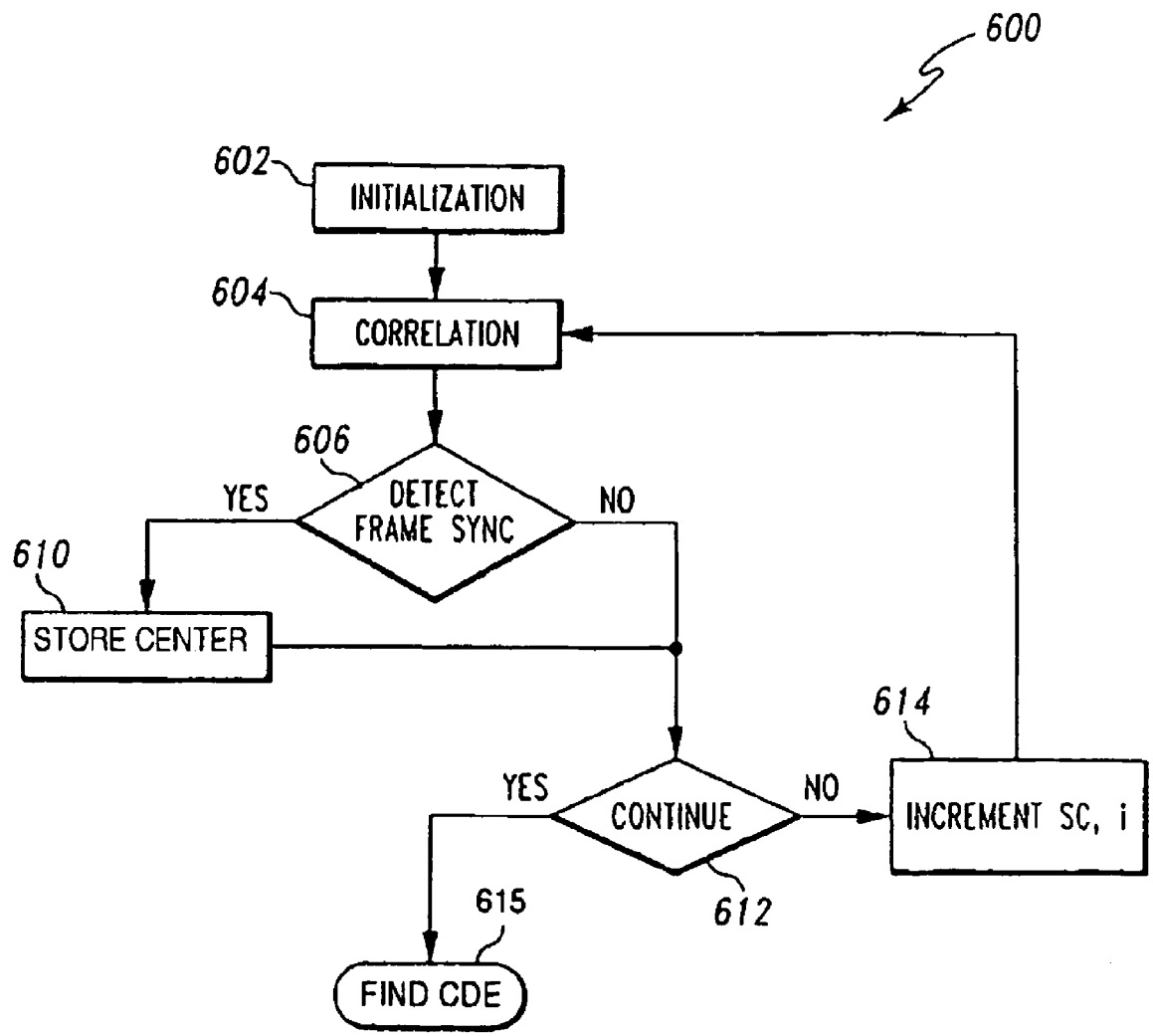
FIG. 16 is a flow diagram illustrating operation of a further embodiment of a CDEU.

Another embodiment of CDEU 230C, illustrated as system 600 that operates in accordance with the flow chart of FIG. 16, is also adapted for an ATSC broadcast. At 602, "Initialization," the elements of CDEU 230C are initialized as will be understood by those skilled in the art. Illustratively, with additional reference to FIG. 14, controller 520 initializes the registers in memory 530, symbol counter 316, segment counter 318, magnitude calculator 392, correlator 510, correlator 512, and correlation buffer 514. Furthermore, index variable i is initialized to zero.

At 604, "Correlation," correlators 510 and 512 receive the most recent filtered in-phase and quadrature baseband signals $I_F$ 76 and $Q_F$ 78, respectively, and perform a correlation on the most recently received sequence of bits. As in the embodiment discussed above with reference to FIG. 14, magnitude calculator 392 receives $SCV_I(i)$ and $SCV_Q(i)$ from correlators 510 and 512, respectively, and calculates the magnitude of the correlation, $MAG_{FS}(i)$. $MAG_{FS}(I)$ is provided as an output to correlation buffer 514 and threshold detector 516. Correlation buffer 514 stores $MAG_{FS}(i)$ in array M(i). System 600 then proceeds to 606.

At 606, "Detect Frame Sync," if $MAG_{FS}(i) \geq T_{DET}$ (YES) a positive indication is sent to controller 520. System 600 then branches to 610. Otherwise, threshold detector 516 sends a negative indication (NO) (no frame sync detected) to controller 520. System 600 then branches to 612. In some embodiments, controller 520 branches CDEU 230C operation to 610 only upon detection of the first frame sync. Similar to window $W_1$ of FIG. 15, this results in the window function being centered about the first ghost signal with a frame sync correlation above $T_{DE}$.

In other embodiments, at 606, controller 520 branches CDEU 230C operation to 610 when any frame sync is detected or MAG(i)>CENT. Illustratively, the CENT register is initialized with CENT=$T_{DET}$. A first positive indication (YES) is sent to controller 520 when $MAG_{FS}(i) \geq T_{DET}$. On each positive indication, controller 520 sets CENT=$MAG_{FS}$(i). Additional positive indications are generated when $MAG_{FS}(i) \geq$ CENT. This results, similar to window $W_2$ of FIG. 16, in the window function being centered about the ghost signal with the maximum frame sync correlation. Otherwise, controller 520 branches CDEU 230C operation and system 600 proceeds to 612.

At 610, "Store Center," controller 520 sets FSYM=SC and FSEG=SEGCNT, where FSYM and FSEG represent the location of detected frame sync within the data packet field/frame structure. Controller 520 sets CDE=i as the initial estimate of the channel delay. In some embodiments, controller 520 also sets CENT=MAG(i) as the magnitude of the correlation corresponding to the initial channel delay estimation. The controller 520 also calculates the location WINEND. System 600 then proceeds to 612.

At 612, "Continue," controller 520 branches operation of CDEU 230C in dependence upon whether WINEND has been reached. On the negative indication (NO), CDEU 230E has not previously detected a frame sync or CDEU 230E has detected a previous frame sync but i≠WINEND. In this event, system 600 branches operation to 614. Otherwise, controller 520 has determined that WINEND has been reached and branches operation to 615 FIND CDE. As described below, system 600 determines the CDE of the channel at FIND CDE.

At 614, the values of symbol counter 316 and segment counter 318 are updated. Index variable i is also incremented. System 600 returns to 604.

Some embodiments of CDEU 230C include centroid estimator 340A that estimates the delay of a channel by calculating the weighted average, or centroid, of the correlation values within the windowing function. As will be understood by those skilled in the art, centroid estimator 340A is operationally and structurally similar to centroid estimator 340, except that centroid calculator 340A is adapted to operate on the values of $MAG_{FS}(i)$ stored in correlation buffer 514. Correlation buffer 514 and controller 520 of centroid estimator 340A interface and operate equivalently or in much the same fashion as correlation buffer 314 and controller 320 in centroid estimator 340. Thus, similar to centroid estimator 340, centroid estimator 340A performs the summation:

CCE(PCDE)=$\Sigma_{WINDOW}$F(MAG(i),threshold)×Dist(PCDE,i)

over the values contained in the desired WINDOW of memory locations in correlation buffer 514. Similar to controllers 320 and 320A of previously described embodiments of CDEU 230, controller 520 interacts with centroid estimator 340A (not shown) and correlation buffer 514 to determine the location of the correlation value that corresponds to the delay of the channel.

Figure 17:
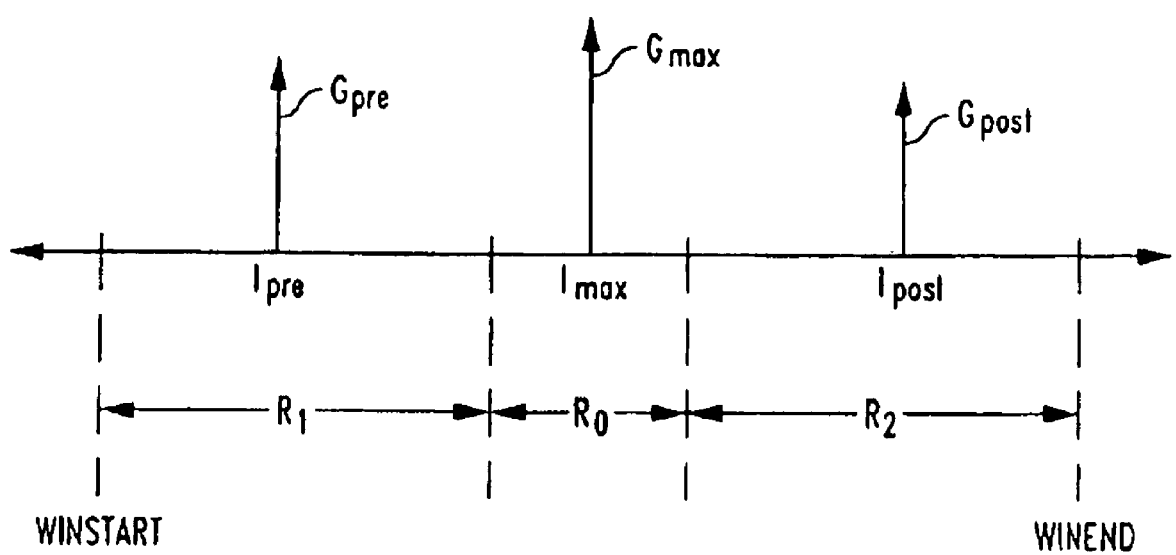
FIG. 17 shows the location of ghost signals in a transmission channel relative to windowing functions.

Other embodiments of CDEU 230C determine the delay of a channel by calculating the weighted average or centroid of the correlation values of a subset of the correlation values within the windowing function. As illustrated in FIG. 17, in some embodiments, controller 520 divides the window into regions centered around the ghost signal with the maximum correlation value $G_{MAX}$ corresponding to sample i=$I_{MAX}$, such that $M(I_{MAX})$=$G_{MAX}$ within the window. In other embodiments, region $R_0$ has some width about $I_{MAX}$. Region $R_1$ is the portion of the window from WINSTART to region $R_0$ and contains pre-ghost signals relative to $I_{MAX}$. Region $R_2$ is the portion of the window from region $R_0$ to WINEND and contains post-ghost signals relative to $I_{MAX}$.

Illustratively, initially controller 520 searches correlation buffer 514 to locate $G_{MAX}$. Controller 520 then searches region $R_1$ to locate the pre-ghost signal $G_{PRE}$ (corresponding to i=$I_{PRE}$, such that $M(I_{PRE})$=$G_{PRE}$) and post-ghost signal $G_{POST}$ (corresponding to i=$I_{POST}$, such that $M(I_{POST})$=$G_{POST}$) closest to $I_{MAX}$. In some embodiments, controller 520 only considers those ghost signals with $MAG_{FS}(i) > T_{DET}$. As shown in FIG. 15, $G_2$ is $G_{MAX}$, $G_1$ is $G_{PRE}$, and $G_3$ is $G_{POST}$.

Similar to controller 320 in CDEU 230A, controller 520 determines the location of PCDE by evaluating the equation: CCE(PCDE)=$G_{MAX}$·Dist(PCDE, $I_{MAX}$)+$G_{PRE}$·Dist(PCDE, $I_{PRE}$)+$G_{POST}$·Dist(PCDE, $I_{POST}$) where Dist(PCDE, i) is defined as negative for values of i lying between WINSTART and CDE, and positive for values of i lying between CDE and WINEND. In still other embodiments, controller 520 first considers ghost signals with $MAG_{FS}(i) > T_{DET}$; however, ghost signals above threshold are also considered. By way of a non-limiting example, one embodiment of system 20 adapted for an ATSC standard broadcast has a correlation buffer 514 containing 1024 samples with a window width of 1024 samples. Under one possible channel condition, FSYM=128, WINSTART=640 and WINEND=639. Given PCDE=26:

$$\text{Dist}(PCDE, i) = \begin{cases} d(PCDE, i) & \forall i : 26 \leq i \leq 640 \\ -d(PCDE, i) & \text{else} \end{cases}$$

where d(PCDE, i) is a non-negative distance metric d($x_0,x_1$)= |$x_0 - x_1$| and $0 \leq i \leq 1023$.

Different boundary conditions and techniques for calculating a weighted average or centroid estimate can be applied to this system without undue experimentation. In some embodiments, controller 520 selects the value of CDE that minimizes the absolute magnitude of CCE(PCDE). In other embodiments, controller 520 selects the value of CDE where the sign of CCE(PCDE) changes.

Figure 18:
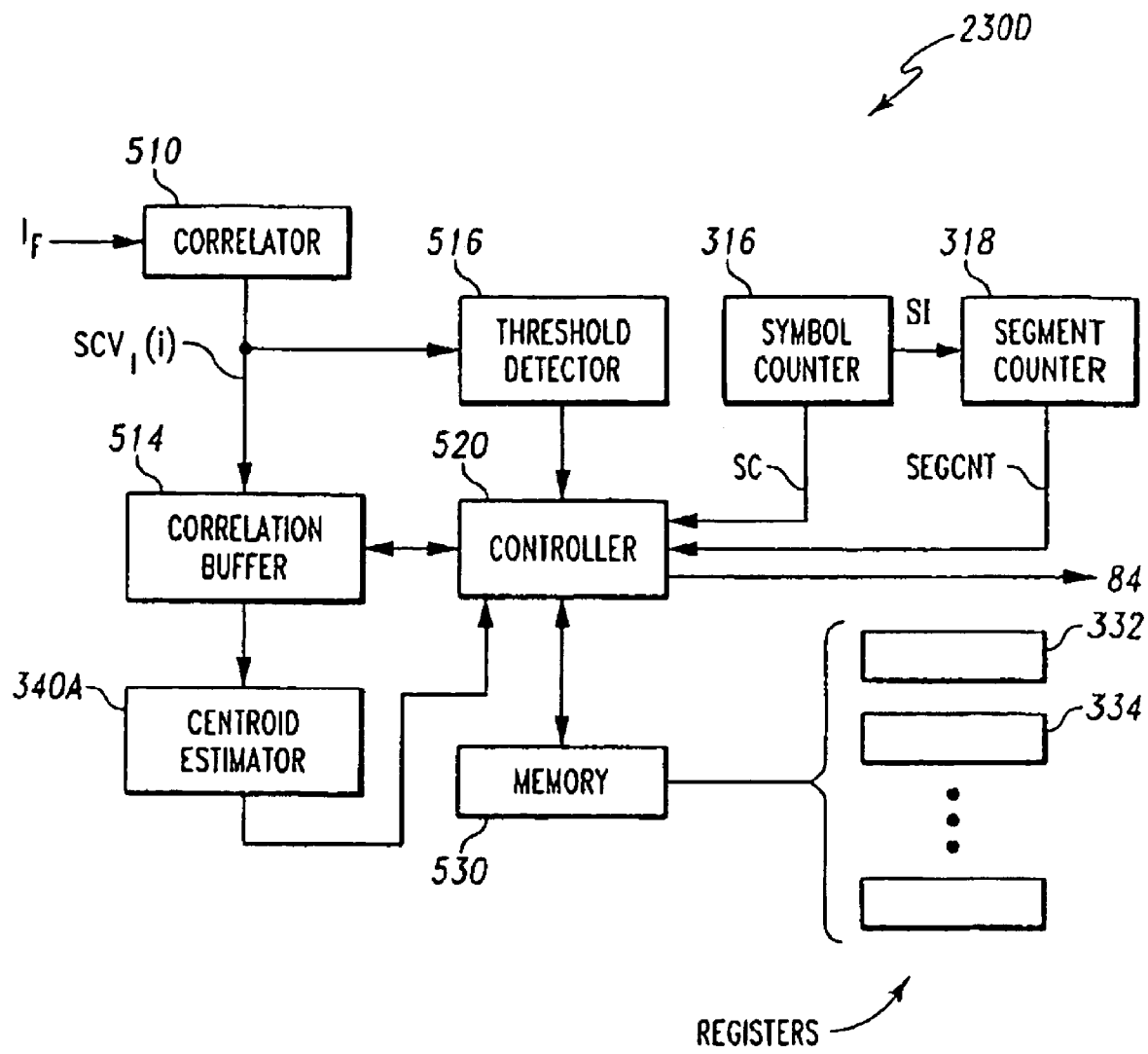
FIG. 18 is a block diagram of another embodiment of a frame sync based CDEU.

Still another embodiment of CDEU 230, illustrated in FIG. 18, is CDEU 230D, which is also adapted for an ATSC broadcast system, and estimates the delay of the channel by detecting the correlation strength of various received ghost signals with the frame sync sequence, PN511, within a desired sample window. CDEU 230D is similar in form and function to CDEU 230C except that it only operates only on the filtered in-phase baseband signal $I_F$ 76, whereas CDEU 230C uses both $I_F$ 76 and $Q_F$ 78. Thus, correlator 510 provides $SCV_I(i)$ to correlation buffer 514 and threshold detector 516. Since CDEU 230D does not include $SCV_Q(i)$, there is no need to calculate $MAG_{FS}(i)$. As will be understood by those skilled in the art, CDEU 230D is adapted to estimate the delay of the channel based on the magnitude of the frame sync with $I_F$, whereas CDEU 230C uses both $I_F$ and $Q_F$. Thus, correlation buffer 514 stores M(i)=$SCV_I(i)$. CDEU 230D functions similarly to CDEU 230C, except that CDEU 230D uses $SCV_I(i)$ in place of $MAG_{FS}(i)$. Thus:

CCE(PCDE)=$\Sigma_{WINDOW}$F($SCV_I(i)$,threshold)×Dist(PCDE,i).

Similar to before, filter 380 compares either the square or absolute value of $SCV_I(i)$ to the value of threshold and provides an output F($SCV_I(i)$,threshold)=|$SCV_I(i)$| for |$SCV_I(i)$|>threshold. Otherwise, filter 380 has an output F($SCV_I(i)$, threshold)=0 for |$SCV_I(i)$|≤threshold.

Alternatively, other embodiments of filter 380 filters $SCV_I(i)$ based upon the $SCV_I^2(i)$>threshold and provides an output $F(SCV_I(i),\text{threshold})=|SCV_I(i)|^2$ for $|SCV_I(i)|^2>\text{threshold}$. Otherwise, filter 380 has an output $F(SCV_I(i),\text{threshold})=0$ for $|SCV_I(i)|^2\leq\text{threshold}$.

After the delay of the channel is estimated, the values of FSEG and FSYM are adjusted to reflect the location of the correlation value corresponding to the delay of the channel. FSYM and FSEG are the values of symbol counter 315 (SC) and segment counter 318 (SEGCNT), respectively, corresponding to the symbol time that is located at the center of the windowing function. In some embodiments, controller 520 estimates the delay of the channel by searching for a PCDE value that minimizes the absolute magnitude of CCE. In other embodiments, controller 520 estimates the channel delay by searching for the PCDE value that causes a change in the sign of CCE(PCDE). Controller 520 increments PCDE until the sign of CCE(PCDE) changes. Controller 520 then selects the current PCDE value as the CDE value without regard to the absolute magnitude of CCE(PCDE).

Returning to FIG. 5, during normal operation, equalizer system 200 compensates for the channel intersymbol interference distortion by performing a filtering operation on the received signal. FFE 210 receives filtered in-phase baseband signal $I_F$ 76 as an input. The adder 212 sums the outputs of DFE 216 and FFE 210 to produce equalized data signal 88. Decision device 214 samples equalized data signal 88 and estimates the received symbol.

Initially, control system 54 adapts the coefficients of FFE to remove a portion of the associated channel distortion, and DFE 216 is disabled. After some period of time, the coefficients of FFE 210 are adapted sufficiently to remove a portion of the channel-related distortion and noise, which will allow the DFE to operate effectively. Following initial startup, DFE 216 is enabled and the coefficients of FFE 210 and DFE 216 are adapted using various techniques as would occur to one of ordinary skill in the art to remove the remaining portion of the channel distortion, such as LMS adaptation. The decision device 214 samples equalized data signal 88 to obtain a symbol-level representation of the received signal at the output of a decision slicer.

Decision device 214 provides equalizer feedback symbol output 92 to DFE 216 as an input. In some embodiments, for example, the decision device 214 is a decision slicer, and equalizer feedback symbol output 92 is the output of the decision slicer. In other embodiments, the decision device 214 corrects received symbol errors. In other embodiments of equalizer 200, wherein the decision device 214 includes a trellis decoder, equalizer feedback symbol output 92 may be selectively controlled. During initial system start equalizer feedback symbol output 92 is an uncorrected symbol output from decision device 214. In some embodiments including a decision device with a trellis decoder, the equalizer control system 54 may selectively control equalizer feedback symbol output 92 to provide the output of the trellis decoder or a stage in the trace memories of the trellis decoder. In still other embodiments, as shown in inventor's co-pending U.S. patent application Ser. Nos. 09/884,256 entitled "Combined Trellis Decoder and Decision Feedback Equalizer" and, 10/407,610 entitled "Transposed Structure for a Decision Feedback Equalizer Combined with a Trellis Decoder," the decision device 214 continuously updates the recovered symbol values used by the DFE as they are corrected by the trellis decoder. Additionally, in some embodiments, equalizer 200 is adapted as either a real or complex filter so as to be compatible with various modulation techniques.

Certain embodiments develop equalizer coefficients in a manner such that there is not a predefined or fixed center tap. Instead, the FFE output has a virtual center that does not correspond to a specific filter tap or combination of taps and all of the taps of the FFE are dynamically determined. The virtual center position is based on an estimate of the transmission channel delay.

Figure 19A:
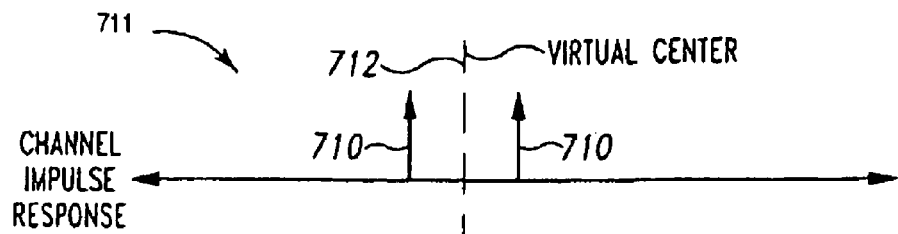
FIGS. 19A-19D show the relationship between the virtual center of the virtual channel, FFE output ($Z_{OUT}$), and the FFE and DFE taps and coefficients.

As illustrated in FIG. 19A, with reference to certain items in FIG. 5, one non-limiting example of a possible channel condition (depicted by the channel impulse response 711) has two equal strength ghost signals 710 and a virtual center 712 of the virtual channel. Equalizer 200 provides control system 54 a channel delay estimate that is an estimate of the delay of the channel present at the input of FFE 210 relative to the local time of system 20. Control system 54 uses the channel delay estimate to calculate an offset position for a generated training symbol sequence (e.g., a segment or frame sync sequence) by adding the channel delay measured at the FFE to the desired delay of the equalizer output. As described herein, control system 54 compares the received signal to the generated training signal. In some embodiments the training signal is a segment sync sequence. In other embodiments the generated training signal is a field/frame sync sequence or a combination of other synchronization signals expected in the received signal. In still other embodiments, control system 54 initially generates a segment sync sequence. After the equalizer has at least partially converged, control system 54 generates a frame/field sequence. Control system 54 adapts the equalizer coefficients to align the synchronization signals of the received signals with the desired temporal location as referenced by the generated synchronization signals. Illustratively, in some embodiments, system 20 aligns the output of equalizer 200 with a particular FFE tap and thereby adapts the equalizer to a particular channel condition.

Figure 20A:
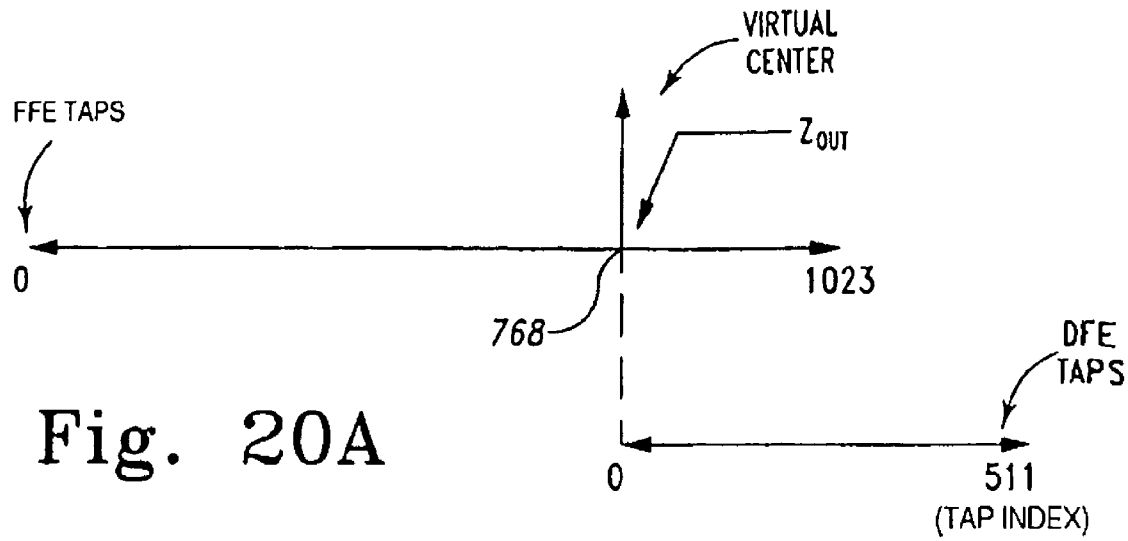
FIGS. 20A and 20B show the relationship between the virtual center of the virtual channel, FFE output ($Z_{OUT}$), and the FFE and DFE taps.
Figure 20B:
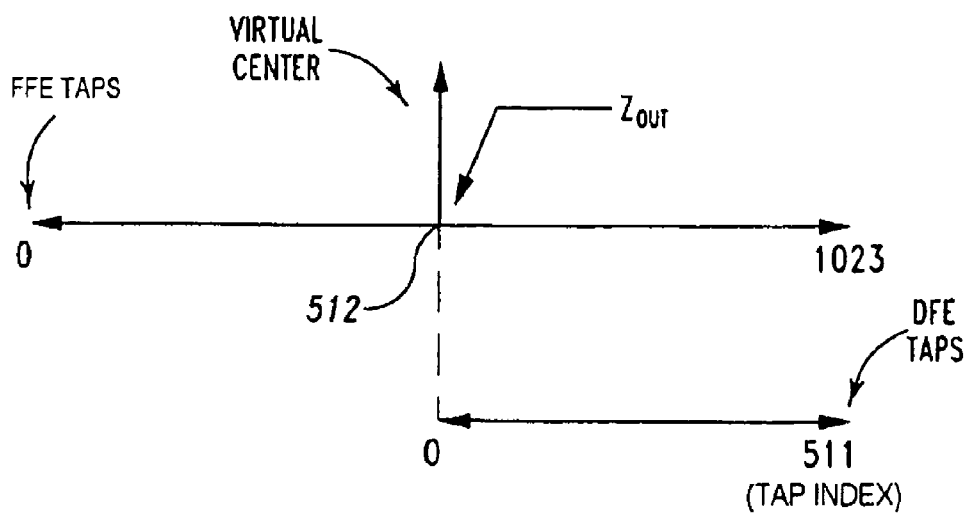

As illustrated in FIG. 20A, as a non-limiting example described with continuing reference to FIG. 5, one embodiment of equalizer 200 includes a FFE 210 with 1024 FFE taps and DFE 216 with 512 DFE taps. The individual taps of the DFE are referenced by a tap index. Control system 54 aligns the equalizer such that the output of equalizer 200 is temporally aligned with the 768% tap of the FFE 210. Moving the virtual center 712 to a later point in time improves the performance of the equalizer with respect to pre-ghost signals. As another non-limiting example, shown in FIG. 20B, one embodiment of the same system includes control system 54 aligning the equalizer 200 with the $512^{th}$ tap of FFE 210 such that the FFE works equally well on pre-ghost and post-ghost components in the channel.

Referring back to FIG. 19B with continuing reference to FIG. 5, FFE 210 is initially adapted to develop an output centered about the desired virtual center location 712, corresponding to FFE tap $Z_{OUT}$, based on the location of various synchronous signals within the received signal. Some embodiments of a system 20 are adapted to operate on an ATSC system and train the equalizer based upon the expected arrival time (SEGMENT_SYNC_OUT) of a segment sync signal. Control system 54 generates a segment sync signal as a training sequence when SC=SEGMENT_SYNC_OUT. The received signal is compared to the generated training sequence to develop an error signal used to adapt the coefficients of equalizer 200. Still other embodiments train the coefficients of equalizer 200 based on the expected arrival time (FRAME_SYNC_OUT) of an ATSC frame or field sync. Thus, similar to before, control system 54 generates a frame sync signal as a training sequence when SEGCNT=FRAME_SYNC_OUT. The received signal is compared to the generated frame sync training sequence to develop an error signal used to adapt the coefficients of equalizer 200. Still other embodiments of system 20 adapt the coefficients of equalizer 200 using both the frame sync and segment sync.

Illustratively, given a desired equalizer output location, $Z_{OUT}$, control system 54 positions the relative expected timing of a training signal derived from an ATSC segment sync at symbol counter time SEGMENT_SYNC_OUT=($Z_{OUT}$+ CDE) mod 832. Similarly, control system 54 calculates the value of the symbol counter 316 and segment counter 318 to position the relative timing of a training signal derived from an ATSC frame/field sync. Control system 54 causes the frame/field sync based training signal to occur when symbol counter 316 output SC equals SEGMENT_SYNC_OUT= ($Z_{OUT}$+CDE) mod 832 and segment counter 318 output SEG-CNT equals FRAME_SYNC_OUT=FSEG mod 313 segment times. By way of example, one embodiment of system 20 adapted for an ATSC standard broadcast has a 1024-sample-long correlation buffer 514 and uses both field/frame sync and segment sync to adapt the coefficients of equalizer 200. Assuming the desired output delay in FFE 210 is $Z_{OUT}$=768 with CDE=800 and FSEG=312, control system 54 calculates SEGMENT_SYNC_OUT=736 and FRAME_SYNC_OUT=312.

Additionally, in some embodiments of system 20, control system 54 adapts the filter coefficients of equalizer 200 over time to create the virtual center (representing the delay of the FFE 210) that moves in response to changing channel conditions. The equalizer constructs the virtual channel or signal composed of several signal transmission paths or ghost signals and is not necessarily aligned with one ghost signal. Thus, the stability of equalizer 200 is not dependent upon a single main ghost signal. This provides additional robustness in that the addition or deletion of any one multipath contributory signal does not cause the equalizer to become unstable or otherwise necessitate re-initialization or re-acquisition of the signal.

Figure 19B:
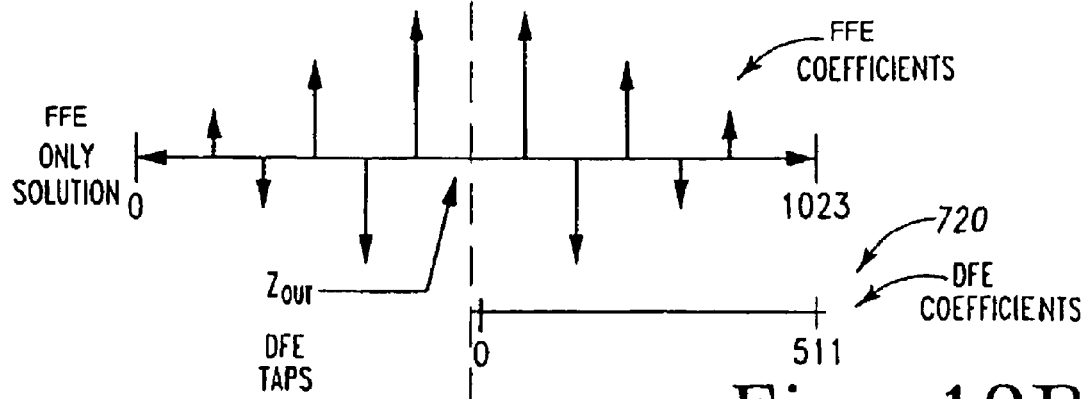
Figure 19C:
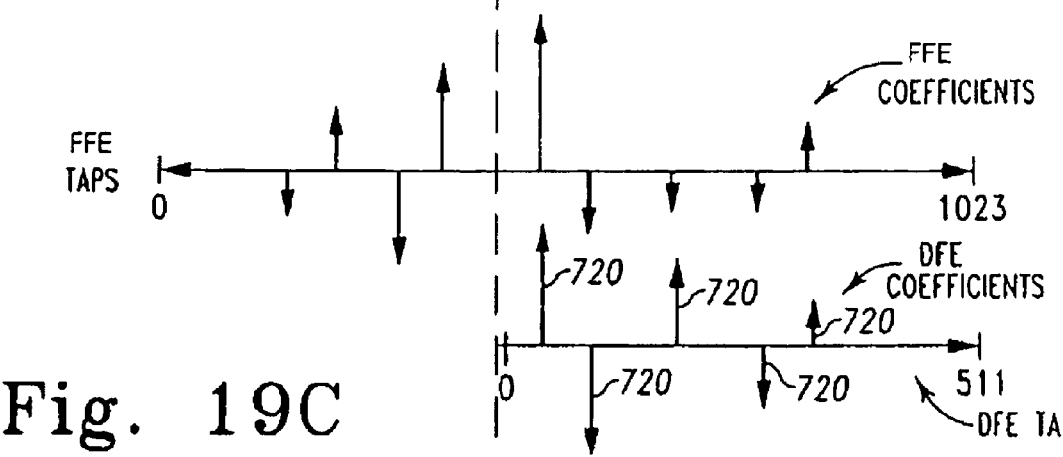

As illustrated in FIG. 19B, in some embodiments of equalizer 200, FFE 210 and DFE 216 operate in an overlapped region where a portion of the samples in the FFE 210 and DFE 216 are temporally related. Some alternative embodiments of equalizer 200 include a fractionally spaced FFE. In any event, the samples in FFE 210 and DFE 216 are temporally related but not necessarily temporally aligned to the same sample spacing. In other embodiments of equalizer 200, as shown in FIG. 19C, some embodiments of equalizer 200 include an overlapped region where all the samples in DFE 216 are temporally related to samples in FFE 210.

Figure 19D:
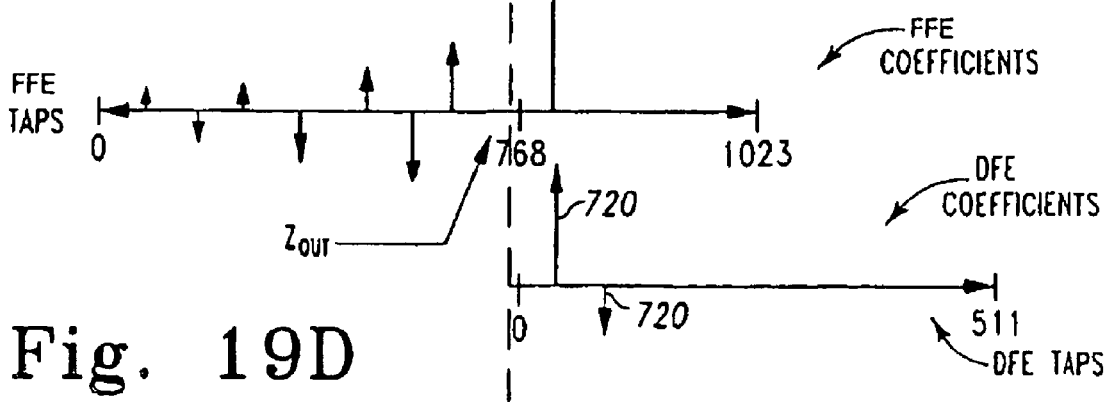

A shown in FIG. 19B, some embodiments control the equalizer operation whereby the coefficients of equalizer 200 are initially set to a predetermined value and the coefficients of FFE 210 are adapted to remove some portion of the channel distortion. Once the equalizer reaches a desired state of performance, the coefficients of DFE 216 are freely adapted. As illustrated in FIG. 19C, the coefficients of DFE 216 begin to grow, which typically yields decreases in the magnitudes of one or more of the coefficients of FFE 210. In some embodiments, as shown in FIG. 19D, the coefficients of DFE 216 grow as the coefficients of FFE 210 in the overlapped region tend towards zero magnitude. However, in other embodiments, the coefficients in FFE 210 have some remaining magnitude in the overlapped region. As will be understood by those skilled in the art, this operation automatically occurs as a result of the design of equalizer 200 and allows control system 54 to balance the noise and ghost performance of equalizer 200.

Control system 54 uses a variety of error evaluation techniques, as known by those skilled in the art, to adapt the equalizer coefficients to further remove the channel distortion. Illustratively, certain embodiments use a Reduced Constellation Algorithm (RCA) error calculation in combination with an LMS algorithm to adapt the equalizer coefficients. The RCA-LMS algorithm detects channel equalization error and evolves an improved equalizer response over time. Other embodiments use a data directed technique in combination with an LMS algorithm to adapt the equalizer coefficients. Still other embodiments use other blind equalization techniques for adapting the coefficients of the equalizer 200. Illustratively, some embodiments use a constant modulus algorithm (CMA) for blindly adapting the equalizer coefficients.

As described in greater detail hereinafter, control system 54 initially adapts (i.e., determines) the FFE coefficients. Once the FFE 210 of the equalizer 200 is operating, the system enables DFE 216 and further adapts the equalizer coefficients to remove any residual channel distortion and respond to changes in channel conditions. All of the DFE coefficients are initially set to zero and at least a portion of the coefficients of the DFE 216 evolve to non-zero values.

In other embodiments, FFE 210 uses fractionally spaced samples, and the system includes a technique for sub-sampling or sample rate converting the FFE output to provide proper temporally aligned data to the decision device 216. Illustratively, in some embodiments the sample rate conversion process occurs at the FFE output. In certain embodiments the FFE is fractionally spaced and produces "n" output samples for every decision device output. The FFE output is decimated n:1 to maintain proper sample data alignment. Alternatively, in other embodiments the equalizer downsamples the data at the input of the decision device. This allows other elements of system 20 to take advantage of the increased bandwidth associated with the fractionally spaced samples.

In certain other embodiments, the FFE output rate is not related to the decision device symbol rate by a simple integer multiple relationship. As a non-limiting example, the FFE output may provide 4/3 the number of samples than the decision device symbol rate. In certain embodiments, selecting the sample nearest to the decision device symbol sample time decimates the FFE output. In other embodiments, a sample rate converter is used to down-sample the FFE output. As non-limiting examples, the sample rate conversion process may occur at the FFE output, adder input or adder output. Thus, although not shown in FIG. 5, it will be understood that some embodiments of equalizer 200 include a fractionally spaced FFE wherein the samples in FFE 210 and DFE 216 are temporally related but not necessarily temporally aligned to the same sample spacing.

Still other embodiments of the equalizer, having temporally related samples in the FFE 210 and DFE 216, transfer the coefficient values from the FFE 210 to the DFE 216 to improve initial DFE startup and convergence. As an example, some systems first enable the FFE 210 and adapt the FFE coefficients to reduce the channel distortion. After the FFE coefficients are relatively stable or the bit error rate is reduced to a desired threshold level, the system enables the DFE 216 and the coefficients of the FFE 210 and DFE 216 are thereafter jointly adapted. The system then determines what temporally related sample the FFE 210 and DFE 216 should use based on the delay of the channel. The samples to be used by the FFE 210 and DFE 216 are adjusted as the delay of the channel moves.

Some embodiments of the present invention adaptively change the technique used to evolve the equalizer tap coefficients to remove channel interference and ghosts. Illustratively, certain embodiments adapt the equalizer tap coefficients in FFE 210 and DFE 216 to minimize the least mean square (LMS) error between the equalizer output and decision device output. This technique evolves the equalizer tap coefficients over time in response to changing channel or system conditions. Illustratively, some adaptation algorithms initially use an RCA technique to drive the LMS adaptation algorithm, then switch to a decision directed technique or combination of different adaptation strategies dependent upon the channel conditions prior to applying a decision directed equalizer coefficient adaptation process.

Some embodiments of equalizer 200 improve the stability of the equalizer by limiting the magnitudes of certain DFE coefficients. With continuing reference to FIG. 19C, control system 54 (FIG. 5) limits the magnitudes of the DFE coefficients as a function of the tap index of the tap with which the coefficient is associated. In some embodiments, the range of values of the DFE coefficients is divided into regions. Those taps with smaller tap indices (i.e., most proximate to $Z_{out}$) have a first pre-set range of magnitude limits. A second group of DFE taps have a second pre-set range of allowable magnitudes. Finally, those DFE taps with the largest tap indices (i.e., those furthermost from $Z_{OUT}$) have a third pre-set range of magnitude limits. As a first non-limiting example, assuming the coefficients have a maximum magnitude of 1, those taps most proximate to $Z_{OUT}$ have a maximum coefficient magnitude of 0.85. The second group of DFE taps, located farther from $Z_{OUT}$, has a maximum coefficient magnitude of 0.95. Finally, those DFE taps furthermost from $Z_{OUT}$ have a maximum coefficient magnitude of 1.

In some embodiments, the maximum coefficient magnitude of those taps most proximate to $Z_{OUT}$ can have a range between 0.75 and 0.85. In other embodiments, the maximum coefficient magnitude of the second group of taps, located between the furthermost taps and those proximate to $Z_{OUT}$, have a range between 0.925 and 0.95. In still other embodiments, those DFE taps furthermost from $Z_{OUT}$ have a maximum coefficient magnitude ranging from 0.95 to 1.

It will be appreciated that the DFE taps can be broken into fewer or more groups and that the relative maximum coefficient magnitudes are dependent upon the number of DFE taps and their tap indices (location relative to $Z_{OUT}$). Illustratively, in some embodiments, only a portion of the DFE taps is limited. It will also be appreciated that in those embodiments, limiting the magnitudes of the DFE coefficients with smaller tap indices reduces the impact of decision errors made by the trellis decoder.

Other embodiments of equalizer 200 apply a drain function to the coefficients of the FIFE and DFE. In some embodiments, the drain function is a constant drain and reduces the magnitude of the coefficient by a controlled amount on a regular basis. In other embodiments, the drain function is non-linear and tends to eliminate smaller coefficient values more rapidly than larger coefficient values. In still other embodiments, the drain function is proportional and reduces the coefficient magnitudes fractionally on a regular basis.

Some embodiments of the equalizer 200 apply a drain function, wherein the controlled amount is varied in accordance with the tap index so that, for example, magnitudes of coefficients of DFE taps with higher tap indices are reduced at faster rate (or, alternatively, by a greater amount) than magnitudes of coefficients of taps with smaller tap indices. The variation of the controlled amount may be a function of the tap index or the taps may be grouped by ranges of tap indices and a separate controlled amount may be applied to each group. In some other embodiments of the equalizer 200, the controlled amount may be varied in accordance with the operational stage of the equalizer, so that, for example, the magnitudes of coefficients may be reduced by a smaller controlled amount when the equalizer is starting up and then reduced by a larger controlled amount when the equalizer is operating in a steady state mode. Similarly, the controlled amount may be varied in accordance with the performance of the equalizer. In this case, for example, a smaller controlled amount may be used to reduce the magnitudes of the coefficients when the SNR is relatively low and a larger controlled amount may be used as the SNR improves. In still further embodiments, taps further from the virtual center of the FFE are drained at a faster rate than FFE taps closer to the virtual center.

Figure 21:
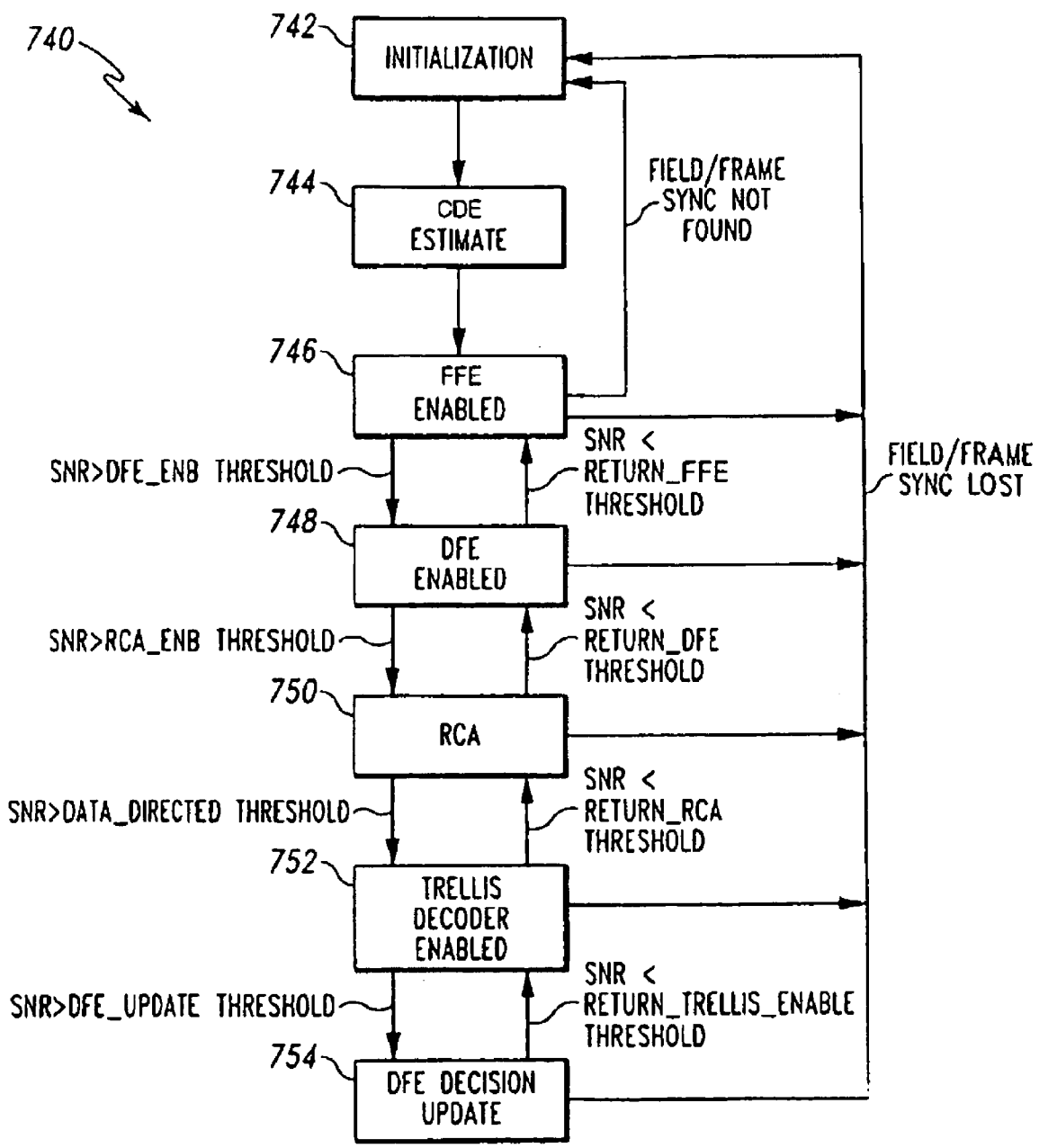
FIG. 21 is a flow diagram illustrating operation of the system 20 of FIG. 3 for developing an overlapped equalizer structure or an equalizer without a fixed center tap.

As a non-limiting example, and with reference to FIGS. 5, 6, and 21, some embodiments of system 20 include a technique, embodied by a system 740 the operation of which is shown in FIG. 21, for developing an overlapped equalizer structure or an equalizer without a reference or center tap. At 742, "Initialization," control system 54 initializes the various portions of system 20 as will be understood by those skilled in the art. Control system 54 then transitions system 740 to 744.

At 744, "CDE Estimate," system 20 estimates the delay associated with the transmission channel and determines the values of SEGMENT_SYNC_OUT and FRAME_SYNC_OUT. System 20 fixes the delay offset of the training sequence relative to its own system clock, symbol counter 316, and sequence counter 318. As a non-limiting example, in some embodiments system 20 uses a segment sync technique for determining the CDE. In other embodiments system 20 uses a frame sync technique for determining the CDE. In still other embodiments system 20 uses a combination of segment sync and frame sync techniques to determine the CDE. Control system 54 then transitions system 740 to 746.

At 746, "FFE Enable," control system 54 enables the FFE portion of the equalizer of system 20. The DFE portion of the equalizer of system 20 is disabled. Control system 54 develops the FFE coefficients dynamically using an adaptation error signal generated based on the desired or expected arrival of the synchronization signal embedded within the transmission. Illustratively, in some embodiments of system 20, which include equalizer 200A, control system 54 generates (or causes to be generated) synchronization signals at the desired or expected temporal location based on the CDEU 230 estimate of the CDE. Illustratively, control system 54 generates a segment sync training signal for adapting equalizer 20 when SC=SEGMENT_SYNC_OUT.

Control system 54 then creates an adaptation error signal by subtracting equalized data signal 88 from the generated synchronization signals generated by control system 54. Control system 54 chooses the portion of the adaptation error based upon a windowing technique to adapt the coefficients of the equalizer. The window chosen depends upon the operational state of system 20. For example, in some embodiments control system 54 uses the segment sync signal to adapt the FFE coefficients during initial system startup. In other embodiments, control system 54 uses the field/frame sync signal to adapt the FFE coefficients during initial system startup. In still other embodiments, control system 54 first uses the segment sync signal to adapt the FFE coefficients, and thereafter transitions to use the field/frame sync signal in combination with the segment sync signal.

As discussed later, once reliable synchronization is obtained, control system 54 adapts the FFE coefficients based upon the desired or expected temporal locations of the synchronization signals as determined by the CDEU estimate of the CDE. Control system 54 generates synchronization signals at the desired or expected temporal location based upon the CDEU estimate of the CDE. Control system 54 then creates an adaptation error signal by subtracting the received signal from a generated synchronization signal. Control system 54 then uses the adaptation error signal to adapt the coefficients of the FFE based upon an adaptation error signal.

Illustratively, in some embodiments, control system 54 generates an adaptation difference signal by subtracting the received signal from a receiver generated segment sync signal. Some embodiments generate an adaptation difference signal by subtracting the received signal from a receiver generated frame sync signal. Still other embodiments first adapt the FFE coefficients based upon the expected arrival of the segment sync signal. After a particular level of performance is reached, such as detecting the presence of a reliable frame sync signal, control system 54 generates the difference signal generated using both a segment sync signal and field/frame sync signal.

In some embodiments, control system 54 transitions system 740 operation to 742 if reliable synchronization signals are not detected after some period of time. Similarly, in some embodiments, control system 54 transitions system 740 to 742 if it detects a loss of the field/frame sync signal. Otherwise, control system 54 transitions system 740 to 748 when the equalizer output SNR performance (based upon the SNR of the received synchronization signals) is greater than a predetermined DFE_ENB Threshold. Hysteresis may be provided by selecting DFE_ENB Threshold>RETURN_FFE Threshold.

At 748, "DFE Enabled," control system 54 enables the DFE portion 216 of the equalizer 200 that acts as an infinite impulse response (IIR) filter. Control system 54 uses the adaptation error signal generated based on the segment sync signal and the field/frame sync signal to adapt the equalizer's FFE and DFE coefficients. The adaptation error signal generation is similar to that used in "FFE Enabled" 746. The data input into the DFE is quantized to a level depending upon the precision available through the DFE delay path.

Control system 54 transitions system 740 to 742 if it detects the loss of the field/frame sync signal. Otherwise, control system 54 transitions system 740 to 750 when the equalizer output SNR performance is greater than a predetermined RCA_ENB Threshold, where the signal to noise performance is based upon the SNR of the received synchronization signals. However, in some embodiments, control system 54 transitions system 740 to 746 when the equalizer output SNR performance falls below a RETURN_FFE Threshold. Hysteresis may be incorporated by selecting RCA_ENB Threshold>RETURN_DFE Threshold>DFE_ENB Threshold. Some embodiments use other techniques known in the art such as averaging filters and continuity counters to improve the performance of the system.

At 750, "RCA," the FFE and the DFE coefficients are updated using the adaptation error signal based on a reduced constellation algorithm (RCA). The RCA assumes the input data are 2-leveled, so the reference signal generated locally is a binary slice of the incoming data. Illustratively, in some embodiments of system 20 that include equalizer 200A, control system 54 generates the adaptation error signal by subtracting equalized data signal 88 from adaptation symbol decision 94 of decision device 214. Control System 54 configures adaptation symbol decision 94 to provide the binary slice of the incoming data from the equalized data signal 88. The binary slicer maps an 8-VSB signal with normalized levels at −7, −5, −3, −1, +1, +3, +5, +7 to −5.25 and +5.25. In some embodiments, slicing is done on a two level basis. In other embodiments slicing is accomplished on a four level basis. Still other embodiments like CMA use the kurtosis of the signal constellation. Finally, other embodiments use other reduced constellation techniques known to those skilled in the art. The adaptation error signal is used to update both the FFE and the DFE coefficients. As before, the data into the DFE is quantized sliced data (8- or 16-level decision slicer) and the DFE acts as an IIR filter.

In some embodiments, control system 54 adapts the FFE and DFE coefficients using only an RCA algorithm on the received data. In other embodiments, control system 54 compares the received synchronization signals to those generated by control system 54. In still other embodiments, control system 54 weights the effects of the RCA and synchronization signal-based adaptation techniques depending upon system performance or operational state.

If control system 54 detects the loss of the field/frame sync signal, control system 54 transitions system 740 to 742. Otherwise, control system 54 transitions system 740 to 752 when the equalizer output SNR performance becomes greater than DATA_DIRECTED Threshold. In some embodiments, the technique for calculating SNR includes examining both received synchronization signals and data signals. If, instead of improving, the system SNR performance falls below the RETURN_DFE Threshold, then control system 54 transitions system 740 to 748. Hysteresis may be incorporated by selecting DATA_DIRECTED Threshold>RCA_ENB Threshold>RETURN_RCA Threshold.

At 752, "Trellis Decoder Enabled," the FFE and DFE taps are updated using an adapted error signal generated based on the trellis decoder output. Similar to before, control system 54 configures adaptation symbol decision 94 to provide an output from the trellis decoder. Control system 54 uses a decision directed LMS technique for adapting the equalizer coefficients. In some embodiments, the adaptive error signal is determined by looking at the output of trellis decoding of the 8-VSB signal. In other embodiments, the adaptive error signal is determined by examining the output of one of the trellis decoder stages. Similar to before, the data input into the DFE is quantized sliced data to a predetermined number of levels, and the DFE acts as an IIR filter.

As above, control system 54 transitions system 740 to 742 if it detects the loss of the field/frame sync signal. Otherwise, control system 54 transitions system 740 to 754 when the equalizer output SNR performance becomes greater than DFE_UPDATE Threshold. If, instead of improving the SNR performance of the system falls below the RETURN_RCA Threshold, then control system 54 transitions system 740 to 752. Hysteresis may be incorporated by selecting DFE_UPDATE Threshold>RETURN_RCA Threshold>RCA_ENB Threshold.

At 754, "DFE Decision Update," system controller 54 updates the FFE and DFE coefficients using the adaptation error signal generated based on the trellis decoded output. In addition, controller 54 configures the decision device of the equalizer to provide trellis-decoded data into the DFE 216. Illustratively, in some embodiments of system 20, which include equalizer 200A, control system 54 selectively controls equalizer feedback signal 92 to provide trellis decoder corrected data to DFE 216. In other embodiments, control system 54 selectively controls equalizer feedback signal 92 to update DFE 216 with corrected data from the various stages of the trellis decoder. Thus, DFE 216 initially receives the decision slicer output of decision device 214. The trellis decoder portion of decision device 214 then updates the DFE received decisions as corrections become available. Still another embodiment operates by providing trellis decoder updated values from intermediate stages of the trellis decoder to stages of the DFE as described in co-pending U.S. patent application Ser. Nos. 10/407,610, entitled "Transposed Structure for a Decision Feedback Equalizer Combined with a Trellis Decoder," and 09/884,256, entitled "Combined Trellis Decoder and Decision Feedback Equalizer."

As above, control system 54 transitions system 740 to 742 if it detects the loss of the field/frame sync signal. Otherwise, control system 54 transitions 740 to 752 if the equalizer output SNR performance falls below the RETURN_TRELLIS_ENABLE Threshold.

Some embodiments of system 20 use an average magnitude of the adaptation error signal in place of SNR. Other embodiments of system 20 use the bit error rate detected by a trellis decoder. Still other embodiments of system 20 use the bit error rate of FEC symbol decision 80. Still other embodiments, similar to U.S. Pat. No. 6,829,297 also modify the adaptation process depending upon performance metrics developed by the trellis decoder. It will be understood that system 740 may be adapted for systems without trellis decoding by omitting certain steps. Likewise, the transition point may be adjusted for optimum performance depending upon the operating conditions and application. In addition to hysteresis provided by the transition threshold levels, some embodiments of system 20 also include a confidence counter, averaging filter, or similar transition smoothing technique to improve stability and counteract momentary shifts in system performance.

It will be understood that in some embodiments system 740 can be simplified by eliminating intermediate stages between 746 and 754. Illustratively, embodiments not having a trellis decoder or not including as a feature the ability of the trellis decoder to update the sample within the DFE do not need stages 752 or 754.

Figure 22:
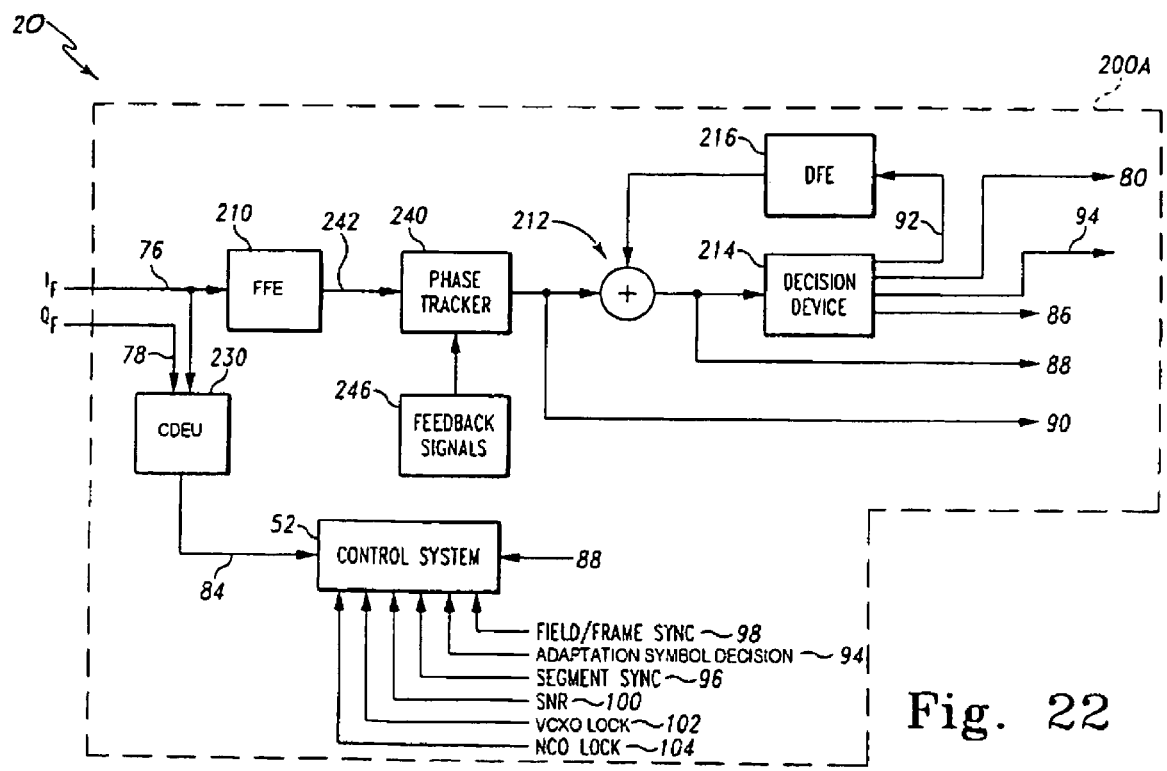
FIG. 22 is a block diagram of an embodiment of an overlapped equalizer with a phase tracker.

Another embodiment of equalizer 46, illustrated as equalizer 200A in FIG. 22, is similar in form and function to equalizer 200 except for the addition of a phase tracker 240 between the output of FFE 210 and the first input of adder 212. As shown in FIG. 22, phase tracker 240 receives an input from FE 210 and feedback signals 246, and provides an output to adder 212. As described later in detail, phase tracker 240 receives a variety of feedback signals 246. The feedback signals 246 may include one or more signals of interest generated by or within system 20. Illustratively, in some embodiments of system 20 the feedback signals 246 include equalized data signal 88. In yet other embodiments, feedback signals 246 include equalized data signal 88 and synchronization symbol decision 86. In still other embodiments, feedback signals 246 include intermediate equalizer signal 90, equalized data signal 88 and equalizer feedback signal 92. As described later, phase tracker 240 uses the feedback signals to develop a phase correction vector that is used to correct the output of FFE 210.

Figure 23:
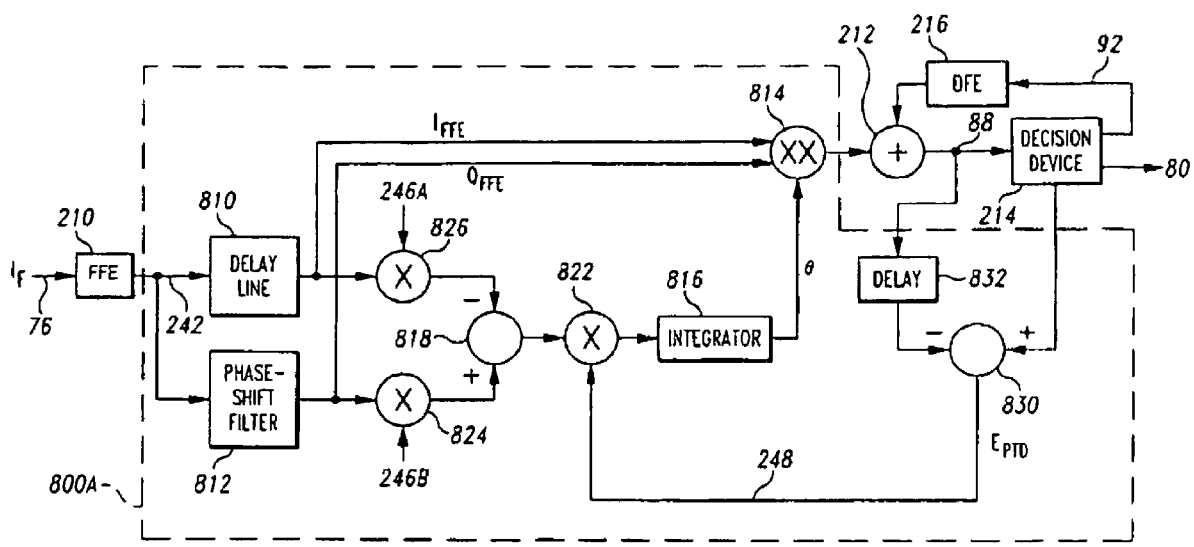
FIG. 23 is a block diagram of an embodiment of an overlapped equalizer with a phase tracker.

One embodiment of phase tracker 240 in equalizer 200A is phase tracker 800A as illustrated in FIG. 23, which receives input signal 242 from FFE 210 and feedback signals 246A and 246B. Feedback signal 246A is the sine of the estimated phase error (i.e., sin θ) present in the received signal. Similarly, feedback signal 246B is the cosine of the estimated phase error (i.e. cos θ) present in the received signal. The output of phase tracker 800A is an input of adder 212 of equalizer 200A.

Phase tracker 800A includes delay line 810, phase-shift filter 812, rotator 814, integrator 816, subtractor 818 and multipliers 822, 824 and 826. Phase tracker 800A produces phase tracker decision error signal ($E_{PTD}$) 248 by taking the difference between an output of the decision device 214 and the corresponding equalized data signal 88. As illustrated in FIG. 23, at least one embodiment includes subtractor 830 and delay element 832. The input of delay element 832 receives equalized data signal 88, which is the output of adder 212. The negating and positive inputs of subtractor 830 respectively receive the delayed equalized data signal 88 from delay element 832 and an output of decision device 214. The output of subtractor 830 is phase tracker decision error signal ($E_{PTD}$) 248. Thus, the phase tracker decision error signal ($E_{PTD}$) 248 is developed by taking the difference between the output of decision device 214 and the appropriately delayed equalized data signal 88. As such, the phase tracker decision error signal ($E_{PTD}$) 248 is the error between the decision output and the input that generated that output. Delay element 832 provides sufficient signal propagation delay to allow for the correct temporal alignment of inputs into subtractor 830 and varies depending on the nature of the output of decision device 214.

Illustratively, some embodiments develop phase tracker decision error signal ($E_{PTD}$) 248 by subtracting an appropriately delayed equalized data signal 88 from the decision slicer output of decision device 214. Still other embodiments develop the phase tracker decision error signal ($E_{PTD}$) 248 by subtracting an appropriately delayed equalized data signal 88 from a trellis decoder output of decision device 214. Yet other embodiments develop the phase tracker decision error signal ($E_{PTD}$) 248 by subtracting an appropriately delayed equalized data signal 88 from an intermediate output stage in a trellis decoder of decision device 214. Certain embodiments develop phase tracker decision error signal ($E_{PTD}$) 248 by subtracting appropriately equalized data signal 88 from the adaptation symbol decision 94 of decision device 214. In still other certain embodiments, control system 52 selects the output of decision device 214 used to create phase tracker decision error signal 248 depending upon the state of the system, the equalizer and/or channel conditions.

Phase tracker 800A develops a phase error feedback signal as will be understood by those skilled in the art. Delay line 810 and phase-shift filter 812 receive input signal 242, which is the output of FFE 210. Delay line 810 provides an output to the in-phase signal input of rotator 814 and multiplier 826. Multiplier 826 also receives feedback signal 246A, sin θ. Phase-shift filter 812 provides an output to both the quadrature signal input of rotator 814 and multiplier 824. Multiplier 824 also receives feedback signal 246B, cos θ.

In some embodiments, phase-shift filter 812 includes a 90-degree phase-shift filter or quadrature filter. In other embodiments, phase-shift filter 812 includes a Hilbert filter or truncated Hilbert filter. In still other embodiments, phase-shift filter 812 is a FIR filter of some desired length with filter tap coefficients optimized to minimize the mean square error (MMSE) of the filter output for a channel that is 90-degrees phase-shifted and a particular receiver acquisition threshold. Illustratively, some embodiments of phase-shift filter 812 are a FIR filter that has a length of 31 samples and MMSE-optimized filter tap coefficients for a VSB or offset-QAM receiver acquisition SNR threshold of 15.1 dB. Other embodiments of phase-shift filter 812 include filter tap values optimized for a receiver acquisition SNR threshold of less than 15.1 dB. At least one embodiment of the present invention includes phase-shift filter 812 coefficients optimized for an acquisition SNR threshold of 15 dB.

The negating and positive inputs of subtractor 818 receive the outputs of multiplier 826 and multiplier 824 respectively. Subtractor 818 provides a phase error estimate to multiplier 822, which also receives phase tracker decision error signal ($E_{PTD}$) 248 from subtractor 830. Integrator 816 receives the output of multiplier 822 and provides a phase correction signal θ to the input of rotator 814. Finally, rotator 814 provides a phase-corrected output to adder 212 of equalizer 200A.

In some embodiments, phase tracker 800A receives the output of FFE 210 as a real or in-phase signal $I_{FFE}$. The output of FFE 210 is passed through phase-shift filter 812 to create a corresponding imaginary or quadrature signal $Q_{FFE}$.

The output of FFE 210 is also passed through delay line 810 to insure that $I_{FFE}$ and $Q_{FFE}$ are temporally aligned and correspond to the same FFE 210 output. $I_{FFE}$ and $Q_{FFE}$ can be thought of as a vector pair that has a magnitude and phase. However, it will be understood that some embodiments of FFE 210 receiving $I_F$ and $Q_F$ will output both a real and phase-quadrature component without need of delay line 810 and phase-shift filter 812. Phase tracker 800A minimizes the phase error present at the output of equalizer 200A by rotating $I_{FFE}$ and $Q_{FFE}$. Rotator 814 multiples $I_{FFE}$ and $Q_{FFE}$ by a phase correction vector, $e^{j\theta}$, based upon the phase correction signal θ provided by integrator 816 where the input to integrator 816 is $E_{PTD} \cdot (Q_{FFE} \cos\theta - I_{FFE} \sin\theta)$ and $E_{PTD}$ is the phase tracker decision error signal temporally related to the feedback signals 246A and 246B. Thus, the input to the integrator is a decision directed phase error signal related to a particular output of FFE 210. As such, the output of integrator 816 is phase correction signal θ, where at sample index i, $\theta_i = \theta_{i-1} + \mu \cdot E_{PTD} \cdot (Q_{FFE} \cos\theta_{i-1} - I_{FFE} \sin\theta_{i-1})$ where μ is some update step size parameter. It can be appreciated that in some embodiments the range of values for θ is limited.

Rotator 814 rotates the vector pair $I_{FFE}$ and $Q_{FFE}$ using the phase correction signal θ. In some embodiments rotator 814 includes a complex multiplier, sine look-up table and cosine look-up table. Rotator 814 translates the received phase correction signal θ into the phase-correction vector $e^{j\theta}$, which is used to rotate $I_{FFE}$ and $Q_{FFE}$. Rotator 814 produces a phase-corrected in-phase or real signal $I_{PT}$. In some embodiments rotator 814 also produces a quadrature or imaginary signal $Q_{PT}$ (not shown). As will be understood by those skilled in the art, these illustrations are by way of example and other delay elements, not shown in FIG. 23, will be included in some embodiments to maintain the correct temporal relationships between the various signals.

The phase error feedback signal is created by estimating the phase error present in a stage of equalizer 200A (see FIG. 22). Some embodiments of phase tracker 800A estimate the phase error present in one of the equalizer output signals depending upon the operational mode of the equalizer. Illustratively, in some embodiments the phase error estimate is derived from the output of FFE 210. In other embodiments the phase error estimate is derived from the output of adder 212 of equalizer 200A. In still other embodiments the phase error estimate is derived from an output of phase tracker 800A. In yet other embodiments, the signal used to derive the phase error estimate is selected by control system 54 depending upon equalizer performance.

Figure 24:
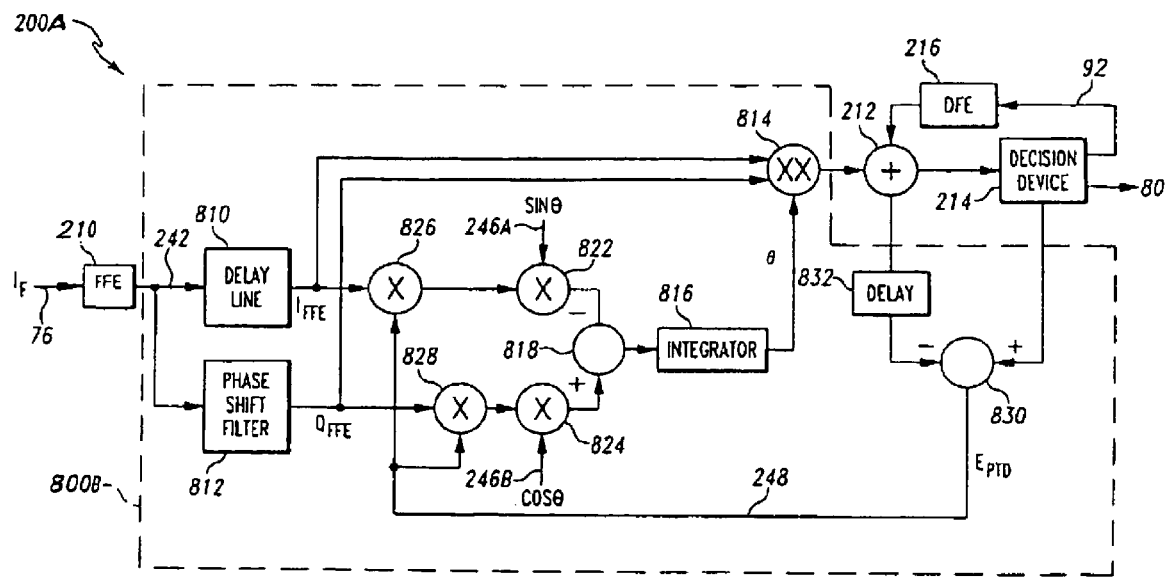
FIG. 24 is a block diagram of an embodiment of an overlapped equalizer with a phase tracker.

Another embodiment of phase tracker 240 is shown in FIG. 24 as 800B. Phase tracker 800B is operationally similar to phase tracker 800A except that signals $I_{FFE}$ and $Q_{FFE}$ are first multiplied by the phase tracker decision error signal 248. As such, phase tracker 800B includes multiplier 822 in a different position, and further includes an additional multiplier 828.

Multiplier 826 receives as inputs $I_{FFE}$ and phase tracker error signal ($E_{PTD}$) 248. Multiplier 822 receives as inputs feedback signal 246A (sin θ) and the output of multiplier 826. Multiplier 828 receives as inputs $Q_{FFE}$ and phase tracker error signal ($E_{PTD}$) 248. Multiplier 824 receives as inputs feedback signal 246B (cos θ) and the output of multiplier 828. The negating and positive inputs of subtractor 818 receive the outputs of multipliers 822 and 824 respectively, and the difference is provided as an output to integrator 816. As in phase tracker 800A, integrator 816 receives the output of subtractor 818, and provides phase correction signal θ to the input of rotator 814. Finally, rotator 814 provides a phase-corrected output to adder 212 of equalizer 200A.

The phase correction signal θ of phase tracker 800B for sample index i is $\theta_i = \theta_{i-1} + \mu \cdot E_{PTD} \cdot (Q_{FFE} \cos\theta_{i-1} - I_{FFE} \sin\theta_{i-1})$ where the feedback signal 246A, sin θ, and feedback signal 246B, cos θ, are related to the phase tracker decision error signal $E_{PTD}$. As before, rotator 814 multiplies the incoming data vectors $I_{FFE}$ and $Q_{FFE}$ by the phase correction vector $e^{j\theta}$ and thereby corrects the phase of the output of FFE 210. As will be understood by those skilled in the art, these illustrations are by way of example only and other delay elements, not shown in FIG. 24, are used in various embodiments to maintain the correct temporal relationships between the various signals.

Figure 25:
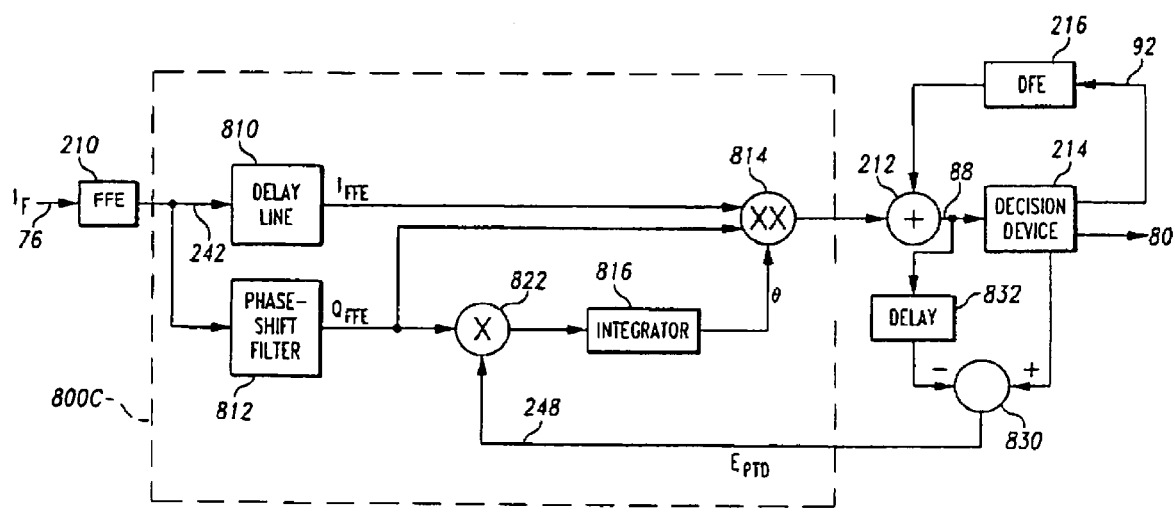
FIG. 25 is a block diagram of an embodiment of an overlapped equalizer with a phase tracker.

Another embodiment of phase tracker 240, in equalizer 200A, is phase tracker 800C adapted for VSB and offset QAM modulation systems. As illustrated in FIG. 25, phase tracker 800C receives input signal 242 from FFE 210, and phase tracker decision error signal ($E_{PTD}$) 248. The output of phase tracker 800C connects to the input of adder 212 of equalizer 200A. As shown in FIG. 25 phase tracker 800C employs similar techniques as used in phase tracker 800A to generate the phase tracker decision error signal ($E_{PTD}$) 249.

Similar to phase tracker 800A, phase tracker 800C also includes delay line 810, phase-shift filter 812, rotator 814, integrator 816 and multiplier 822. The inputs of delay line 810 and phase-shift filter 812 receive input signal 242 from FFE 210 and have as outputs $I_{FFE}$ and $Q_{FFE}$ respectively. The output of delay line 810 provides $I_{FFE}$, which is a delayed version of input signal 242, to the in-phase signal input of rotator 814. The output of phase-shift filter 812 provides $Q_{FFE}$ to the quadrature signal input of rotator 814 and multiplier 828. As a result, $Q_{FFE}$ is used as a phase error signal. Multiplier 822 also receives the phase tracker decision error signal ($E_{PTD}$) 248 and provides the product as an input to integrator 816. Integrator 816 provides phase correction signal θ to the input of rotator 814.

Similar to the previously described phase trackers, passing the output of FFE 210 through delay line 810 and phase-shift filter 812 creates the signals $I_{FFE}$ and $Q_{FFE}$. Multiplier 822 multiplies $Q_{FFE}$ by the phase tracker decision error signal 248 to produce a decision directed phase error estimate, which is then integrated by integrator 816 to form phase correction signal at sample index i, $\theta_i = \theta_{i-1} + \mu \cdot (Q_{FFE}) \cdot (E_{PTD})$. Rotator 814 receives θ and develops phase correction vector $e^{j\theta}$. Rotator 814 multiplies the vector pair $I_{FFE}$ and $Q_{FFE}$ by the phase correction vector $e^{j\theta}$ to produce the phase-corrected real or in-phase output. As will be understood by those skilled in the art, these illustrations are by way of example. Other delay elements (not shown in FIG. 25), are used in some alternative embodiments to maintain the correct temporal relationships between the various signals depending upon the latency in developing the phase tracker decision error signal. Illustratively, it will be understood that the phase error estimate and phase tracker decision error signal 248 correspond to the output of FFE 210. However, since the output of multiplier 822 is integrated to obtain an average phase correction signal, in some embodiments the phase correction signal $e^{j\theta}$ applied to $I_{FFE}(n)$ and $Q_{FFE}(n)$ may not include a contribution from $I_{FFE}(n)$ and $Q_{FFE}(n)$ it will be understood that $I_{FFE}(n)$ and $Q_{FFE}(n)$ are the $n^{th}$ $I_{FFE}$ and $Q_{FFE}$ samples.

Figure 26:
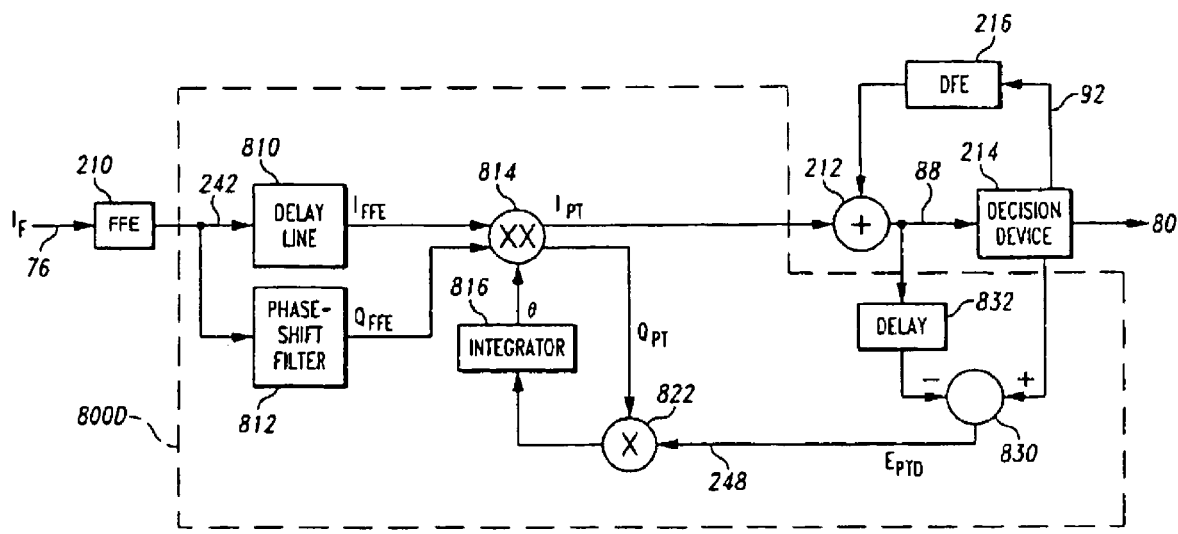
FIG. 26 is a block diagram of an embodiment of an overlapped equalizer with a phase tracker.

Another embodiment of phase tracker 240 in equalizer 200A is phase tracker 800D, which is also adapted for VSB and offset QAM modulation systems. As illustrated in FIG. 26, phase tracker 800D receives input signal 242 from FFE 210, and phase tracker decision error signal ($E_{PTD}$) 248 and provides an output to adder 212 of equalizer 200A. As shown in FIG. 26, phase tracker 800D uses similar techniques as previously described in relation to phase tracker 800A to generate the phase tracker decision error signal ($E_{PTD}$) 248. Phase tracker decision error signal ($E_{PTD}$) 248, shown as part of phase tracker 800D, is similar in form and function to that used in phase tracker 800A.

Similar to phase tracker 800C, phase tracker 800D also includes delay line 810, phase-shift filter 812, rotator 814, integrator 816 and multiplier 822. As with the previously described phase trackers, the inputs of delay line 810 and phase-shift filter 812 receive input signal 242 from FFE 210, and produce $I_{FFE}$ and $Q_{FFE}$ at their respective outputs. Rotator 814 receives $I_{FFE}$ and $Q_{FFE}$ at its in-phase and quadrature inputs, respectively. Rotator 814 produces a phase-corrected in-phase or real signal $I_{PT}$ and quadrature or imaginary signal $Q_{PT}$. Adder 212 of equalizer 200A receives the real signal $I_{PT}$ as an input. Multiplier 822 receives the quadrature $Q_{PT}$ of rotator 814 and phase tracker decision error signal ($E_{PTD}$) 248. Multiplier 822 provides the product of $Q_{PT}$ and $E_{PDT}$ to integrator 816. Integrator 816 integrates the output of multiplier 822 to produce phase correction signal θ as an output to the correction vector input of rotator 814.

Phase tracker 800D uses the product of $E_{PTD}$ and $Q_{PT}$ as the phase error estimate at the output of rotator 814. Multiplier 822 multiplies $Q_{PT}$ by the phase tracker decision error signal 248 to produce a decision directed phase error estimate, which is then integrated by integrator 816 to form phase correction signal $θ_i = θ_{i-1} + μ(Q_{PT})·(E_{PTD})$. Rotator 814 receives θ and develops phase correction vector $e^{jθ}$. In some embodiments the maximum phase correction is limited to a desired range. As a non-limiting example, in some embodiments the maximum phase correction signal limits the phase correction provided by rotator 814 to ±45 degrees. Rotator 814 then multiplies the vector pair $I_{FFE}$ and $Q_{FFE}$ by the phase correction vector $e^{jθ}$ to produce the phase-corrected real or in-phase output $I_{PT}$. As will be understood by those skilled in the art, these illustrations are by way of example. Other delay elements, not shown in FIG. 26, are used in some embodiments to maintain the temporal relationship between phase error estimate $Q_{PT}$ and phase tracker decision error signal $E_{PTD}$ such that the output of multiplier 822 is the decision directed phase error estimate corresponding to an output from FFE 210 (input signal 242).

Figure 27:
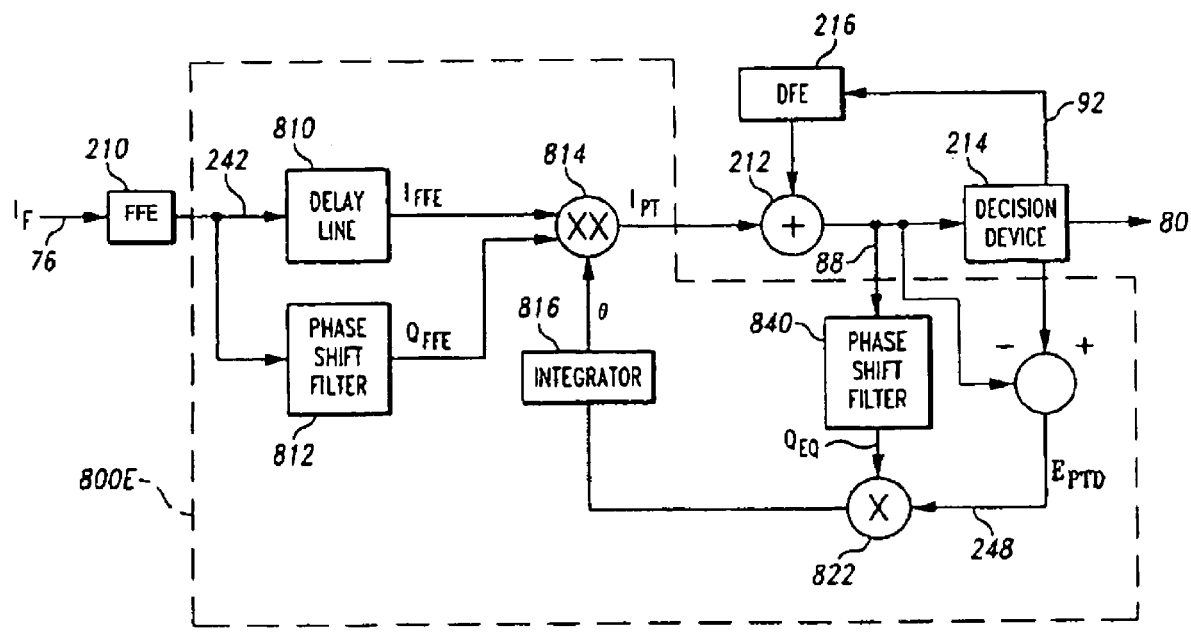
FIG. 27 is a block diagram of an embodiment of an overlapped equalizer with a phase tracker.

Still another embodiment of phase tracker 240 in equalizer 200A is phase tracker 800E, which is also adapted for VSB and offset QAM modulation systems. As illustrated in FIG. 27, phase tracker 800E receives input signal 242 from FFE 210 and provides the phase-corrected real or in-phase output $I_{PT}$ to adder 212 of equalizer 200A. Similar to the embodiments discussed above, as shown in FIG. 27, phase tracker 800E uses similar techniques and devices as previously described in relation to phase tracker 800A to generate the phase tracker decision error signal ($E_{PTD}$) 248. Phase tracker decision error signal ($E_{PTD}$) 248, shown as part of phase tracker 800E, is similar in form and function to that used in phase tracker 800A.

As with phase tracker 800D, phase tracker 800E also includes delay line 810, phase-shift filter 812, rotator 814, integrator 816 and multiplier 822. The inputs of delay line 810 and phase-shift filter 812 receive input signal 242 from FFE 210. Delay line 810 and phase-shift filter 812 then provide $I_{FFE}$ and $Q_{FFE}$, respectively, to the in-phase and quadrature inputs of rotator 814. Rotator 814 receives phase correction signal θ from integrator 816 and provides phase-corrected in-phase or real signal $I_{PT}$ to adder 212 of equalizer 200A.

Phase tracker 800E further includes phase-shift filter 840 that has similar function and properties to phase-shift filter 812. In certain embodiments as shown in FIG. 27, phase-shift filter 840 receives equalized data signal 88. In certain other embodiments, not shown, the input of phase-shift filter 840 receives an output from decision device 214. Illustratively, in some embodiments, phase-shift filter 840 receives the output of a decision slicer within decision device 214. In other embodiments, phase-shift filter 840 receives the output of a trellis decoder in decision device 214. In still other embodiments, phase-shift filter 840 receives an output from one of the stages of a trellis decoder in decision device 214. Alternatively, in some embodiments of 800E (not shown), phase shift filter 840 receives $I_{PT}$ instead of equalized data signal 88.

The inputs of multiplier 822 receive the outputs of phase-shift filter 840 and phase tracker decision error signal ($E_{PTD}$) 248. As shown in FIG. 27, phase-shift filter 840 receives the equalized data signal 88 and provides an imaginary or quadrature signal $Q_{EQ}$ as an output to multiplier 822. $Q_{EQ}$ is the phase error estimate for the equalizer output provided to phase-shift filter 840. Multiplier 822 produces a decision directed phase error estimate by multiplying $Q_{EQ}$ by the phase tracker decision error signal ($E_{PTD}$) 248. Integrator 816 integrates the output of multiplier 822 to form phase correction signal $θ_i = θ_{i-1} + μ·(Q_{EQ})·(E_{PTD})$. Rotator 814 receives phase correction signal θ and develops phase correction vector $e^{jθ}$. Rotator 814 then multiplies the vector pair $I_{FFE}$ and $Q_{FFE}$ by the phase correction vector $e^{jθ}$ to produce the phase-corrected real or in-phase output $I_{FFE}$. As will be understood by those skilled in the art, these illustrations are by way of example. Other delay elements not shown in FIG. 27 are used in some embodiments to maintain the temporal relationship between phase error estimate $Q_{EQ}$ and $E_{PTD}$ such that the output of multiplier 822 is the decision directed phase error estimate corresponding to a particular recovered symbol.

Figure 28:
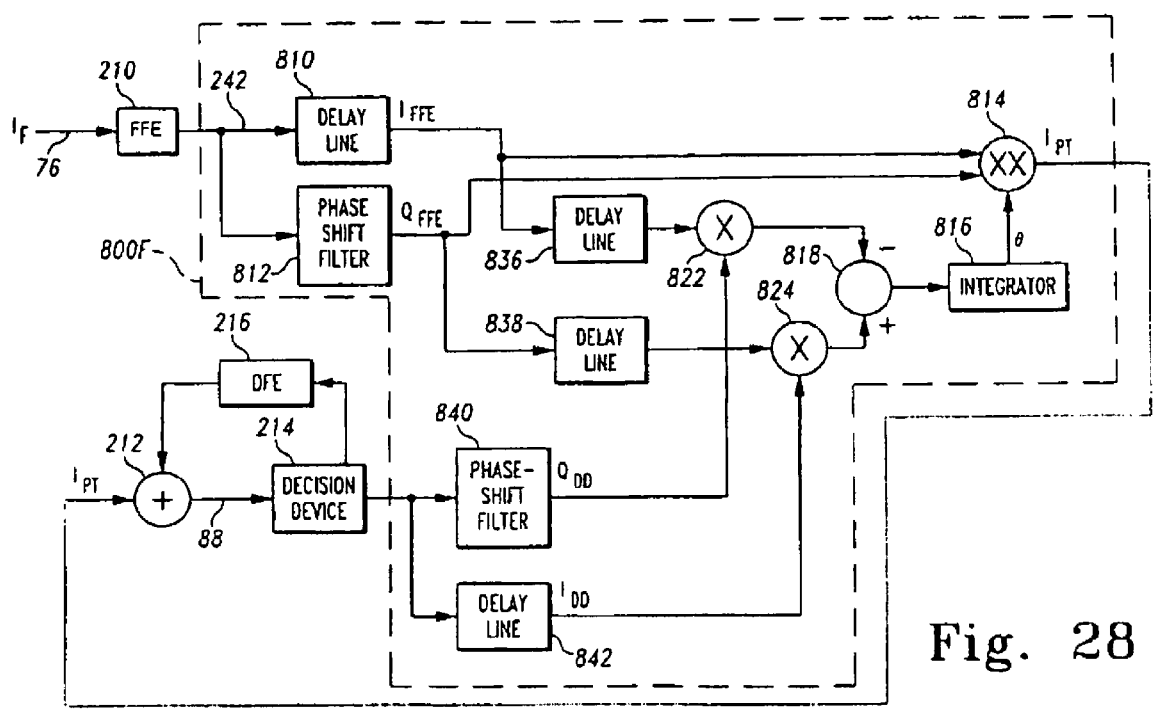
FIG. 28 is a block diagram of an embodiment of an overlapped equalizer with a phase tracker.

An additional embodiment of phase tracker 240 in equalizer 200A is phase tracker 800F, as illustrated in FIG. 28, which includes first delay line 810, phase-shift filter 812, rotator 814 and integrator 816. Phase tracker 800F receives input signal 242 from FFE 210 at delay line 810 and phase-shift filter 812. Delay line 810 and phase-shift filter 812 provide $I_{FFE}$ and $Q_{FFE}$, respectively, to the in-phase and quadrature inputs of rotator 814.

Phase tracker 800F further includes subtractor 818, multiplier 822, multiplier 824, delay line 836, delay line 838, phase-shift filter 840 and delay line 842. Delay lines 836 and 838 receive $I_{FFE}$ and $Q_{FFE}$, respectively. Delay line 836 provides a delayed version of $I_{FFE}$ to one input of multiplier 822. Delay line 838 provides a delayed version of $Q_{FFE}$ to one input of multiplier 824. As shown in FIG. 28, in some embodiments delay line 842 and phase-shift filter 840 receives an output from decision device 214. Illustratively, in some embodiments, a decision slicer of decision device 214 provides the output to delay line 842 and phase-shift filter 840. In other embodiments, a trellis decoder of decision device 214 provides the output to delay line 842 and phase-shift filter 840. In still other embodiments, one of the stages of a trellis decoder of decision device 214 provides the output to delay line 842 and phase-shift filter 840. Yet other embodiments alternatively provide the equalized data signal 88 at the input of decision device 214 as an input to delay line 842 and phase-shift filter 840. In addition, certain other embodiments of phase tracker 800F select the input to phase-shift filter 840 and delay line 842 depending upon the operational state of the equalizer 200A or system 20.

Phase-shift filter 840 produces quadrature output $Q_{DD}$. Delay line 842 provides a delayed version of the in-phase input as output $I_{DD}$. As will be appreciated that delay line 842 compensates for the delay introduced by phase-shift filter 840 and temporally aligns $Q_{DD}$ and $I_{DD}$.

It will also be appreciated that delay lines 836 and 838 compensate for delay introduced by signal processing in equalizer 200A and temporally align the delayed versions of $I_{FFE}$ and $Q_{FFE}$ with $I_{DD}$ and $Q_{DD}$. Thus, multiplier 822 receives $Q_{DD}$ and a delayed version of $I_{FFE}$ from phase-shift filter 840 and delay line 836, respectively. Similarly, multiplier 824 receives $I_{DD}$ and a delayed version of $Q_{FFE}$ from delay lines 842 and 838, respectively. The delay provided by delay lines 836 and 838 aligns the inputs to multiplier 822 and 824 such that they correspond to the same received symbol.

The negating and positive inputs of subtractor 818 receive the outputs of multiplier 822 and multiplier 824, respectively, and subtractor 818 provides a decision directed phase error output to integrator 816. Similar to previous phase tracker embodiments, integrator 816 provides a phase correction signal θ to rotator 814 where $\theta_i = \theta_{i-1} + \mu \cdot [(Q_{FFE} \cdot I_{DD}) - (I_{FFE} \cdot Q_{DD})]$.

Rotator 814 receives θ and develops phase correction vector $e^{j\theta}$. Rotator 814 multiplies the vector pair $I_{FFE}$ and $Q_{FFE}$ by the phase correction vector $e^{j\theta}$ to produce the phase-corrected real or in-phase output $I_{PT}$. As will be understood by those skilled in the art, these illustrations are by way of example. Other delay elements, not shown in FIG. 28, are used in some embodiments to maintain the temporal relationship between $I_{FFE}, Q_{FFE}, I_{DD}$ and $Q_{DD}$ at multipliers 822 and 824 such that the output of subtractor 818 is the decision directed phase error estimate corresponding to a particular recovered symbol.

Although phase tracker 800 and specific embodiments 800A-800F show FFE 210 receiving only $I_F$, it will be understood that some embodiments of phase tracker 800 are adapted to embodiments of FFE 210 receiving $I_F$ and $Q_F$ and providing $I_{FFE}$ and $Q_{FFE}$ as outputs directly from FFE 210 to rotator 814. Likewise, in some embodiments, the maximum phase correction range is limited. As a non-limiting example, some embodiments limit the maximum phase correction provided by rotator 814 to ±45 degrees. In still other embodiments, the value of θ is limited to control the range of the phase correction signal. In addition, although described in relation to an ATSC system, it will be understood that the techniques and devices contained in embodiments of phase trackers 800 can be adapted to other modulation techniques and data constellations.

Similarly, it will be understood that some embodiments of phase tracker 800 are adapted to operate with embodiments of FFE 210 that have fractionally spaced samples. Finally, it will be understood that some embodiments of phase tracker 800 are adapted to receive both real and quadrature input signals as inputs from FFE 210; and therefore FFE 210 directly provides $I_{FFE}$ and $Q_{FFE}$ without the need for delay line 810 and phase shifter 812.

Figure 29:
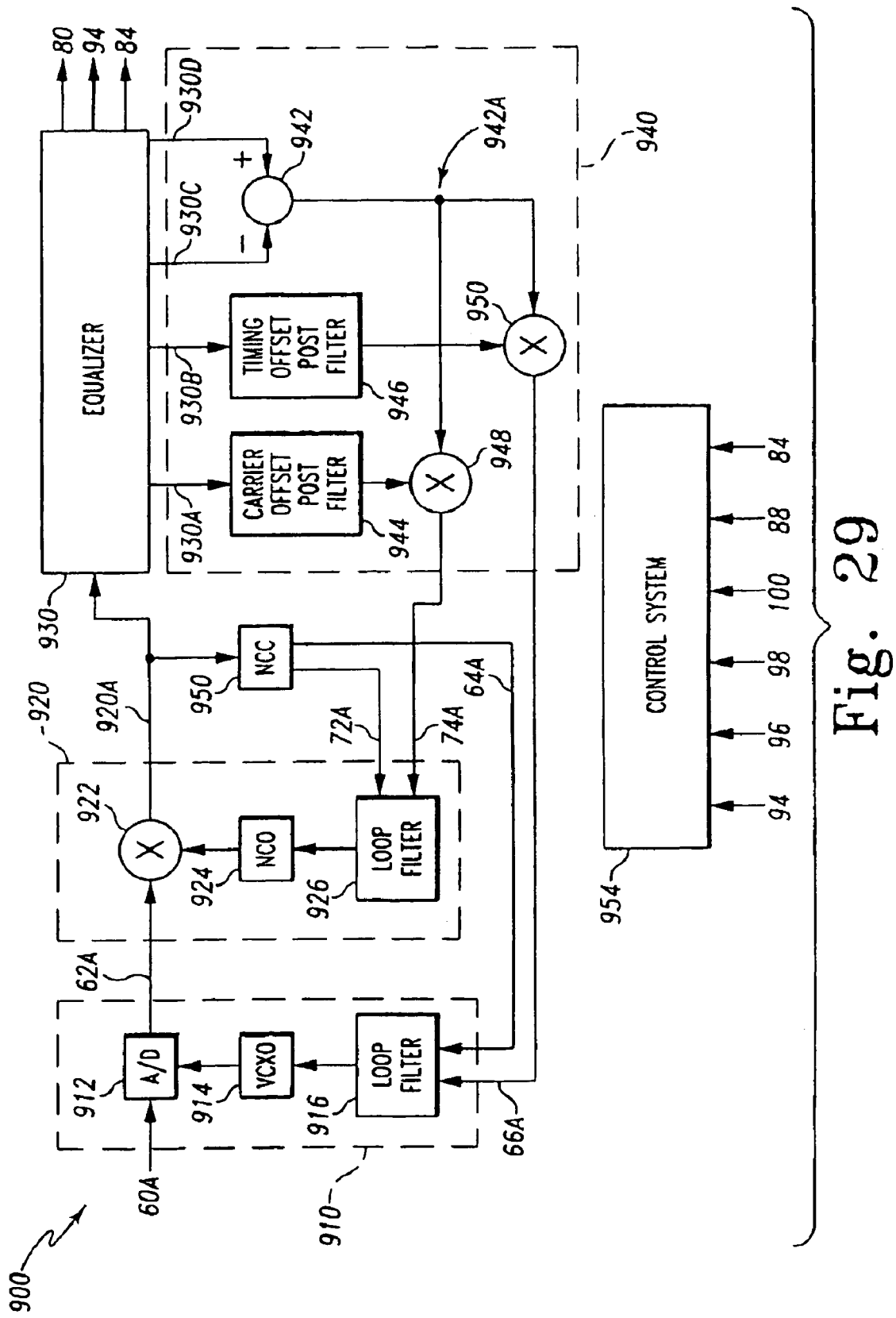
FIG. 29 is a block diagram of an embodiment of a synchronization and demodulation feedback system employing an overlapped equalizer.

Another embodiment of system 20 of FIG. 3 is system 900 shown in FIG. 29. According to one aspect, system 900 employs a technique for developing a carrier tracking feedback loop and timing synchronization feedback loop. System 900 includes synchronization 910, digital demodulator 920, equalizer 930, decision directed control (DDC) 940, non-coherent control (NCC) 950 and control system 954, which are analogous in form and function to elements 40, 42, 46, 52, 50 and 54 of system 20 (see FIG. 3), respectively. Similar to system 20, system 900 develops the previously described signals segment sync 96, field/frame sync 98, SNR 100, VCXO lock 102, and NCO lock 104. Like control system 54 of system 20, control system 954 receives segment sync 96, field/frame sync 98, SNR 100, VCXO lock 102, and NCO lock 104. It will also be understood that various embodiments of equalizer 930 include previously described embodiments of equalizers 48, 200, and 200A. Likewise, some embodiments of equalizer 930 include previously described embodiments of phase tracker 800, 800A, 800B, 800C, 800D, 800E, and 800F.

In addition, signals 64A, 66A, 72A and 74A are similar in form and function to signals 64, 66, 72 and 74 of FIG. 3. It will be understood that for the sake of simplicity, Nyquist filtering of the digital demodulator output is not illustrated in system 900; however, this is by way of convenience and is not intended as a limitation. Those skilled in the art will appreciate that Nyquist filtering occurs in any of a variety of forms in various embodiments of the present system.

As shown in FIG. 29, system 900 receives near-baseband signal 60A from a front end receiver (receiver 30 in FIG. 3, for example) and provides digitized near-baseband signal 62A to digital demodulator 920. The output of digital demodulator 920 provides a baseband signal 920A as input to equalizer 930. Equalizer 930 provides outputs 930A, 930B, 930C, and 930D to decision directed control 940. DDC 940 includes subtractor 942, carrier offset post filter 944, timing offset post filter 946, multiplier 948 and multiplier 950. DDC 940 provides a decision directed synchronization feedback signal 66A to synchronization 910 and further provides decision directed carrier tracking feedback signal 74A to digital demodulator 920.

In some embodiments, equalizer 930 is an overlapped equalizer. In other embodiments, equalizer 930 does not have a predefined or fixed center tap. Certain embodiments of equalizer 930 also include a phase tracker. Thus, as explained in greater detail later, in some embodiments the outputs 930A and 930B are partially equalized signals. Illustratively, in some embodiments, equalizer outputs 930A and 930B are the output of the FFE portion of equalizer 930. In other embodiments, equalizer outputs 930A and 930B are the outputs of a phase tracker portion of an equalizer. In still other embodiments, equalizer outputs 930A and 930B are the input signals to the decision device of the equalizer. In yet other embodiments, equalizer outputs 930A and 930B are provided by different sources. As a non-limiting example, in some embodiments equalizer output 930A is also the input signal to the decision device of the equalizer while equalizer output 930B is the output of the phase tracker of the equalizer.

Another aspect of system 900 is development of a decision error signal similar to phase tracker decision error signal ($E_{PTD}$) 248. Thus, in some embodiments, equalizer outputs 930C and 930D are the input signal to the decision device of equalizer 930 and the decision device output corresponding to the input signal 930C, respectively. In certain embodiments, the equalizer output 930D is the output of a decision slicer of a decision device. In other embodiments equalizer output 930D is the output of a trellis decoder. In still other embodiments, the equalizer output 930D is the output of an intermediate stage of a trellis decoder.

Using one or more delay elements (not shown), system 900 applies techniques available to those skilled in the art to temporally align data presented to subtractor 942. Thus, subtractor 942 produces error feedback signal 942A, which is the difference between the decision device output of equalizer 930 and the corresponding input to the decision device. Similarly, system 900 also temporally aligns the inputs presented to multipliers 948 and 950. Thus, the inputs to multiplier 948 correspond to the same baseband signal 920A. Likewise, the inputs to multiplier 950 correspond to the same baseband signal 920A. Finally, although FIG. 29 shows multipliers 948 and 950 receiving the same error feedback signal 942A, it will be understood that this is by way of example and not intended as a limitation. Thus, in some embodiments, the error signal used for carrier tracking is calculated differently than the error signal used for synchronization. Illustratively, in some embodiments, the error feedback signal 942A for carrier tracking is formed with the slicer output of equalizer 930, whereas the error feedback signal 942A for synchronization is formed with the trellis decoder output of equalizer 930.

Carrier offset post filter 944 and timing offset post filter 946 receive equalizer outputs 930A and 930B, respectively. The negating and positive inputs of subtractor 942 receive equalizer outputs 930C and 930D, respectively, and produce error feedback signal 942A. Multiplier 948 receives the outputs of carrier offset post filter 944 and error feedback signal 942A. Multiplier 948 provides decision directed carrier tracking feedback signal 74A to loop filter 926. Similarly, multiplier 950 receives the outputs of timing offset post filter 946 and error feedback signal 942A. Multiplier 950 provides a decision directed synchronization feedback signal 66A to loop filter 916.

Carrier offset post filter 944 detects the carrier frequency and phase offset present in equalizer output 930A. In some embodiments, carrier offset post filter 944 is a phase error detector that provides a phase error estimate. In other embodiments, carrier offset post filter 944 is a phase-shift filter or quadrature filter similar in form and function to phase-shift filter 812. Thus, some embodiments of carrier offset post filter 944 include a Hilbert filter or truncated Hilbert filter. In still other embodiments, carrier offset post filter 944 is a FFE of desired length with filter tap coefficients optimized to minimize the mean square error (MMSE) of the filter output for a channel that is 90-degrees phase-shifted, and a receiver having a pre-determined acquisition threshold.

Figure 36A:
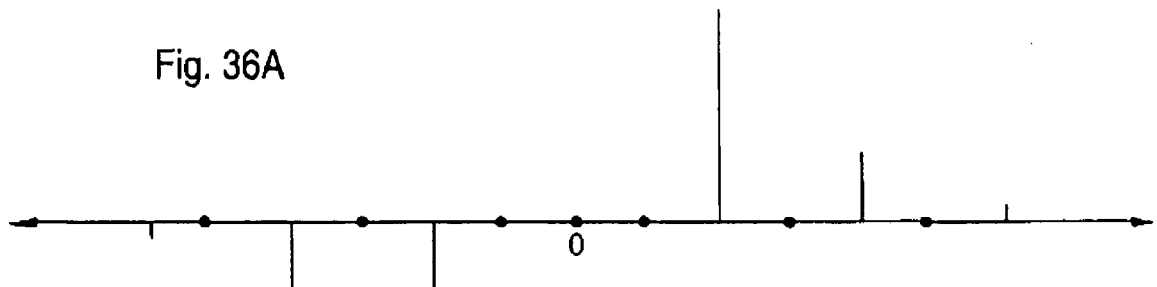
FIGS. 36A and 36B show qualitative characteristics of a timing offset post filter and carrier offset post filter, respectively.
Figure 36B:
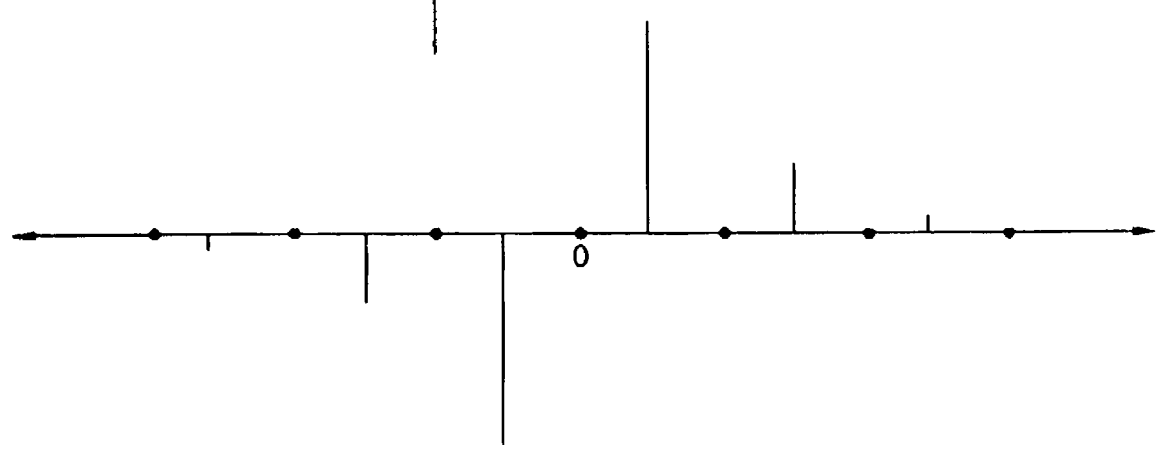

Illustratively, as previously described with respect to phase-shift filter 812 some embodiments of carrier offset post filter 944 are a FIR filter with a length of 31 samples and having filter tap coefficients MMSE optimized for a VSB or offset-QAM receiver acquisition SNR threshold of 15.1 dB. The resultant filter is qualitatively illustrated in FIG. 36B. Other embodiments of carrier offset post filter 944 include filter tap values optimized for a receiver acquisition SNR threshold of less than 15.1 dB. At least one embodiment of the carrier tracking feedback loop includes carrier offset post filter 944 with coefficients optimized for an acquisition SNR threshold of 15 dB. In other embodiments, carrier offset post filter 944 develops a phase error estimate at an output thereof similar to the phase error estimate developed in the embodiments of phase trackers 800A, 800C, 800D and 800E.

Multiplier 948 forms the decision directed carrier tracking feedback signal 74A by multiplying the output of carrier offset post filter 944 by error feedback signal 942A. It will be understood that one or more delay elements are used in various embodiments to temporally align the inputs to multiplier 948.

Timing offset post filter 946 filters equalizer output 930B to detect a timing or synchronization offset. In some embodiments, timing offset post filter 946 is a correlation filter optimized to detect an arbitrarily small fractional timing offset. In other embodiments, timing offset post filter 946 combines the output of a timing lead filter and a timing lag filter where the timing lead filter detects positive timing offsets and the timing lag filter detects negative timing offsets. Other embodiments of timing offset post filter 946 sum the timing lead and timing lag filter outputs to produce a symmetrical timing offset error signal at the output of timing offset post filter 946. Still other embodiments of timing offset post filter 946 MMSE-optimize coefficients for a FIR filter to produce an impulse response in the presence of white noise for a given receiver acquisition threshold. Illustratively, in some embodiments the filter coefficients are developed by a technique that includes summing the coefficients of a first filter and second filter where the first and second filter coefficients are optimized to detect a lead timing offset and a lag timing offset, respectively. In other embodiments, developing the coefficients of timing offset post filter 946 further includes averaging the coefficients of the first and second filters.

In certain embodiments, developing the coefficients of timing offset post filter 946 includes adding or averaging the coefficients of two filters. Each filter is MMSE-optimized to produce an impulse response for detecting arbitrarily small fractional timing offsets in the presence of white noise where the SNR is less than or equal to the receiver acquisition threshold. The coefficients of the two filters are optimized to detect timing offsets in opposite directions. Illustratively, in some embodiments, the first filter is optimized to detect a $\frac{1}{10}^{th}$ symbol timing offset (lead) and second filter is optimized to detect a $-\frac{1}{10}^{th}$ symbol timing offset (lag), and the first and second filter coefficients are asymmetrical. The coefficients of filter 946 are then obtained by averaging or adding the coefficients of the first and second filters. The resultant filter is a symmetrical filter, as qualitatively shown in FIG. 36A, that detects arbitrarily small fractional timing offsets in the presence of white noise where the SNR is less than or equal to the receiver acquisition threshold.

Adding or averaging the coefficients of the first and second filters produces coefficients of filter 946 that are symmetric and correlate leading and lagging timing offsets. Illustratively, some embodiments of filter 946 are MMSE-optimized to produce an impulse response in the presence of white noise in a channel having a 15.1 dB SNR. Still other embodiments of filter 946 produce a maximum correlation for a $\frac{1}{10}^{th}$ symbol timing offset.

Still other embodiments of timing offset post filter 946 include a FFE with a length of 31 samples that has filter tap coefficients MMSE-optimized for a VSB or offset-QAM receiver acquisition SNR threshold of 15.1 dB. Other embodiments of timing offset post filter 946 include filter tap values optimized for a receiver acquisition SNR threshold of less than 15.1 dB. At least one embodiment of the present invention includes timing offset post filter 946 coefficients optimized for an acquisition SNR threshold of 15 dB.

Returning to FIG. 29, multiplier 950 multiplies the output of timing offset post filter 946 by error feedback signal 942A to produce a decision directed synchronization feedback signal 66A that corresponds to a particular received symbol. It will be understood that delay elements are used in some embodiments to temporally align the inputs to multiplier 950.

Data received by system 900 is provided to A/D 912, which samples the received near-baseband signal 60A at a clock rate governed by feedback-controlled VCXO 914. Digital mixer 922 down modulates the digitized near-baseband signal 62A from A/D 912 based upon the local carrier frequency generated by feedback-controlled NCO 924. The output of digital mixer 922 is filtered (not shown for sake of simplicity) to produce a digitized baseband signal 920A. In some embodiments, as shown in FIG. 3, a Nyquist filter filters the output of the digital mixer. It will be appreciated by those skilled in the art that other filters can be used to filter the output of digital mixer 922, as well. Returning to FIG. 29, equalizer 930 receives the digitized baseband signal 920A and removes from it any residual channel distortions and multipath interference. Some embodiments of equalizer 930 also include a phase tracker to remove residual carrier phase error.

As described below, the operation of synchronization 910 is selectively governed by either non-coherent synchronization feedback signal 64A or decision directed synchronization feedback signal 66A based upon the operational state of system 900. Similarly, the operation of digital demodulator 920 is selectively governed by either non-coherent carrier tracking feedback signal 72A or decision directed carrier tracking feedback signal 74A based upon the operational state of system 900.

NCC 950 receives the output of digital mixer 922 develops both non-coherent synchronization feedback signal 64A and carrier tracking feedback signal 72A. NCC 950 uses combination the pilot signal and redundant information on the upper and lower Nyquist slopes to develop the non-coherent carrier tracking feedback signal 72A and a non-coherent synchronization feedback signal 64A in a manner described in co-pending applications U.S. application Ser. No. 10/408,053, and U.S. application Ser. No. 10/407,634, incorporated by reference herein. The development of these signals by NCC 950 preferably does not depend upon the output of equalizer 930.

As previously described, equalizer 930 provides equalizer outputs 930C and 930D to subtractor 942, which forms the error feedback signals 942A. Equalizer 930 also provides an equalizer output 930A to carrier offset post filter 944. Carrier offset post filter 944 filters equalizer output 930A to detect carrier frequency or phase errors. Multiplier 948 forms the decision directed carrier tracking feedback signal 74A by multiplying the output of carrier tracking filter 944 by error feedback signal 942A. Similarly, timing offset post filter 946 filters equalizer output 930B to detect timing and synchronization errors, then multiplier 950 forms the decision directed feedback synchronization feedback signal 66A by multiplying the output of timing offset post filter 946 by error feedback signal 942A. As previously discussed, it will be understood that delays not shown in FIG. 29 are placed in the various signal paths to temporally align the various signals so the error feedback signal 942A corresponds to the outputs of carrier offset post filter 944 and timing offset post filter 946, respectively.

The feedback loop that controls digital demodulator 920 is formed by feeding back the non-coherent carrier tracking feedback signal 72A and decision directed carrier tracking feedback signal 74A to loop filter 926. As described later, depending upon the operational state of system 900, control system 954 selectively controls loop filter 926 to use either non-coherent carrier tracking feedback signal 72A or decision directed carrier tracking feedback signal 74A. Loop filter 926 filters the selected feedback signal and provides a control signal to NCO 924. NCO 924 provides digital mixer 922 a digital representation of a local carrier to down modulate the digitized near-baseband signal 62A. In some embodiments, loop filter 926 low-pass filters the selected feedback signal. In other embodiments, loop filter 926 integrates the selected feedback signal, and then low-pass filters the integrated output. Illustratively, in certain embodiments, the selected feedback signal passes through a perfect integrator before it is low-pass filtered and provided to NCO 924. In certain other embodiments, the selected feedback signal is passed through a "leaky" integrator before it is low-pass filtered and provided to NCO 924.

Similarly, the feedback loop that controls synchronization 910 is formed by feeding back the non-coherent synchronization feedback signal 64A and decision directed synchronization feedback signal 66A to loop filter 916. As described later, depending upon the operational state of system 900, control system 970 selectively controls loop filter 916 to use either non-coherent synchronization feedback signal 64A or decision directed synchronization feedback signal 66A. Loop filter 916 filters the selected feedback signal and provides a control signal to VCXO 914. A/D 912 receives a feedback-controlled sampling clock from VCXO 914, which minimizes synchronization-introduced errors in the outputs of equalizer 930.

Figure 30:
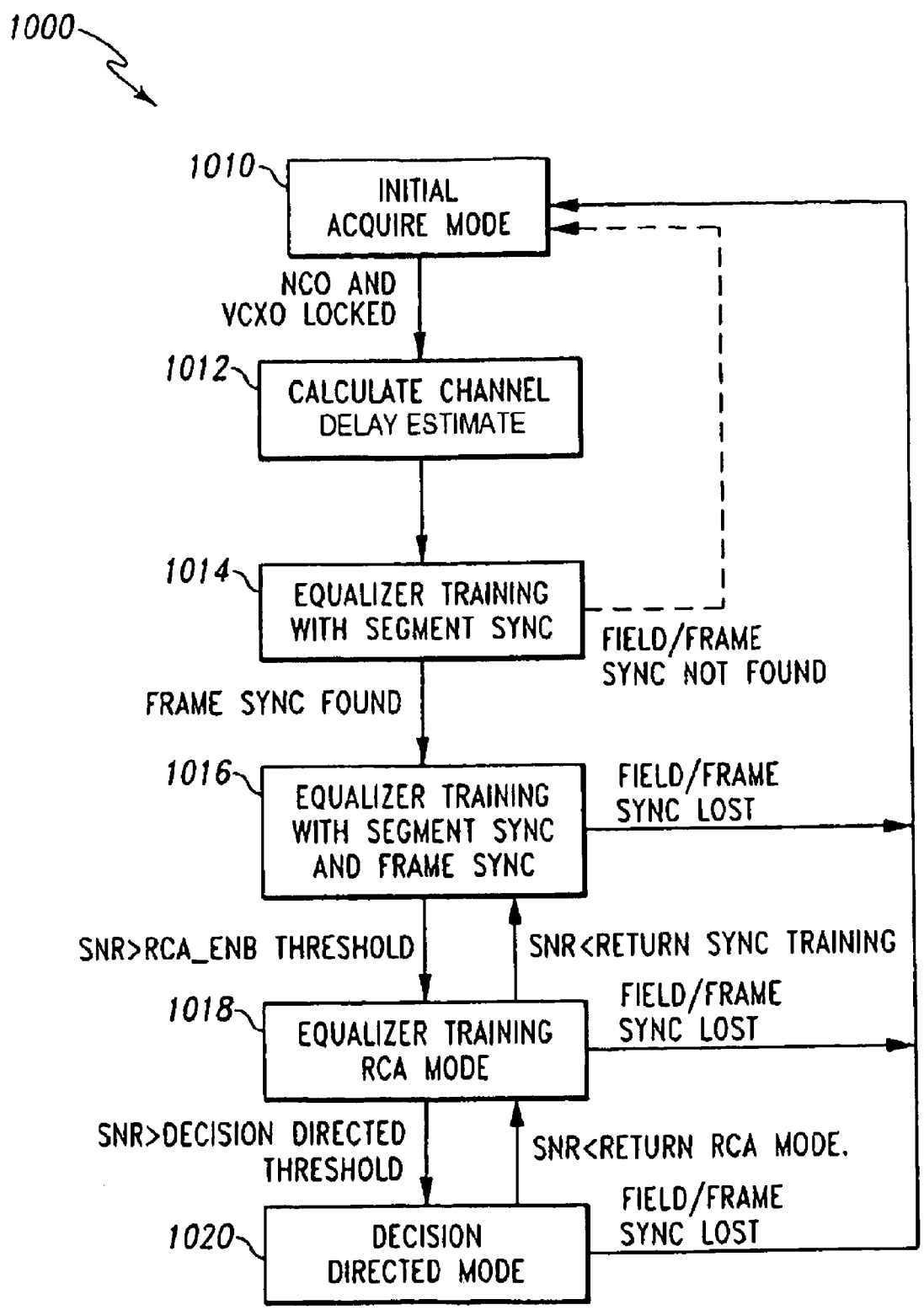
FIG. 30 is a flow diagram illustrating operation of another embodiment of the system 900 of FIG. 29 for controlling the operation of an overlapped equalizer optimization process and synchronization and demodulation control feedback loops.

Another embodiment of system 900, the operation of which is illustrated in FIG. 30 with continuing reference to system 900 of FIG. 29, comprises a system 1000 for controlling the operation of the equalizer optimization process and synchronization and demodulation control feedback loops. At 1010, "initial acquire mode," control system 954 initializes system 900. Equalizer 930 is not yet operating. The phase tracker of the equalizer and CDEU are not yet functional or are held in a reset state. The NCC 950 is operational. Control system 954 places synchronization 910 and digital demodulator 920 in acquisition mode and selectively controls loop filter 916 and loop filter 926 to select the non-coherent synchronization feedback signal 64A and non-coherent carrier tracking feedback signal 72A of NCC 950. After some period of time, control system 954 receives positive assertions from VCXO lock 102 and NCO lock 104 that the synchronization 910 and digital demodulator 920 are locked to the incoming signal. After both VCXO lock and NCO lock are asserted, control system 954 transitions system 900 operation from state 1010 to 1012.

At 1012, "calculate channel delay estimate," control system 954 turns on the CDEU portion of equalizer 930. The other portions of equalizer 930 remain non-operational. Control system 954 continues to hold synchronization 910 and digital demodulator 920 in acquisition mode. The non-coherent feedback signals of NCC 950 continue to govern the synchronization and demodulation operations of system 900. Once the CDEU portion of equalizer 930 calculates the channel delay estimate and determines the desired timing for the segment sync and frame sync at the output of the FFE, control system 954 transitions system 900 operation from state 1012 to 1014.

At 1014, "equalizer training with segment sync," control system 954 enables the FFE portion of equalizer 930, and places the DFE portion of equalizer 930 in IIR mode. In IIR mode, DFE receives sliced data from the decision device of equalizer 930. In those embodiments having a phase tracker, the phase tracker is placed in bypass mode. Control system 954 uses the segment sync as a training signal to adapt the FFE coefficients. After control system 954 receives at least one positive indication from field/frame sync 98 that field/frame sync was detected, control system 954 transitions system 900 operation from state 1014 to 1016. However, in some embodiments, system 900 includes a time-out feature whereby control system 954 returns the operation of system 900 from state 1012 to 1010 when an insufficient number of field/frame sync indications are received to indicate progress toward properly adapting the equalizer coefficients.

In some embodiments, segment sync comes from the CDEU of equalizer 930. In other embodiments, where CDEU computes the channel delay estimate based upon the correlation of the incoming signal with a field/frame sync sequence, the frame sync signal comes from the CDEU of equalizer 930. Otherwise, a portion of equalizer 930 generates a frame sync based upon either an intermediate equalized signal of the equalizer or the equalizer output, (similar to intermediate equalized signal 90 or equalizer output 88 of FIG. 5).

At 1016, "equalizer training with segment sync" and field/frame sync, control system 954 develops the coefficients of the FFE portion of equalizer 930 using both the field/frame sync and segment sync as training signals. The DFE portion of equalizer 930 continues to operate in IIR mode. Similarly, the phase tracker portion of equalizer 930 continues to operate in bypass mode. Control system 954 monitors field/frame sync 98 and SNR 100, and transitions system 900 operation from state 1016 to 1018 when the measured signal has an estimated SNR greater than a predetermined RCA_ENB Threshold. However, control system 954 instead transitions system 900 operation from state 1016 to 1010 if it detects the loss of field/frame sync indication.

At 1018, "equalizer training in RCA mode," control system 954 enables the DFE portion of the equalizer of system 900. Control system 954 adapts the FFE and DFE coefficients using an RCA-based LMS algorithm on the received data. In other embodiments, control system 54 further includes a technique of comparing the received synchronization signals to those generated by control system 54. In still other embodiments, control system 54 weights the effects of the RCA and synchronization signal based adaptation techniques depending upon system performance or operational state. Control system 954 transitions system 900 operation from state 1018 to 1020 when the measured signal has an estimated SNR that exceeds a predetermined Decision Directed Threshold, e.g., 12 dB. If, instead, the estimated SNR drops below a predetermined Return_Sync_Training Threshold, e.g., 6 dB, control system 954 passes system 900 operation from state 1018 to 1016. Similarly, control system 954 transitions system 900 operation from state 1018 to 1010 if it detects the loss of field/frame sync indication.

At 1020, "Decision Directed Mode," control system 954 adapts the FFE and DFE coefficients using a decision directed LMS technique on the received data and synchronization signals. In addition, control system 954 selectively controls loop filter 916 and loop filter 926 to select the decision directed synchronization feedback signal 66A and decision directed carrier tracking feedback signal 74A, respectively. Control system 954 keeps the operation of system 900 at 1020 as long as the estimated SNR remains above a predetermined RETURN_RCA_MODE Threshold, but passes system 900 operation from state 1020 to 1018 if the estimated SNR drops below the RETURN_RCA_MODE Threshold. Control system 954 transitions system 900 operation from state 1020 to 1010 if it detects the loss of field/frame sync indication.

Figure 31:
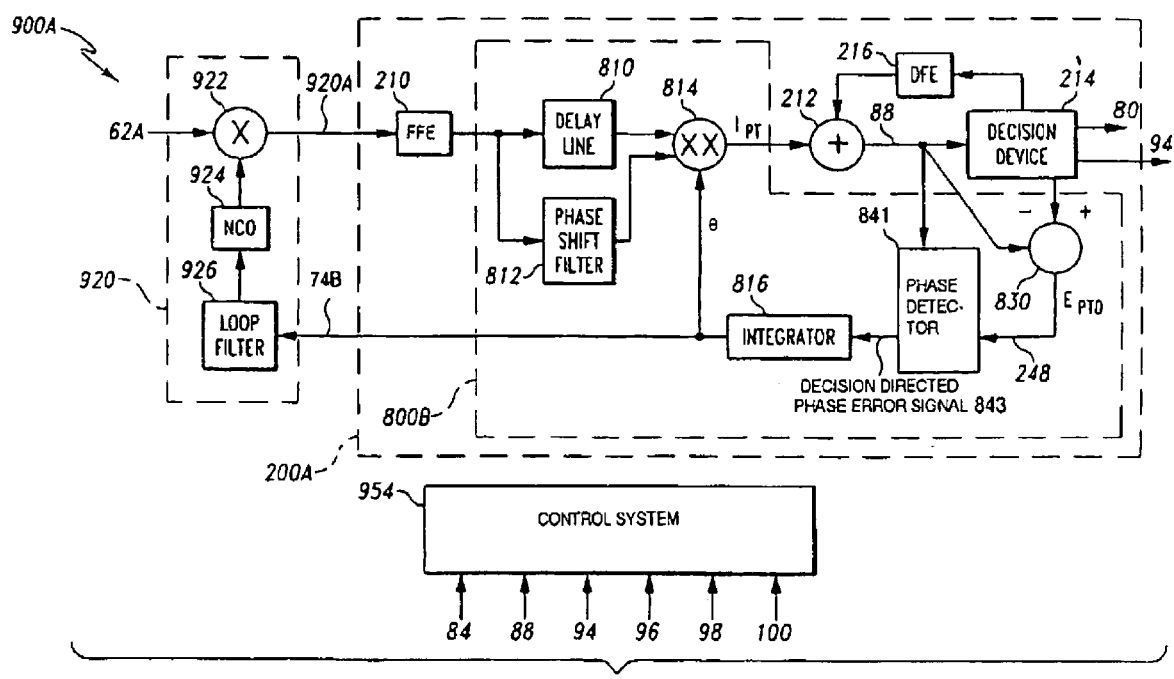
FIG. 31 is a block diagram of a further embodiment of a synchronization and demodulation feedback system employing an overlapped equalizer.

Another embodiment of system 900, shown as system 900A in FIG. 31, includes components for interrelating the decision directed phase tracking and carrier tracking feedback loops. System 900A is similar in form and function to equalizer 200A of FIG. 27, which includes phase tracker 800E. It will be understood that other embodiments of system 900A use other embodiments of phase tracker 800. System 900A, however, also includes demodulator 920, which receives digitized near-baseband signal 62A and provides digitized baseband signal 920A as an input to FFE 210. Loop filter 926 receives phase correction signal θ from integrator 816, 74B, whereas in system 900 loop filter 926 receives decision directed carrier tracking feedback signal 74A (see FIG. 29).

System 900A couples the decision directed carrier tracking feedback and decision directed phase error signals. The input to integrator 816 is a decision directed phase error signal 843 similar to decision directed carrier tracking feedback signal 74A. In some embodiments the decision directed phase error signal 843 and decision directed carrier tracking feedback signal 74A are equivalent. Integrator 816 integrates decision directed phase error signal 843 at the output of a phase detector 841 to provide phase correction signal θ (74B). The phase detector 841 may be implemented in any fashion known to one skilled in the art; for example, any of the approaches illustrated in FIGS. 23-28 may be utilized. For example, the phase detector 841 can be implemented by the phase shift filter 840 and the multiplier 822 of FIG. 27. Loop filter 926 further low-pass filters phase correction signal θ and provides a control signal to NCO 924. This effectively links the phase tracker feedback and carrier tracking loops. As a result, rotator 814 corrects for more instantaneous phase errors resulting from carrier tracking errors, while digital demodulator 920 tracks out the longer term carrier tracking errors. In addition, the interaction of the phase tracker and digital demodulator feedback loops insures that the phase tracker operation does not saturate. In addition, it will be understood by those skilled in the art that a similar technique can be combined with the other phase tracker embodiments previously discussed.

Figure 32:
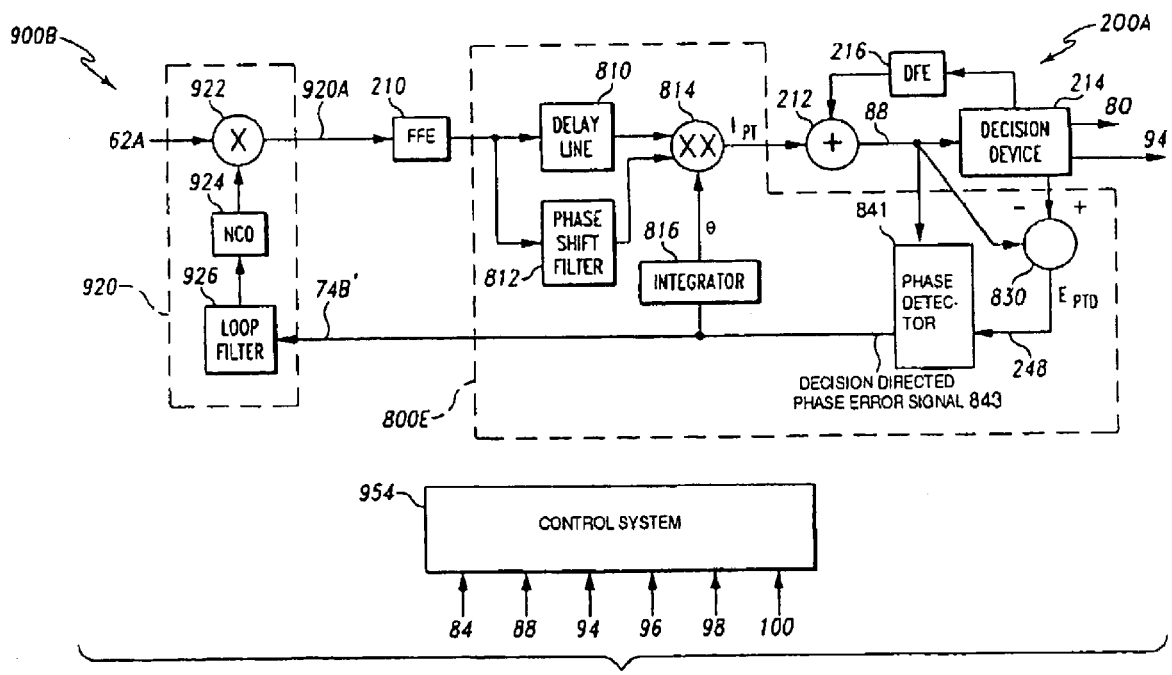
FIG. 32 is a block diagram of an embodiment of an overlapped equalizer within a combined demodulation and synchronization feedback loop.

In certain other embodiments of system 900, shown as system 900B in FIG. 32, the decision directed carrier tracking and phase tracking feedback loops are interrelated. System 900B is similar in form and function to system 900A of FIG. 31, and includes equalizer 200A of FIG. 27 with phase tracker 800E and digital demodulator 920. Digital demodulator 920 receives digitized near-baseband signal 62A and provides digitized baseband signal 920A as an input to FFE 210. However, the decision directed phase error signal 843 from the output of phase detector 841 (input of integrator 816) is used as the decision directed carrier tracking feedback signal 74B' instead of phase correction signal θ from the output of integrator 816. Loop filter 926 receives and low-pass filters the output of phase detector 841 to provide a control signal to NCO 924. This effectively links the phase tracker feedback and carrier tracking loops. As a result, rotator 814 corrects for more instantaneous phase errors resulting from carrier tracking errors, while digital demodulator 920 tracks out the longer-term carrier tracking errors. The interaction of the phase tracker and digital demodulator feedback loops allows the carrier tracking feedback loop to compensate for potential phase tracker saturation. Those skilled in the art will be able to adapt this technique to other phase tracker embodiments previously discussed without undue experimentation.

Figure 33:
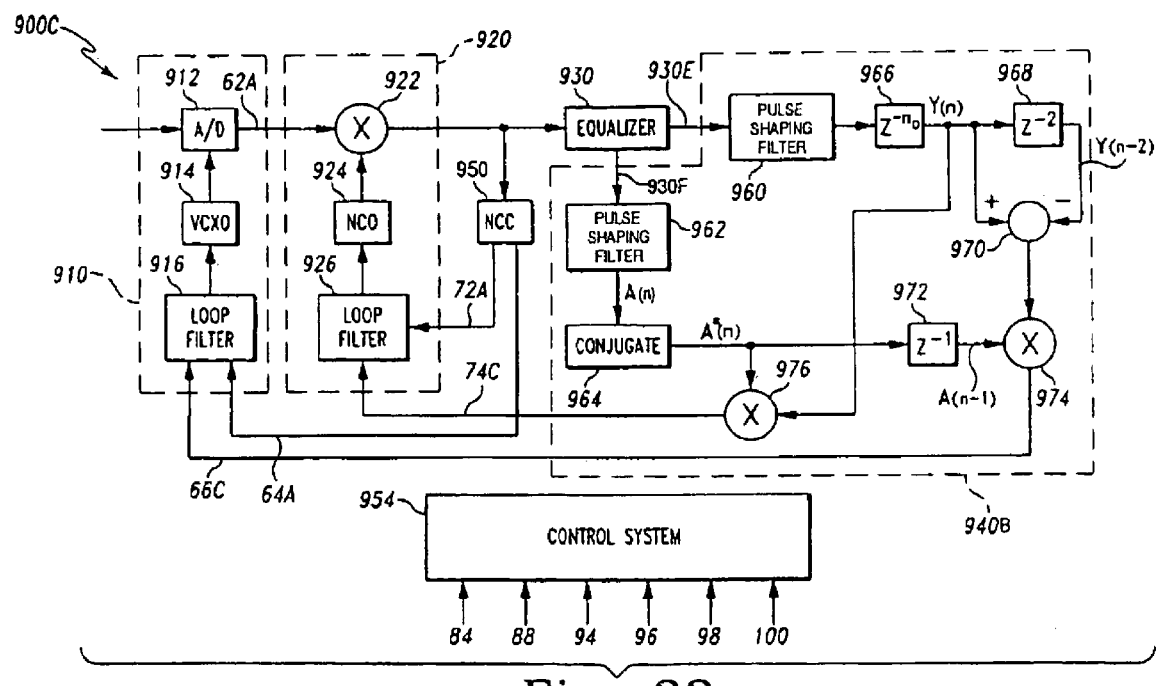
FIG. 33 is a block diagram of an embodiment of an overlapped equalizer within a combined demodulation and synchronization feedback loop.

Yet other embodiments of system 900, illustrated as system 900C of FIG. 33, use the outputs of an equalizer decision device to develop a carrier tracking feedback signal 74C and a synchronization feedback signal 66C. System 900C is similar in form and function to system 900, except that decision directed control (DDC) 940 is replaced with decision directed control 940C. Equalizer 930 provides the equalized output 930E and trellis decoder output 930F as inputs to DDC 940C.

Decision directed control 940C provides decision directed synchronization feedback signal 66C to synchronization 910 in place of decision directed synchronization feedback signal 66A. Decision directed control 940C provides decision directed carrier tracking feedback signal 74C to digital demodulator 920 in place of decision directed carrier tracking feedback signal 74A (see FIG. 29).

Decision directed control 940C includes pulse shaping filters 960 and 962, conjugate 964, delay line 966, two-symbol clock delay 968, subtractor 970, single-symbol clock delay 972, complex multiplier 974, and complex multiplier 976. Filter 960 receives equalized output 930E and provides a complex signal output, $Y(n+n_0)$, to delay line 966 where $n_0$ is the delay in symbol clocks introduced by the trellis decoder of equalizer 930 and conjugate 964. Delay line 966 introduces $n_0$ symbol clocks of delay and provides Y(n) as an output to two-symbol clock delay 968, the positive input of subtractor 970, and complex multiplier 976. Two-symbol clock delay 968 introduces an additional two-symbol clock of delay and provides Y(n−2) to subtractor 970. Similarly, pulse shaping filter 962 receives trellis decoder output 930F and provides a complex signal output, A(n), to conjugate 964. It is understood that in some embodiments the functions of pulse shaping filter 962 and conjugate 964 are combined. Conjugate 964 provides A*(n) to single-symbol clock delay 972, which provides a one symbol clock delayed output, A*(n−1), as an input to complex multiplier 974. Conjugate 964 also provides A*(n) to complex multiplier 976.

Pulse shaping filter 960 receives the equalizer decision slicer output that has not been error corrected. Pulse shaping filter 960 provides a complex-valued in-phase/quadrature pair representation of the decision slicer output, $Y(n+n_0)=I_S(n+n_0)+j Q_S(n+n_0)$. $I_S(n+n_0)$ is the delayed version of the real-valued input to pulse shaping filter 960. $Q_S(n+n_0)$ is a 90-degree phase-shifted or quadrature-filtered output for the real-valued input to pulse shaping filter 960.

Similarly, pulse shaping filter 962 receives the corrected version of the equalizer decision slicer output from a trellis decoder in equalizer 930. Pulse shaping filter 962 provides a complex-valued in-phase/quadrature pair representation of the decision slicer output, $A(n)=I_T(n)+jQ_T(n)$. $I_T(n)$ is the delayed version of the real-valued input to pulse shaping filter 962. $Q_T(n)$ is a 90-degree phase-shifted or quadrature-filtered output for the real-valued input to pulse shaping filter 962.

In some embodiments, pulse shaping filters 960 and 962 are each similar to a Hilbert transform filter and include a phase-shift or quadrature filter to produce the quadrature portions of the complex pairs $Q_S(n)$ and $Q_T(n)$, and a delay line to provide the real-valued outputs $I_S(n)$ and $I_T(n)$ respectively. In some embodiments, the phase-shift or quadrature filter are similar in form and function to the phase-shift filter 812 discussed above in relation to FIGS. 23-28.

Delay line 966 compensates for the propagation delay, $Z^{n_0}$, between the equalized output 930E on one hand and trellis decoder output 930F and conjugate 964 on the other. Thus, the outputs of delay line 966, $Y(n)=I_S(n)+jQ_S(n)$, and conjugate 964, $A*(n)=I_T(n)-jQ_T(n)$, are temporally related to the same decision slicer output. The output of subtractor 970 is the difference Y(n)−Y(n−2) and is multiplied by the one symbol clock delayed output of conjugate 964, A(n−1). This is effectively the projection of the corrected decision slicer output upon the previous and next decoded symbols, and represents the synchronization-related ISI. The real portion of the output of multiplier 974, $F_{66C}$, is the decision directed synchronization feedback signal 66C provided to loop filter 916:

$$F_{66C}=I_T(n-1)\cdot[I_S(n)-I_S(n-2)]+Q_T(n-1)\cdot[Q_S(n)-Q_S(n-2)]$$

In some embodiments, loop filter 916 integrates and then low-pass filters decision directed synchronization feedback signal 66C to produce a control signal to govern the operation of NCO 924. In other embodiments, loop filter 916 only low-pass filters decision directed synchronization feedback signal 66C to produce a control signal to govern the operation of NCO 924.

Similarly, multiplier 976 performs a complex multiply operation. The imaginary portion of the output of multiplier 976, $F_{74C}$, is a decision directed carrier tracking feedback signal 74C provided on output $F_{74C}=I_T(n)\cdot Q_S(n)-Q_T(n)\cdot I_S(n)$ to loop filter 926.

In some embodiments, loop filter 926 integrates and then low-pass filters decision directed carrier tracking feedback signal 74C to produce a control signal that governs the operation of VCXO 914. In other embodiments, loop filter 926 only low-pass filters decision directed carrier tracking feedback signal 74C to produce a control signal to govern the operation of VCXO 914.

Figure 34:
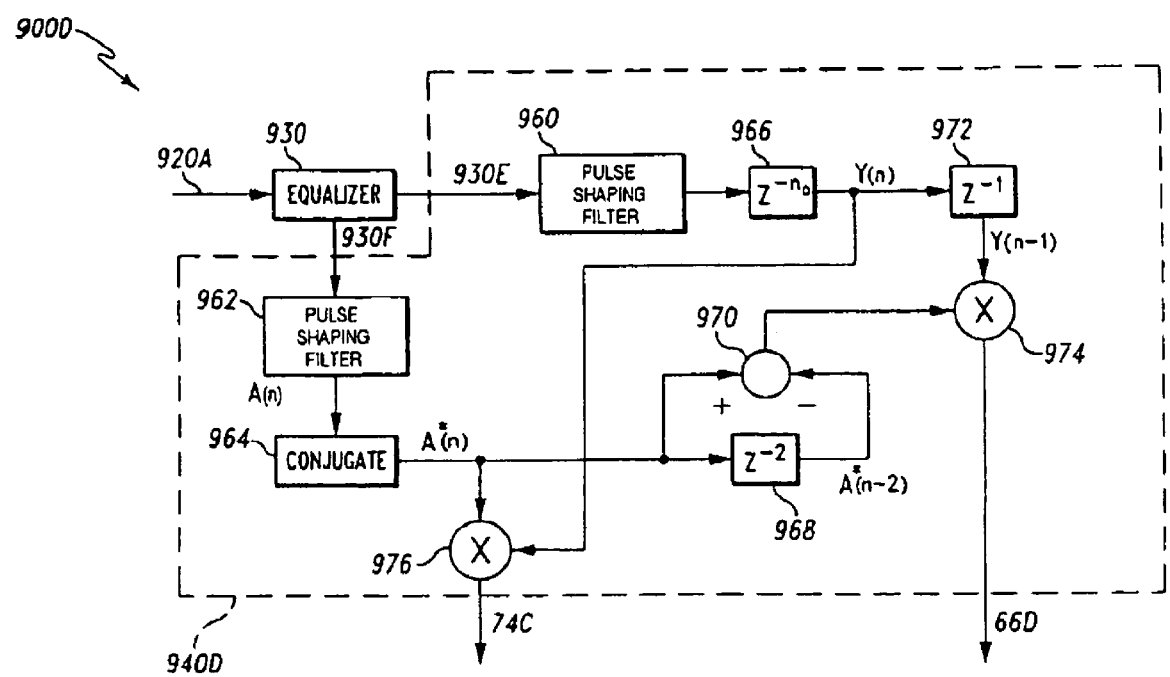
FIG. 34 is a block diagram of an embodiment of an overlapped equalizer within a combined demodulation and synchronization feedback loop.

Yet other embodiments of system 900, illustrated as system 900D of FIG. 34, use the outputs of a decision device of an equalizer to develop decision directed synchronization feedback signal 66D. Functionally, system 900D is similar in form and function to system 900, except decision directed control 940 is replaced with decision directed control 940D. As shown in FIG. 34, system 900D also produces decision directed synchronization feedback signal 74C similar to system 900C. However, in system 900D, delay line 966 provides an output to single-symbol clock delay 972 whereas in system 900C delay line 966 receives the output of conjugate 964. Similarly, in system 900D, two-symbol clock delay 968 and the positive input of subtractor 970 receive the output of conjugate 964 whereas in system 900C delay line 966 provides an output to two-symbol clock delay 968 and the positive input of subtractor 970.

Similar to system 900C, pulse shaping filter 960 receives the equalized output 930E that is not error corrected from equalizer 930. Pulse shaping filter 960 provides a complex-valued in-phase/quadrature pair representation of the decision slicer output, $Y(n+n_0)=I_S(n+n_0)+jQ_S(n+n_0)$. As previously described, $I_S(n+n_0)$ is the delayed version of the real-valued input to pulse shaping filter 960 whereas $Q_S(n+n_0)$ is a 90-degree phase-shifted or quadrature-filtered output for the real-valued input to pulse shaping filter 960. Delay line 966 compensates for the delay introduced by the trellis decoder of equalizer 930 and conjugate 964 and provides a delayed complex representation of the decision device decision slicer output to the inputs of one-symbol-clock delay 972 and multiplier 976. The output of one-symbol-clock delay 972 provides an additional symbol clock of delay between the output of delay line 966 and the input of multiplier 974.

Pulse shaping filter 962 is similar in form and function to pulse shaping filter 960 and receives the trellis decoder output 930F of equalizer 930. Pulse shaping filter 962 provides a complex representation of the trellis decoder output to conjugate 964. Conjugate 964 provides the conjugate of the received input to multiplier 976, two-symbol clock delay 968, and the positive input of subtractor 970. Two-symbol clock delay 968 provides a two-symbol clock delayed output of conjugate 964 to the negating input of subtractor 970. Multiplier 974 receives the output of subtractor 970. Multiplier 974 performs a complex multiply of the received inputs and produces the real component at an output, $F_{66D}$, as decision directed synchronization feedback signal 66D:

$$F_{66D}=I_S(n-1)\cdot[I_T(n)-I_T(n-2)]+Q_S(n-1)\cdot[Q_T(n)-Q_T(n-2)]$$

Although not shown, similar to system 900C, system 900D provides decision directed synchronization feedback signal $F_{66D}$ to loop filter 916 which integrates and then low-pass filters decision directed synchronization feedback signal 66D to produce a control signal to govern the operation of VCXO 914. In other embodiments of system 900D, loop filter 916 only low-pass filters decision directed synchronization feedback signal 66D to produce a control signal to govern the operation of VCXO 914.

Figure 35:
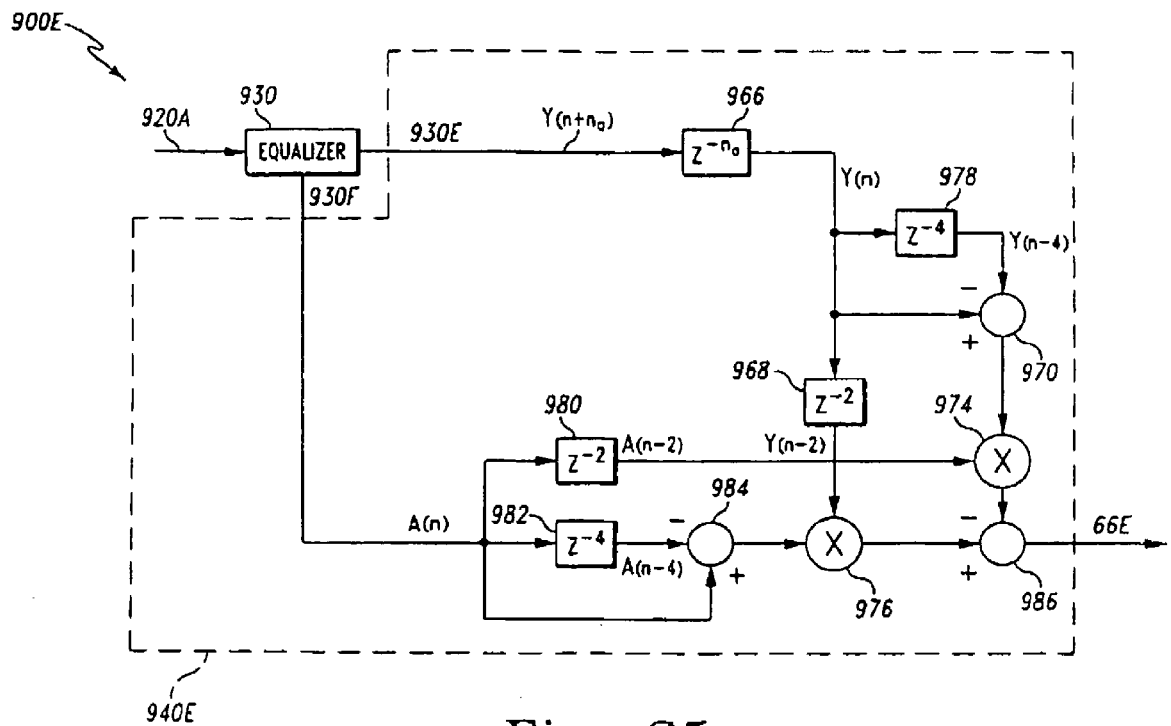
FIG. 35 is a block diagram of an embodiment of an overlapped equalizer within a combined demodulation and synchronization feedback loop.

Still another embodiment of system 900, illustrated as system 900E of FIG. 35 with continuing reference to system 900C of FIG. 33, uses the output of equalizer 930 to develop a decision directed synchronization feedback signal 66E. Functionally, system 900E is similar in form and function to systems 900C and 900D except in the formation of the decision directed synchronization feedback signal 66E provided to loop filter 916 shown in FIG. 33. As shown in FIG. 35, system 900E includes equalizer 930, delay line 966, two-symbol clock delay 968, subtractor 970, multiplier 974, multiplier 976, four-symbol clock delay 978, two-symbol clock delay 980, four-symbol clock delay 982, subtractor 984, and subtractor 986.

Equalizer 930 provides the equalized output 930E, also referred to as $Y(n+n_a)$, to delay line 966. Delay line 966 introduces $n_a$ symbol clocks of delay to compensate for the delay of the trellis decoder of equalizer 930. Delay line 966 provides Y(n) as an output to two-symbol clock delay 968, the positive input of subtractor 970 and four-symbol clock delay 978. Four-symbol clock delay 978 introduces an additional four-symbol clocks of delay and provides Y(n−4) to the negating input of subtractor 970. Subtractor 970 provides the difference signal Y(n)−Y(n−4) to multiplier 974.

Trellis decoder output 930F (referred to hereinafter as A(n)) is provided to two-symbol clock delay 980, four-symbol clock delay 982 and the positive input of subtractor 984. Four-symbol clock delay 982 provides a four clock delayed copy A(n−4) of the trellis decoder output 930F to the negating input of subtractor 984.

Multiplier 976 receives Y(n−2) from two-symbol clock delay 968 and a difference A(n)−A(n−4) from subtractor 984. Multiplier 976 provides the product Y(n−2)[A(n)−A(n−4)] to the positive input of subtractor 986. Similarly, multiplier 974 receives the difference Y(n)−Y(n−4) from subtractor 970 and A(n−2) from two-symbol clock delay 980. Multiplier 974 provides the product A(n−2)[Y(n)−Y(n−4)] to the negating input of subtractor 986. The output of subtractor 986 develops the decision directed synchronization control signal $$F_{66E}=Y(n-2)[A(n)-A(n-4)]-A(n-2)[Y(n)-Y(n-4)].$$

In some embodiments, the CDE estimate is calculated one time at the beginning of each equalizer adaptation process, illustratively, each time the receiver is tuned to a different signal source. In other embodiments, the CDE estimate is recalculated as an ongoing process to find the optimum virtual center position as channel conditions change. The virtual center is shifted according to the updated virtual center position by slowly changing the sampling clock frequency or repositioning the training signals over a period of time while maintaining system integrity.

Figure 37:
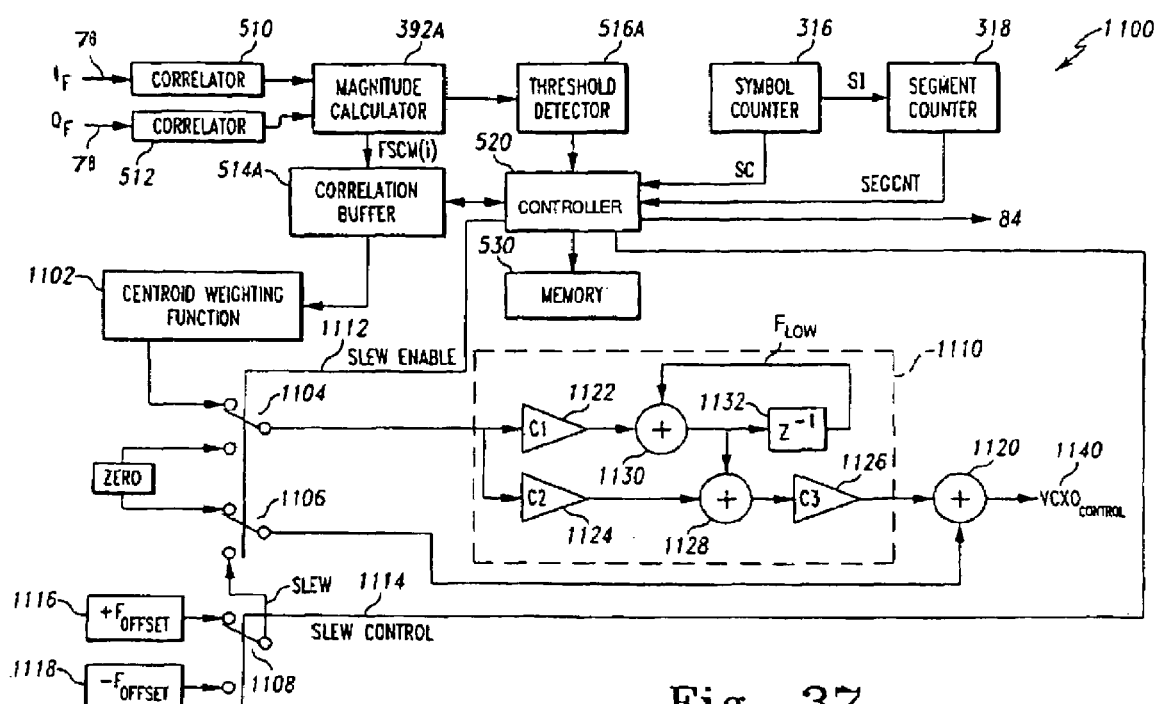
FIG. 37 is a block diagram of an embodiment of a field/frame sync correlation directed control system for controlling a VCXO in a digital receiver system.

As illustrated in FIG. 37, another embodiment of system 20 is correlation directed control (CDC) 1100. Similar to CDEU 230C of FIG. 14, CDC 100 includes symbol counter 316, segment counter 318, correlators 510 and 512, magnitude calculator 392A, correlation buffer 514A, threshold detector 516A, controller 520 and memory 530. CDC 1100 further includes centroid weighting function (CWF) 1102, switches 1104, 1106, and 1108, filter 1110, and adder 1120.

Although not shown, controller 520 also includes configuration and control interfaces to the elements of CDC 100. This includes, for example, reset and enabling signals, the ability to read and write registers, and facilities for sending or receiving indications to, from, or between the other elements. Some embodiments of CDC 100 further include a centroid estimator similar in form and function to centroid estimator 340A, as previously described in FIG. 14.

Correlation directed control 1100 receives filtered baseband signals $I_F$ 76 and $Q_F$ 78 as inputs to correlators 510 and 512, respectively. In some embodiments, CDC 1100 is adapted to receive two-times (2×) over-sampled representations of $I_F$ and $Q_F$. In other embodiments, CDC 1100 is adapted to receive a symbol rate representation of $I_F$ and $Q_F$. Still other embodiments of CDC 1100 are adapted to other over-sampled representations of the input signals. Correlators 510 and 512 operate on $I_F$ and $Q_F$ to produce frame sync correlation signals $SCV_I(i)$ and $SCV_Q(i)$, which are provided to magnitude calculator 392A. Similar to magnitude calculator 392, magnitude calculator 392A calculates $MAG_{FS}(i)$. In some embodiments $MAG_{FS}(i)=|SCV_I(i)|+|SCV_Q(i)|$. In other embodiments $MAG_{FS}(i)=SCV_I^2(i)+SCV_Q^2(i)$. The output of magnitude calculator 392A is frame sync correlation magnitude FSCM(i). In some embodiments, FSCM(i) is $MAG_{FS}(i)$. In other embodiments, magnitude calculator 392A low pass filters $MAG_{FS}(i)$ to produce FSCM(i). Correlation buffer 514A and threshold detector 516A receive FSCM(i) from magnitude calculator 392A. Illustratively, some embodiments of magnitude calculator 392A, receiving a 2× over-sampled representation of $I_F$ and $Q_F$, include a three-tap FIR filter. This allows the FIR filter to capture the majority of the power of a single field/frame sync correlation impulse, regardless of the sampling phase. The number of taps and filter complexity are based upon the over-sampled rate and need for noise reduction.

Correlation buffer 514A is scaled to receive the samples produced by magnitude calculator 392A. Illustratively, in some embodiments, correlation buffer 514A is scaled to receive 2049 values of FSCM(i). Still other embodiments include 1025 FSCM(i) samples. It will be understood that some embodiments of correlation buffer 514A are scaled to interface with fractionally spaced samples. Controller 520 interfaces with memory 530 and receives the values of SC and SEGCNT from symbol counter 316 and segment counter 318, respectively. As previously described in the above embodiments, controller 520 also provides channel delay estimate 84 and is connected to control system 54 (see FIG. 3).

Similar to CDEU 230C of FIG. 14, system 1100 detects the location of frame/field syncs present in the received signals. As described later in detail, threshold detector 516A receives the FSCM(i) values and compares them to detection threshold $T_{DET}$, which is the minimum FSCM(i) value for detecting a frame sync sequence in the incoming data stream. When a frame sync sequence is detected, controller 520 assigns the values of WINCENT=i, FSYM=SC, and FSEG=SEGCNT. Controller 520 then calculates the search window variables WINSTART and WINEND, which correspond to the first and last memory locations of the desired window in correlation buffer 514A.

Figure 38:
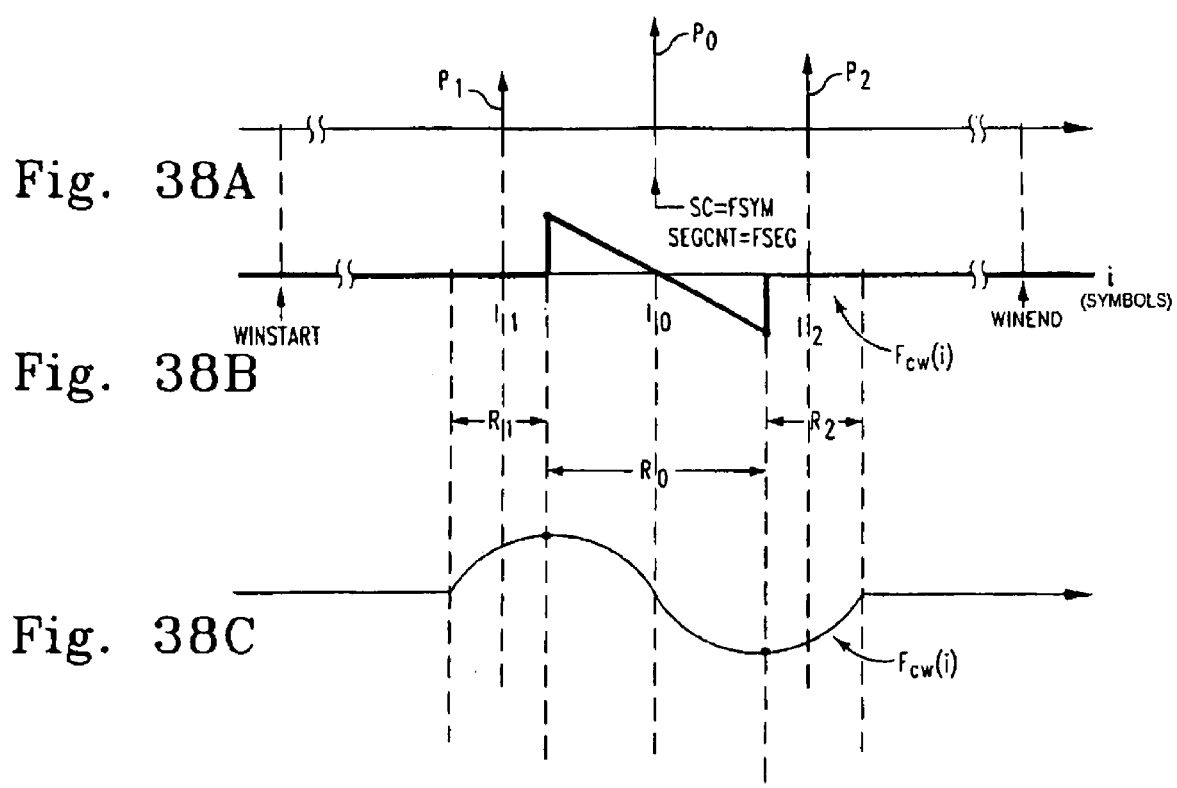
FIGS. 38A-38C show a relationship of a correlation weighting function to location of ghost signals in the channel.

Finally, similar to finding the regional $G_{MAX}$, $G_{PRE}$, and $G_{POST}$ as shown in FIG. 17, controller 520 defines regions $R_0$, $R_1$, and $R_2$ within the window defined by WINSTART and WINEND. As a non-limiting example, illustrated in FIG. 38A, $P_0$, $P_1$, and $P_2$ correspond to ghost signals with the maximum sync correlation value or power in respective regions $R_0$, $R_1$, and $R_2$. $P_0$, $P_1$, and $P_2$ are located at indices $I_0$, $I_1$, and $I_2$, respectively. In some embodiments, $R_0$, $R_1$, and $R_2$ span the entire window between WINSTART and WINEND. In other embodiments, as is also shown in FIG. 38A, $R_0$, $R_1$, and $R_2$ span only a portion of the window. As shown in FIG. 38A, the window, $W_{FS}$, spans 2M+1 symbol times; there are M symbol times preceding and following the symbol time for $P_0$. This causes CDC 1100 to select the first maximum-valued FSCM(i) as $P_0$. Still other embodiments reconfigure threshold detector 516A to locate FSCM(i)$\geq P_0$. As a result, CDC 1100 selects the last maximum-valued FSCM(i) within the span of the entire window as $P_0$.

After locating an initial $P_0$, controller 520 reconfigures threshold detector 516A to locate FSCM(i)>$P_0$. If threshold detector 516A detects a FSCM(i)>P$_0$, controller 520 re-centers the search window by setting WINCENT=i, FSYM=SC, FSEG=SEGCNT, P$_0$=FSCM(i), and I$_{MAX}$=i. Controller 520 then recalculates the values of WINSTART and WINEND. This process continues until i=WINEND. Controller 520 selects the regions R$_0$, R$_1$, and R$_2$ based upon the final value of WINCENT. Controller 520 then searches correlation buffer 514A to find the regional maximums P$_1$ and P$_2$ in regions R$_1$ and R$_2$, respectively.

Centroid weighting function 1102 receives FSCM(i) from correlation buffer 514A and calculates a weighted average to drive filter 1110. In some embodiments, CWF 1102 uses the FSCM(i) values associated with P$_0$, P$_1$, and P$_2$; CWF 1102 then has an output:

$$CWF_{OUT} = \sum_{i=I_0, I_1, I_2} F_{CW}(i) \cdot FSCM(i)$$

In other embodiments, CWF 1102 calculates a weighted average of all the correlation values within the regions R$_0$, R$_1$, and R$_2$.

$$CWF_{OUT} = \sum_{\forall i \in R_0, R_1, R_2} F_{CW}(i) \cdot FSCM(i)$$

As shown in FIG. 38B, one embodiment of the windowing function F$_{CW}$(i) is a set of piecewise linear ramp functions. Other embodiments of F$_{CW}$(i), are odd functions defined to have a value of zero outside of the regions R$_0$, R$_1$, and R$_2$. Some embodiments have a value of zero in regions R$_1$ and R$_2$ as well. As illustrated in FIG. 38C, some embodiments of CDC 1100 include a F$_{CW}$(t) based on a windowed sine function.

Centroid weighting function 1102 provides CWF$_{OUT}$ to the first input of switch 1104. The second input of switch 1104 receives a digital zero. The first and second inputs of switch 1106 receive a digital zero and the output of switch 1108 (SLEW) respectively. Controller 520 provides the control signal SLEW ENABLE 1112 to switches 1104 and 1106. Asserting SLEW ENABLE 1112 selects the second inputs of switches 1104 and 1106. This allows controller 520 to control the output of the VCXO by selecting the output of switch 1114. Otherwise, switches 1104 and 1106 provide CWF$_{OUT}$ and digital zero to the inputs of filter 1110 and adder 1120 respectively. Switch 1108 receives offset values +F$_{OFFSET}$ 1116 and −F$_{OFFSET}$ 1118. In some embodiments, F$_{OFFSET}$ may be dynamically increased by an integrator in controller 520 if it is determined that a larger value is required. In other embodiments, there is a limit on this integrator to keep F$_{OFFSET}$ below a maximum value. Signal SLEW CONTROL 1114, from controller 520, selects the value of SLEW provided to the second input of switch 1106. Controller 520 slews the VCXO output frequency by selecting either +F$_{OFFSET}$ 1116 or −F$_{OFFSET}$ 1118. Switch 1104 provides an output to filter 1110. Filter 1110 and switch 1106 provides inputs to adder 1120, which produces VCXO$_{CONTROL}$ 1140.

In some embodiments filter 1110 is a low pass filter. Illustratively, some embodiments of filter 1110 are configured as a lead-lag filter. As shown in FIG. 37, filter 1110 includes scalars 1122, 1124, and 1126, adders 1128 and 1130, and delay element 1132. Scalars 1122 and 1124 both receive the output of switch 1104 as an input. Scalar 1122 multiplies the received input by a scalar value C$_1$ and provides an output to adder 1130. Delay element 1132 receives the output of adder 1130 and provides (F$_{LOW}$) to adder 1130. F$_{LOW}$ represents the low-frequency component of the VCXO frequency offset relative to the received signal time base. In some embodiments, F$_{LOW}$ is updated each field/frame sync period. In other embodiments, described later, F$_{LOW}$ is updated each segment sync period. Scalar 1124 multiplies output of switch 1104 by a scalar value C$_2$. Adder 1128 receives the outputs of scalar 1124 and adder 1130. Scalar 1126 multiplies the output of adder 1128 by scalar value C$_3$ and provides an output to adder 1120.

As illustrated in FIG. 37, switches 1104 and 1106 form a double-pole double-throw configuration selectively controlled by controller 520 signal SLEW ENABLE 1112. When SLEW ENABLE signal 1112 is not asserted, filter 1110 receives CWF$_{OUT}$, and the filter transfer function is H(z)=C$_3$[C$_1$(I+Z$^{-1}$)+C$_2$]. Thus, VCXO$_{CONTROL}$=C$_3$[(C$_1$+C$_2$)CWF$_{OUT}$+F$_{LOW}$], where F$_{LOW}$ is the low frequency VCXO offset of the system stored in delay element 1132.

When SLEW ENABLE signal 1112 is enabled, the output of adder 1120 is VCXO$_{CONTROL}$=C$_3$F$_{LOW}$+SLEW where SLEW is equal to either +F$_{OFFSET}$ or −F$_{OFFSET}$. The output of delay element 1132, F$_{LOW}$, remains constant while SLEW ENABLE signal 1112 is asserted. This preserves the low frequency offset information until SLEW ENABLE 1112 is de-asserted.

Figure 39:
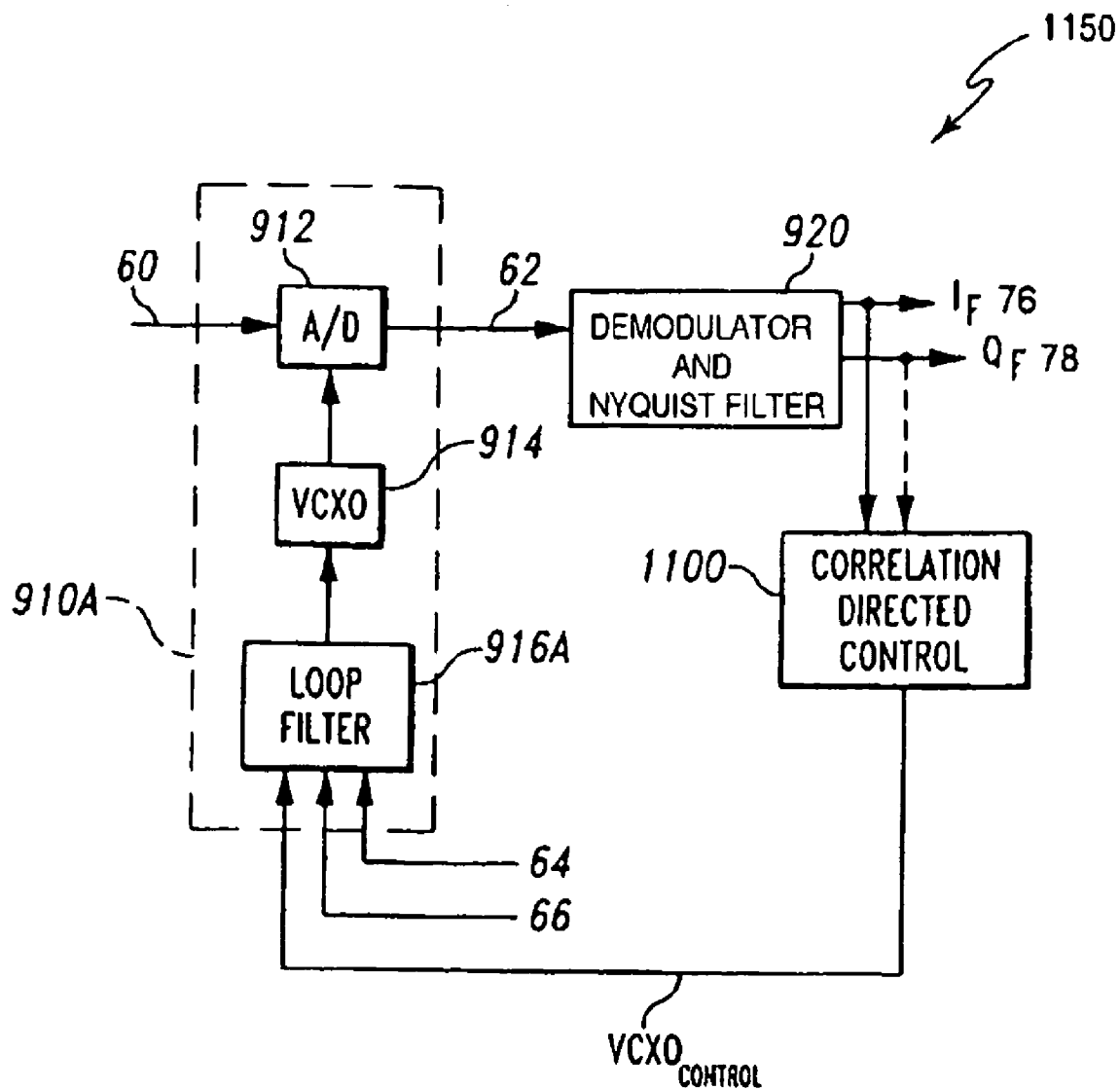
FIG. 39 is a block diagram of an embodiment of a correlation directed synchronization feedback system.

As illustrated in FIG. 39, one embodiment of system 20, including correlation directed synchronization control loop 1150, has synchronization 910A, demodulator 920 and correlation directed control (CDC) 1100. Synchronization 910A is similar to synchronization 910 of system 900 as previously described in the above embodiments; however, synchronization 910A includes loop filter 916A instead of loop filter 916.

Figure 41:
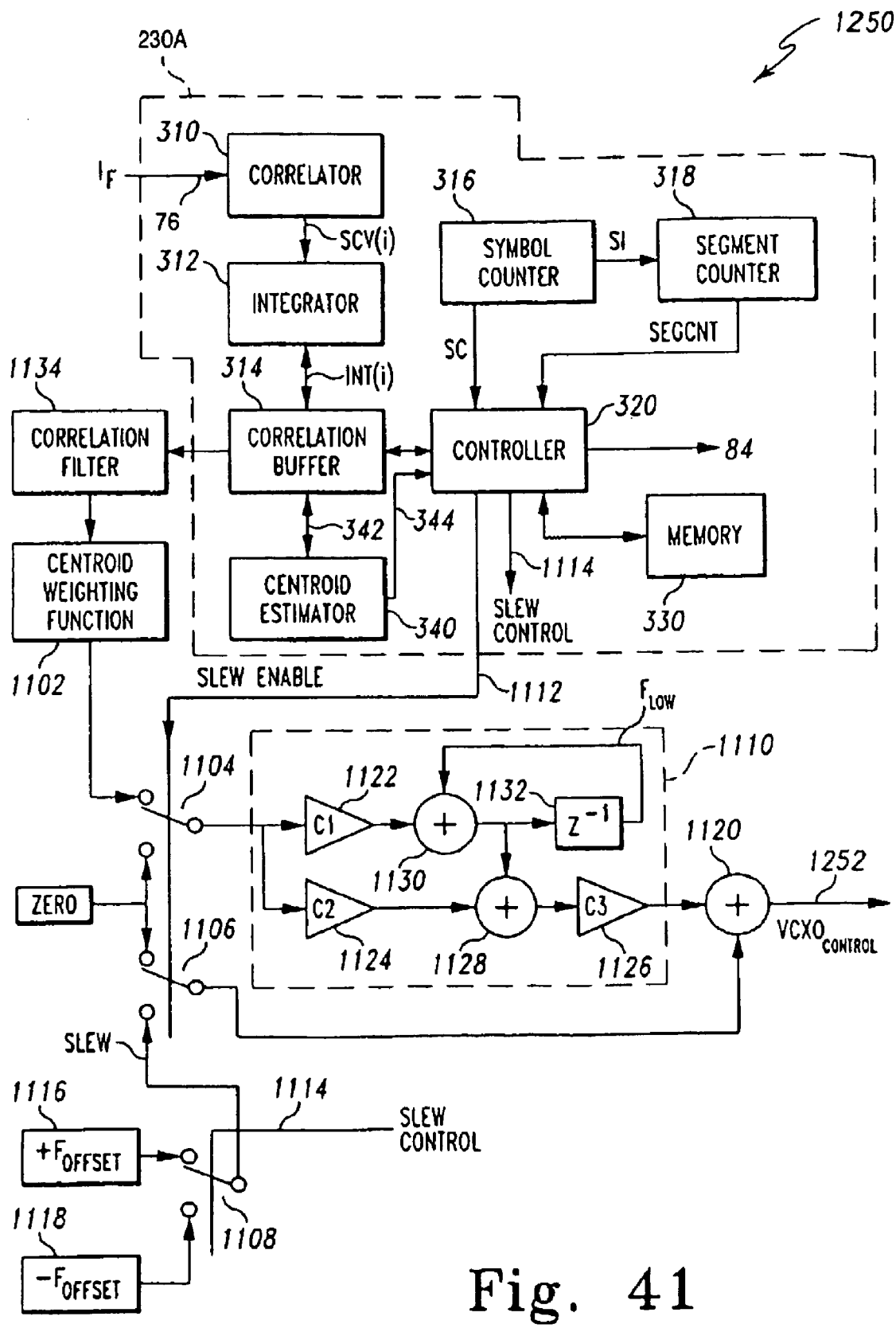
FIG. 41 is a block diagram of an embodiment of a system producing a segment sync based correlation directed control signal.

Some embodiments of a correlation directed synchronization control loop 1150, as shown in FIG. 39, include a CDC 1100 that receives both I$_F$ and Q$_F$ while other embodiments, similar to CDEU 230A of FIG. 6 or CDC 1250 of FIG. 41, only receive I$_F$. Returning back to FIG. 39, loop filter 916A has three feedback inputs. Similar to loop filter 916, loop filter 916A receives non-coherent synchronization feedback signal 64 and decision directed synchronization feedback signal 66. Loop filter 916A further includes an interface for receiving VCXO$_{CONTROL}$ from CDC 1100. Loop filter 916A also includes devices and techniques for switching between the various feedback control signals provided to inputs thereof. Some embodiments of loop filter 916A also include a technique for weighting the received feedback control signals. Illustratively, some embodiments of loop filter 916A employ a weighted average to transition between decision directed synchronization feedback signal 66 and VCXO$_{CONTROL}$ based upon the operational state of system 20.

As illustrated in FIG. 39, synchronization 910A receives analog near baseband signal 60 and provides demodulator and Nyquist filter block 920 with a digitized near baseband signal 62. Demodulator and Nyquist filter block 920 provides I$_F$ 76 to CDC 1100. In some embodiments demodulator 920 also provides Q$_F$ 78 to CDC 1100.

CDC 1100 produces VCXO$_{CONTROL}$ as an input to loop filter 916A. Loop filter 916A filters the received control signal and provides a control signal to VCXO 914. The A/D 912 receives the clock produced by VCXO 914 and samples the received analog near baseband signal 60. Some embodiments of system 20 rely exclusively on CDC 1100 to provide a control feedback signal to synchronization 910A. Similarly other embodiments of system 20 may include some subcombination of non-coherent synchronization feedback control signal 64, decision directed feedback signal 66, and the correlation directed control signal $VCXO_{CONTROL}$.

Another embodiment of CDC 1100 adapted for an ATSC broadcast, the operation of which is implemented by system 1200 of FIG. 40, will now be discussed with continuing reference to the elements of FIGS. 37 and 39. At 1202 of FIG. 40, "Initialization," the elements of CDC 1100 are initialized as will be understood by those skilled in the art. Illustratively, controller 520 resets the elements of CDC 1100; initializes the registers in memory 530, symbol counter 316, segment counter 318, magnitude calculator 392A, correlator 510, correlator 512, correlation buffer 514A, CWF 1102, and filter 1110; and configures various control signals shown and not shown. For example, the register containing the value of $P_0$ is set to $T_{DET}$. Furthermore, SC, SEGCNT, and index variable i are initialized. System 1200 then proceeds to 1204.

At 1204, "Correlation," correlators 510 and 512 receive the most recent filtered in-phase and quadrature baseband signals $I_F$ 76 and $Q_F$ 78, respectively. Similar to CDEU 230C of FIG. 14 correlators 510 and 512 correlate $I_F$ 76 and $Q_F$ 78 with a frame sync sequence. As in the embodiments discussed above, magnitude calculator 392A receives $SCV_I(i)$ and $SCV_Q(i)$ from correlators 510 and 512, respectively, and calculates the magnitude of the correlation, $MAG_{FS}(i)$. Magnitude calculator 392A low pass filters $MAG_{FS}(i)$ to produce FSCM(i), which is provided to correlation buffer 514A and threshold detector 516A. Correlation buffer 514A stores FSCM(i) in array M(i). As discussed above, some embodiments of magnitude calculator do not include a low pass filter function; FSCM(i)=$MAG_{FS}(i)$. System 1200 proceeds to 1206.

At 1206, "Detect Frame Sync," if FSCM(i)<$T_{DET}$ and FSCM(i)<$P_0$ (a negative result), threshold detector 516A sends a negative indication to controller 520 that no frame sync or maximum valued ghost signal was detected. Controller 520 then branches system 1200 to 1212. Otherwise, if FSCM(i)$\geq T_{DET}$ and FSCM(i)$\geq P_0$ (a positive result at 1206), threshold detector 516 sends a positive indication to controller 520 that a valid maximum valued ghost signal was detected. Recalling that initially $P_0=T_{DET}$, the first indication is the first detected field/frame sync. Subsequently setting $P_0$=FSCM($I_0$) causes system 1200 to detect a maximum frame sync correlation since now $P_0 \geq T_{DET}$. System 1200 operation then branches to 1208.

At 1208, "Store Center," controller 520 sets FSYM=SC and FSEG=SEGCNT, which saves the temporal location of the maximum frame sync correlation detected within the data packet field/frame structure. Controller 520 also sets WINCENT=i and calculates the search window variables WINSTART and WINEND, which correspond to the first and last memory locations of the desired window in correlation buffer 514A. Finally, controller 520 stores $I_0$=i and $P_0$=FSCM ($I_0$). Controller 520 then branches system 1200 operation to 1212.

At 1212, "Continue," controller 520 determines whether to continue to 1216 "Find Regional Maximums." If system 1200 has not previously detected a field/frame sync or i≠WINEND, (NO), system 1200 branches to 1214. Otherwise, if system 1200 has detected a field/frame sync and i=WINEND, (YES), controller 520 branches system 1200 operation to 1216.

At 1214, "Increment," the values of symbol counter 316 and segment counter 318 are updated. Index variable i is also incremented. System 1200 operation continues to 1204.

At 1216, "Find Regional Maximums," controller 520 defines the regions $R_0$, $R_1$, and $R_2$. Controller 520 then searches regions $R_1$ and $R_2$ to locate $P_1$ and $P_2$, respectively. As described above, in some embodiments, CDC 1100 also estimates the channel delay based upon the same field/frame sync correlation results. System 1200 continues to 1218.

At 1218, "$P_0$>$4P_1$," if $P_0$>$4P_1$, system 1200 continues to 1222. Otherwise, system 1200 continues to 1220.

At 1220, "Select New $P_0$," controller 520 selects $P_1$ as the new $P_0$. This may result in $P_0$ not corresponding to the ghost with the maximum frame sync sequence. Following the selection of a new $P_0$, controller 520 redefines the regions $R_0$, $R_1$, and $R_2$. Controller 520 then searches regions $R_1$ and $R_2$ to relocate $P_1$ and $P_2$, respectively. Finally, system 1200 continues to 1222.

At 1222, "$P_0$>$P_2/9$," if $P_0$>$P_2/9$, system 1200 enters a VXCO slew control loop by continuing to 1224. Otherwise, system 1200 continues to 1230.

At 1224, "$-F_{OFFSET}$," controller 520 asserts slew enable signal 1212. This causes the output of adder 1120 to provide $VCXO_{CONTROL}=C_3 \cdot F_{LOW}-F_{OFFSET}$. As a result, the VCXO clock sampling the received data signal decreases in frequency. This effectively moves the ghost $P_2$ towards the $R_0$ region. The VCXO long term frequency offset from the transmitter symbol time base, $F_{LOW}$, is preserved in delay element 1132 and represented by $C_3 \cdot F_{LOW}$. However, the training signals (Frame Sync and Segment Sync) used to evolve the equalizer coefficients retain the same timing based on the previously calculated channel delay. As a result, the virtual center migrates temporally relative to the ghost appearing in the channel without requiring re-initialization of the equalizer structure or re-calculation of the channel delay estimate. System 1200 then proceeds to 1226.

Thereafter, at 1226, "Update Correlation," when SEGCNT=FSEG, system controller configures CDC 1100 to develop new values of FSCM(I) within the window $W_{FS}$ defined by WINSTART, WINEND, FSYM, and FSEG. The correlation values FSCM(i) are updated on a frame or field sync rate. As illustrated in FIG. 38A, window $W_{FS}$, with 2m+1 samples, begins m symbol times prior to SC=FSYM and SEGCNT=FSEG. Typically window $W_{FS}$ is based upon the first FSCM(i) value detected above threshold $T_{DET}$ by CDC 1100. Thus, subsequent correlation updates may cause $P_0$ not to be centered within $W_{FS}$. Other embodiments allow $W_{FS}$ to migrate over time to insure $P_0$ is, on average, centered within $W_{FS}$. Still other embodiments recenter $W_{FS}$ as the relative position of $P_0$ moves over time. After the updated FSCM(i) values are placed in correlation buffer 514A, controller 520 locates the new positions of $P_0$, $P_1$, and $P_2$ in the previously defined regions $R_0$, $R_1$, and $R_2$. System 1200 then proceeds to 1228.

At 1228, "$P_0$>$P_2/2$," if $P_0 \leq P_2/2$ (a negative result), system 1200 continues to 1224. This forms a control loop to incrementally adjust the VCXO timing and move $P_2$ towards region $R_0$. Once $P_0$>$P_2/2$ (positive result), system 1200 departs the loop and control proceeds to 1230.

At 1230, "$P_0$>$2P_1$," if $P_0$>$2P_1$ system 1200 proceeds to 1238. Otherwise, if $P_0 \leq 2P_1$, system 1200 enters the VCXO slew control mode by proceeding to 1232.

At 1232, "$+F_{OFFSET}$," $VCXO_{CONTROL}=C_3 \cdot F_{LOW}+F_{OFFSET}$. The VCXO clock frequency increases and temporally reduces the delay of the signal producing correlation $P_1$. This causes $P_1$ to move towards the $R_0$ region. Similar to before, delay element 1132 retains the value of $F_{LOW}$, and $C_3 \cdot F_{LOW}$ preserves the VCXO low frequency offset from the transmitter time base. However, the timing of training pulses (Frame Sync/Segment Sync) used to evolve the equalizer coefficients remains the same. As a result, the virtual center migrates temporally relative to the ghost appearing in the channel without requiring re-initialization of the equalizer structure or re-calculation of the channel delay.

Then at 1234, "Update Correlation," controller 520 configures CDC 1100 to develop new values of FSCM(i) similar to "Update Correlation" 1236. Controller 520 searches correlation buffer 514A to locate $P_0$, $P_1$, and $P_2$ in $W_{FS}$.

At 1236, "$P_0 > 3P_1$," if $P_0 \leq 3P_1$ (a negative result), system 1200 continues to 1232. This forms a loop to incrementally adjust the VCXO timing and moves $P_1$ towards region $R_0$. However, once $P_0 > 3P_1$ (a positive result at 1236), system 1200 departs from the loop and returns to 1222.

At 1238, "CWF$_{OUT}$," controller 520 de-asserts SLEW ENABLE, and VCXO$_{CONTROL}$=$C_3[(C_1+C_2)$CWF$_{OUT}$+$F_{LOW}]$.

At 1240, "Update Correlation," system 1100 develops new values of FSCM(i) corresponding to the window $W_{FS}$. Controller 520 searches correlation buffer 514A to update $P_0$, $P_1$, and $P_2$ as found in $R_0$, $R_1$, and $R_2$. Delay element 1132 updates $F_{LOW}$=CWF$_{OUT}C_1+F_{LOW}$. System 1200 then returns to 1222. In some embodiments, one or more of decision blocks 1212, 1218, 1222, 1228, 1230, and 1236 may have some type of confidence counter that is used to condition the decision transitions.

Another embodiment of system 20 adapted for an ATSC standard broadcast, illustrated as CDC 1250 in FIG. 41, includes CDEU 230A, centroid weighting function 1102, switches 1104, 1106, and 1108, filter 1110, adder 1120, and correlation filter 1134.

Similar to CDEU 230A of FIG. 6, system 1250 receives filtered baseband signals $I_F$ 76 as an input to correlator 310. Although not shown, some embodiments of system 1250 are similar to CDEU 230B and, as explained above, calculate the magnitude of the correlation of $I_F$ 76 and $Q_F$ 78 with a segment sync sequence. In some embodiments, similar to CDC 1100, system 1250 receives a 2× over-sampled representation of $I_F$ and $Q_F$. In other embodiments, system 1250 is adapted to receive a symbol rate representation of $I_F$ and $Q_F$. Still other embodiments of system 1250 include another oversampled representation of $I_F$ 76 and $Q_F$ 78.

As illustrated in FIG. 41, correlator 310 operates on $I_F$ 76 to produce symbol correlation value SCV(i). Integrator 312 receives SCV(i) and produces INT(i), which is stored in memory location M(i) of correlation buffer 314. However, as explained later, whereas the previous described embodiments of CDEU 230A calculate the symbol sync correlation over N segment sync periods to develop a channel delay estimate, system 1250 continues to update the correlation values, INT(i), stored in correlation buffer 314. This permits continuous updates to the correlation directed control signal 1252, which is otherwise referred to hereinafter as the VCXO$_{CONTROL}$ signal 1252. Correlation filter 1134 low pass filters the values of INT(i) received from correlation buffer 314. Some embodiments of system 1250, similar to CDEU 230B of FIG. 13, calculate MAG(i) prior to the low pass filtering operation. Illustratively, in some embodiments MAG(i)=|INT(i)|. In embodiments of system 1250, MAG(i)=INT(i)$^2$. In embodiments where both $I_F$ 76 and $Q_F$ 78 are both processed, MAG(i)=|INT$_I$(i)|+|INT$_Q$(i)| or MAG(i)=[INT$_I$(i)$^2$+INT$_Q$(i)$^2$]. Still other embodiments of 1250, not shown, do not include correlation filter 1134 and rely upon integrator 314 to provide the necessary temporal filtering.

Centroid Weighting Function 1102 is scaled to receive the appropriate number of samples produced by correlation filter 1134. Illustratively, in some embodiments, centroid weighting function 1102 is scaled to receive 1664 samples. Still other embodiments include 832 samples. Controller 320 interfaces with memory 330 and receives the values of SC and SEGCNT from symbol counter 316 and segment counter 318, respectively. Similar to controller 320 of FIG. 6, controller 320 interfaces with control system 54 (see FIG. 3). Controller 320 further includes, although not shown, interfaces to the elements of system 1250 necessary for configuration and control.

Similar to CDEU 230A of FIG. 6, system 1250 detects the location of segment syncs present in the received signals and determines the CIR estimate. The channel delay is estimated from the CIR estimate and is used to position the virtual center of the overlapped equalizer. Similar to controller 520 of CDC 1100 in FIG. 37, controller 320 searches correlation buffer 314 to locate $P_0$, which corresponds to the maximum value of MAG(i). Controller 320 centers region $R_0$ about $P_0$. Controller 320 then searches correlation buffer 314 to fed the local maximum values of MAG(i) in regions $R_1$ and $R_2$, $P_1$ and $P_2$, respectively. As shown in FIG. 38A, $P_0$, $P_1$, and $P_2$ are defined as ghost signals with the maximum correlation value or power in the respective regions $R_0$, $R_1$, and $R_2$. $P_0$, $P_1$, and $P_2$ are located at $I_0$, $I_1$, and $I_2$, respectively. In some embodiments, $R_0$, $R_1$, and $R_2$ span the entire segment sync period. In other embodiments, $R_0$, $R_1$, and $R_2$ span only a portion of the segment sync period.

Correlation filter 1134 low pass filters the MAG(i) values provided to CWF 1102. In some embodiments, CWF 1102 only uses the values of $P_0$, $P_1$, and $P_2$; CWF 1102 has an output:

$$CWF_{OUT} = \sum_{i=I_0, I_1, I_2} F_{CW}(i) \cdot MAG(i)$$

In other embodiments, CWF 1102 calculates a weighted average of all the ghosts within the regions $R_0$, $R_1$, and $R_2$:

$$CWF_{OUT} = \sum_{\forall i \in R_0, R_1, R_2} F_{CW}(i) \cdot MAG(i)$$

Similar to CDC 1100 of FIG. 37, some embodiments CDC 1250 have a windowing function $F_{CW}(i)$ similar to the piecewise linear ramp functions of FIG. 38B adapted to the appropriate sampling rate. Other embodiments of $F_{CW}(i)$ are odd functions defined to have a value of zero outside of the regions $R_0$, $R_1$, and $R_2$. Some embodiments of CDC 1250 include a $F_{CW}(i)$ based on a windowed sine function, also adapted to the sampling rate, similar to FIG. 38C.

Otherwise, system 1250 operates substantially similar to CDC 1100 to create correlation directed control signal VCXO$_{CONTROL}$ 1252 at the output of adder 1120. Centroid weighting function 1102 provides an output thereof as a first input of switch 1104. The second input of switch 1104 is a digital zero. The first input to switch 1106 is a digital zero. The second input of switch 1106 is the signal SLEW from switch 1108. Switch 1108 receives offset values +F$_{OFFSET}$ 1116 and −F$_{OFFSET}$ 1118. Similar to controller 520 of CDC 1100, controller 320 provides SLEW CONTROL signal 1114 to switch 1108 and, as described later, slews the output of correlation directed control signal 125 by selecting either +F$_{OFFSET}$ 1116 or −F$_{OFFSET}$ 1118. Switch 1104 provides an output to filter 1110. Filter 1110 and switch 1106 provide inputs to adder 1120. The output of adder 1120 is correlation directed control signal VCXO$_{CONTROL}$ 1252.

Similar to CDC 1100 of FIG. 37, switches 1104 and 1106 form a double-pole double-throw configuration. When controller 320 does not assert SLEW ENABLE 1112, the output of adder 1120 is VCXO$_{CONTROL}$=$C_3[(C_1+C_2)$CWF$_{OUT}$+

$F_{LOW}$], where $F_{LOW}$ is the low frequency offset of the system stored in delay element 1132. The transfer function of filter 1110 is $H(z)=C_3[C_1(1+Z^{-1})+C_2]$.

When SLEW ENABLE signal 1112 is enabled, the output of adder 1120 is $VCXO_{CONTROL}=C_3 \cdot F_{LOW}+SLEW$, where SLEW is either $+F_{OFFSET}$ or $-F_{OFFSET}$. The output of delay element 1132, $F_{LOW}$, remains constant while SLEW ENABLE signal 1112 is asserted. This preserves the low frequency offset information until signal 1112 is de-asserted, thereby re-enabling normal operation of filter 1110. In some embodiments, $F_{OFFSET}$ may be dynamically increased by an integrator in controller 520 if it is determined that a larger value is required. In other embodiments, there is a limit on this integrator to keep $F_{OFFSET}$ below a maximum value.

Figure 42:
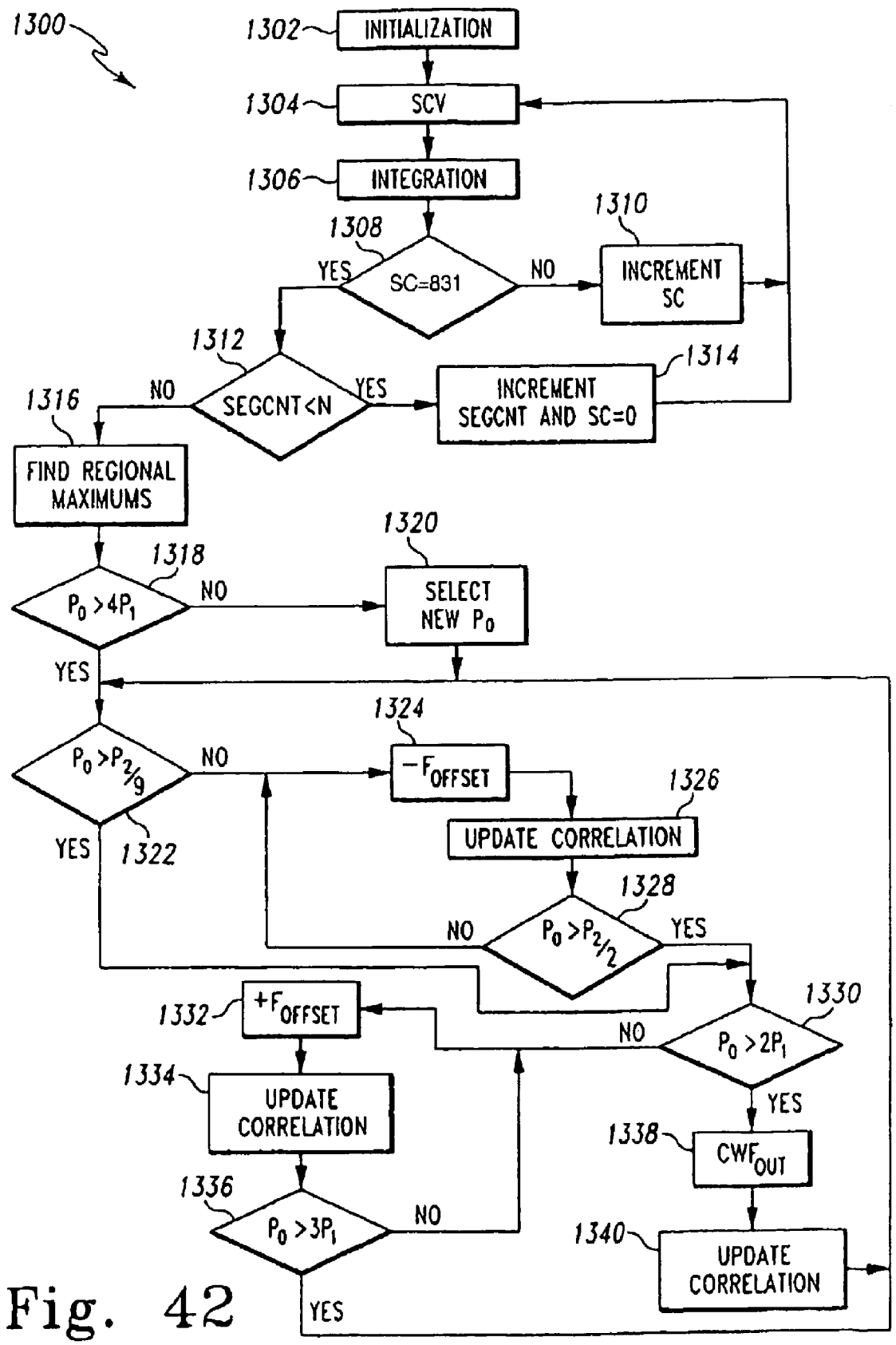
FIG. 42 is a flow chart describing operation of an embodiment of a system for generating a segment sync base correlation directed control signal.

Another embodiment of system 1250 will now be discussed with continuing reference to elements of FIG. 41, is illustrated as system 1300, the operation of which is illustrated in FIG. 42, which is also adapted for an ATSC broadcast and symbol sampling rate. At 1302, "Initialization," controller 320 initializes elements of system 1250. Illustratively, controller 320 initializes the registers in memory 330, symbol counter 316, segment counter 318, magnitude calculator 392, correlator 310, correlation buffer 314, CWF 1102, filter 1110, correlation filter 1134, and various control signals. Furthermore, SC, SEGCNT, and index variable i are initialized. After initialization of system 1300, operation proceeds to 1304.

Figure 12:
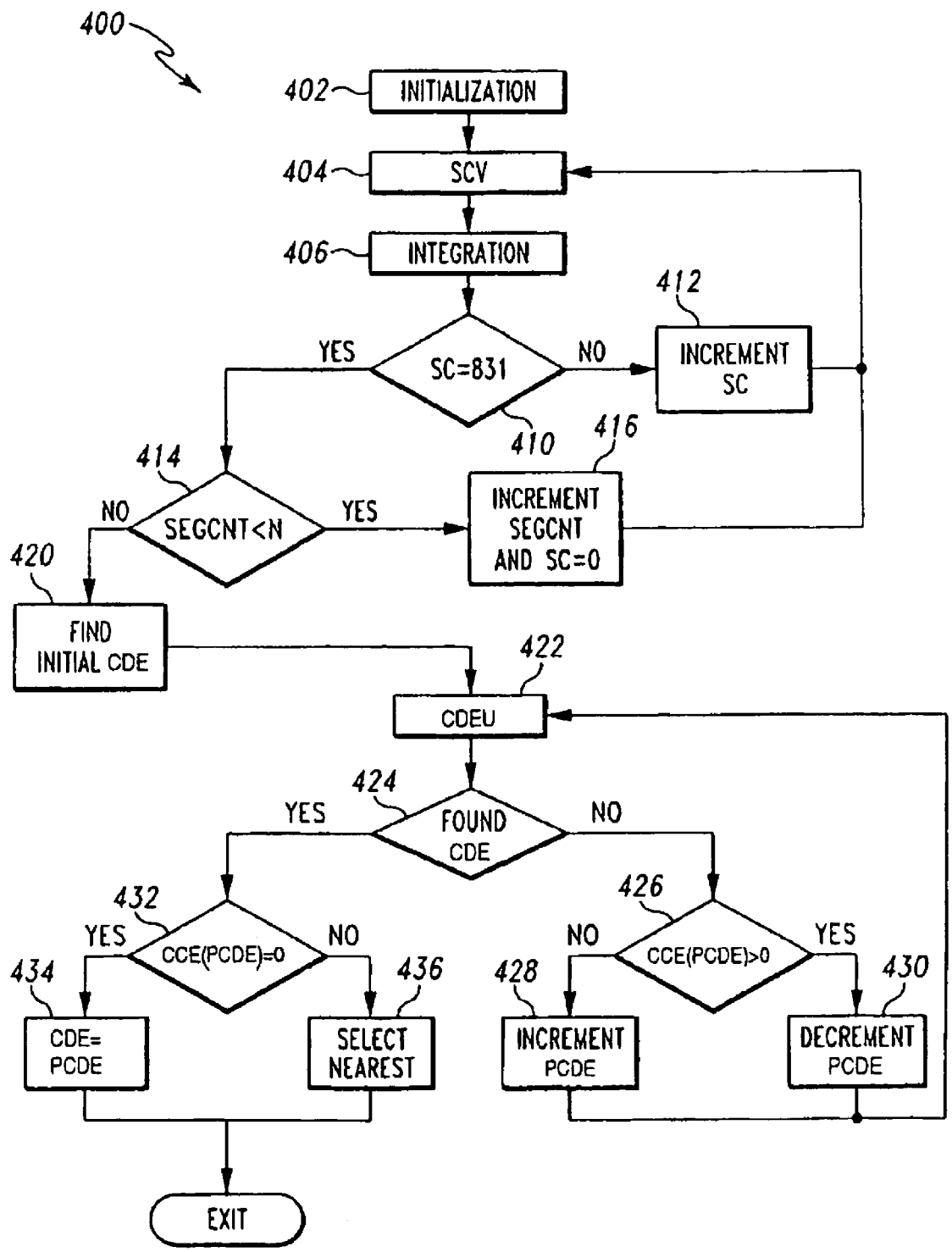
FIG. 12 is a flow diagram illustrating operation of a CDEU.

At 1304, "SCV," similar to system 400 of FIG. 12, correlator 310 receives a new symbol time of data from filtered in-phase baseband signal $I_F$ 76 and calculates the value of SCV(i) corresponding to the symbol count produced by symbol counter 316. System 1304 transitions to 1306.

At 1306, "Integration," similar to CDEU 230A integrator 312 receives SCV(i) from correlator 310 and calculates the value of INT(i) to be stored in array M(i) of correlation buffer 314. System 1300 then proceeds to 1308.

At 1308, "SC=831," similar to 410 of system 400 of FIG. 12, controller 320 determines whether SC equals the maximum output of symbol counter 316. Illustratively, a positive result occurs when SC=831, where SC has a range of 0 to 831, and system 1300 transitions to 1312. Otherwise, a negative result occurs at 1308, thereby causing system 1300 to transition to 1310 so that symbol counter 316 increments the value of SC and controller 320 increments the index variable i. Control then returns to 1304.

At 1312, "SEGCNT<N," controller 320 compares the output of segment counter 318, SEGCNT, to the value N stored in segment count register 338. If SEGCNT<N, controller 320 branches system 1300 operation to 1314, symbol counter 316 sets SC=0, and segment counter 318 increments SEGCNT. However, if SEGCNT=N, system 1300 operation transitions to 1316.

Figure 40:
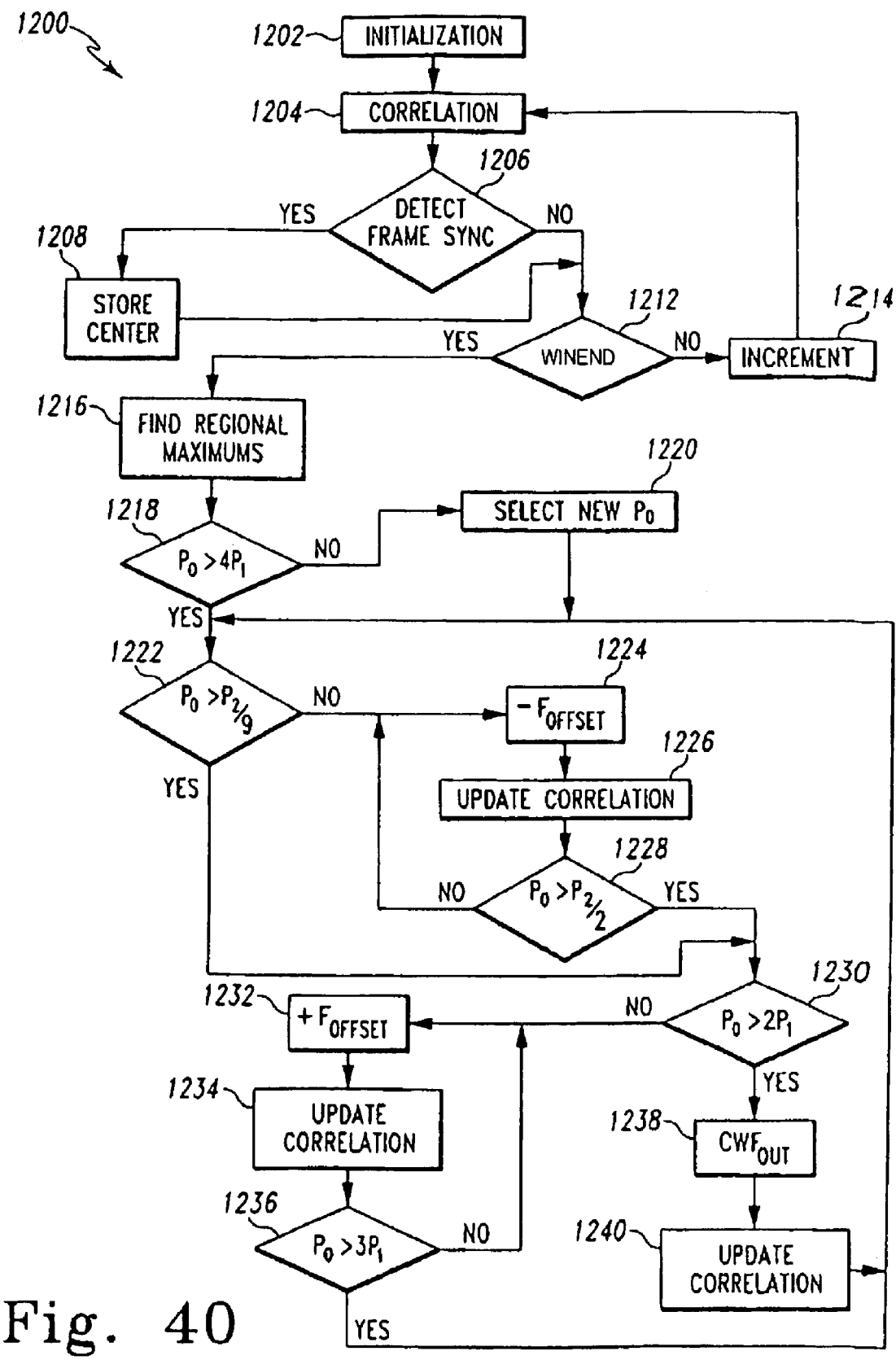
FIG. 40 is a flow chart describing operation of an embodiment of a correlation directed synchronization feedback loop system.

At 1316, similar to 1216 of system 1200 of FIG. 40, "Find Regional Maximums," controller 320 defines the regions $R_0$, $R_1$, and $R_2$. Controller 320 then searches regions $R_1$ and $R_2$ to locate $P_1$ and $P_2$, respectively. In some embodiments, controller 320 inter-operates with a centroid estimator, shown as centroid estimator 340 in FIG. 41, to determine the appropriate CDE value. System 1300 continues to 1318.

At 1318, "$P_0>4P_1$," if $P_0>4P_1$, system 1300 continues to 1322. Otherwise, system 1300 continues to 1320.

At 1320, "Select New $P_0$," similar to 1220 of system 1200 of FIG. 40, controller 320 selects $P_1$ as the new $P_0$. In some cases, this results in $P_0$ not corresponding to the maximum value of MAG(i) in correlation buffer 314. Following this selection, controller 320 redefines the regions $R_0$, $R_1$, and $R_2$ based upon the location of the new $P_0$. Controller 320 then searches regions $R_1$ and $R_2$ to locate $P_1$ and $P_2$, respectively. Finally, system 1300 continues to 1324.

At 1322, "$P_0>P_2/9$," similar to system 1200 of FIG. 40, a negative result occurs when $P_0 \leq P_2/9$, and system 1300 enters a VXCO slew control loop by continuing to 1322. Otherwise, a positive result occurs when $P_0>P_2/9$, and system 1300 continues to 1330.

At 1324, "$-F_{OFFSET}$," similar to 1224 of system 1200 of FIG. 40, controller 320 asserts signal SLEW ENABLE 1112. This causes the output of adder 1120 to provide $VCXO_{CONTROL}=C_3 \cdot F_{LOW}-F_{OFFSET}$. Thus, similar to CDC 1100, delay element 1132 preserves the low frequency offset $F_{LOW}$ of filter 1110.

At 1326, "Update Correlation," system 1300 updates the correlation values stored in correlation buffer 314. In some embodiments, system 1250 integrates SCV(i) values generated during the most recent segment sync period. In other embodiments, system 1250 re-initializes portions of 230A and develops a new set of INT(i) and MAG(i) values over a number of segment sync periods. Controller 320 searches correlation buffer 314 to locate updated $P_0$, $P_1$, and $P_2$ falling within the window created by the existing $R_0$, $R_1$, and $R_2$. Correlation filter 1134 receives the updated correlation buffer 314 output and provides the updated low pass filtered MAG(i) to CWF 1102. CWF 1102 then calculates an updated $CWF_{OUT}$. As discussed previously, some embodiments of system 1250 only use the updated $P_0$, $P_1$, and $P_2$ to generate an updated $CWF_{OUT}$. However, similar to CDC 1100, some embodiments of system 1250 migrate regions $R_0$, $R_1$, and $R_2$ in response to a change in location of $P_0$.

At 1328, "$P_0>P_2/2$," a negative result occurs when $P_0 \leq P_2/2$, and system 1300 remains in the VXCO slew control loop by returning to 1324. This forms a loop to incrementally adjust $VCXO_{CONTROL}$. A positive result occurs when $P_0>P_2/2$: system 1300 departs from the VCXO slew control loop; and system 1300 eventually continues to 1330.

At 1330, "$P_0>2P_1$," a positive result occurs when $P_0>2P_1$, and system 1300 proceeds to 1338. Otherwise, a negative result occurs when $P_0 \leq 2P_1$, and system 1300 enters a VCXO slew control loop by proceeding to 1332.

At 1332, "$+F_{OFFSET}$," similar to system 1200, control 320 asserts signal SLEW ENABLE 1112 and selects SLEW=$+F_{OFFSET}$. Similar to system 1100, the output 1252 of adder 1120 becomes $VCXO_{CONTROL}=C_3 \cdot F_{LOW}+F_{OFFSET}$, where delay element 1132 preserves the low frequency offset $F_{LOW}$ of filter 1110.

Then at 1334, "Update Correlation," system 1300 updates the correlation values stored in correlation buffer 314, similar to the previously discussed operation of 1326. The values of INT(i) generated during the most recent segment sync period are updated. Controller 320 searches correlation buffer 314 to locate updated $P_0$, $P_1$, and $P_2$ falling within the search window created by the existing $R_0$, $R_1$, and $R_2$. As illustrated in FIG. 41, correlation filter 1134 receives the updated correlation buffer 314 output and provides the updated low pass filtered INT(i) to CWF 1102. CWF 1102 then calculates an updated $CWF_{OUT}$. System 1300 proceeds to 1336.

At 1336, "$P_0>3P_1$," a negative result occurs when $P_0 \leq 3P_1$, and system 1300 continues in the VCXO slew control loop by returning to 1332. This forms a loop to incrementally adjust $VCXO_{CONTROL}$. A positive result occurs at 1336 when $P_0>3P_1$, and hence system 1300 departs from the VCXO slew control loop and system 1300 returns to 1322.

At 1338, "CWF$_{OUT}$," after a positive result at 1330, controller 320 sets slew control signal 1112 to pass CWF$_{OUT}$ through switch 1104 and zero through switch 1106. CWF$_{OUT}$ is passed through filter 1110. Adder 1130 forms the output VCXO$_{CONTROL}$=C$_3$[(C$_1$+C$_2$)CWF$_{OUT}$+F$_{LOW}$] where, as previously discussed, F$_{LOW}$ is the value stored in delay element 1132. System 1338 then proceeds to 1340.

At 1340, "Update Correlation," system 1250 updates the correlation values stored in correlation buffer 314 as previously described. Controller 320 searches correlation buffer 314 for updated values of P$_0$, P$_1$, and P$_2$ in the previously defined regions R$_0$, R$_1$, and R$_2$. Delay element 1132 updates F$_{LOW}$=CWF$_{OUT}$C$_1$+F$_{LOW}$. System 1300 then returns to 1322. In some embodiments, one or more of decision blocks 1312, 1318, 1322, 1328, 1330, and 1336 may have some type of confidence counter that is used to condition the decision transitions.

Figure 43:
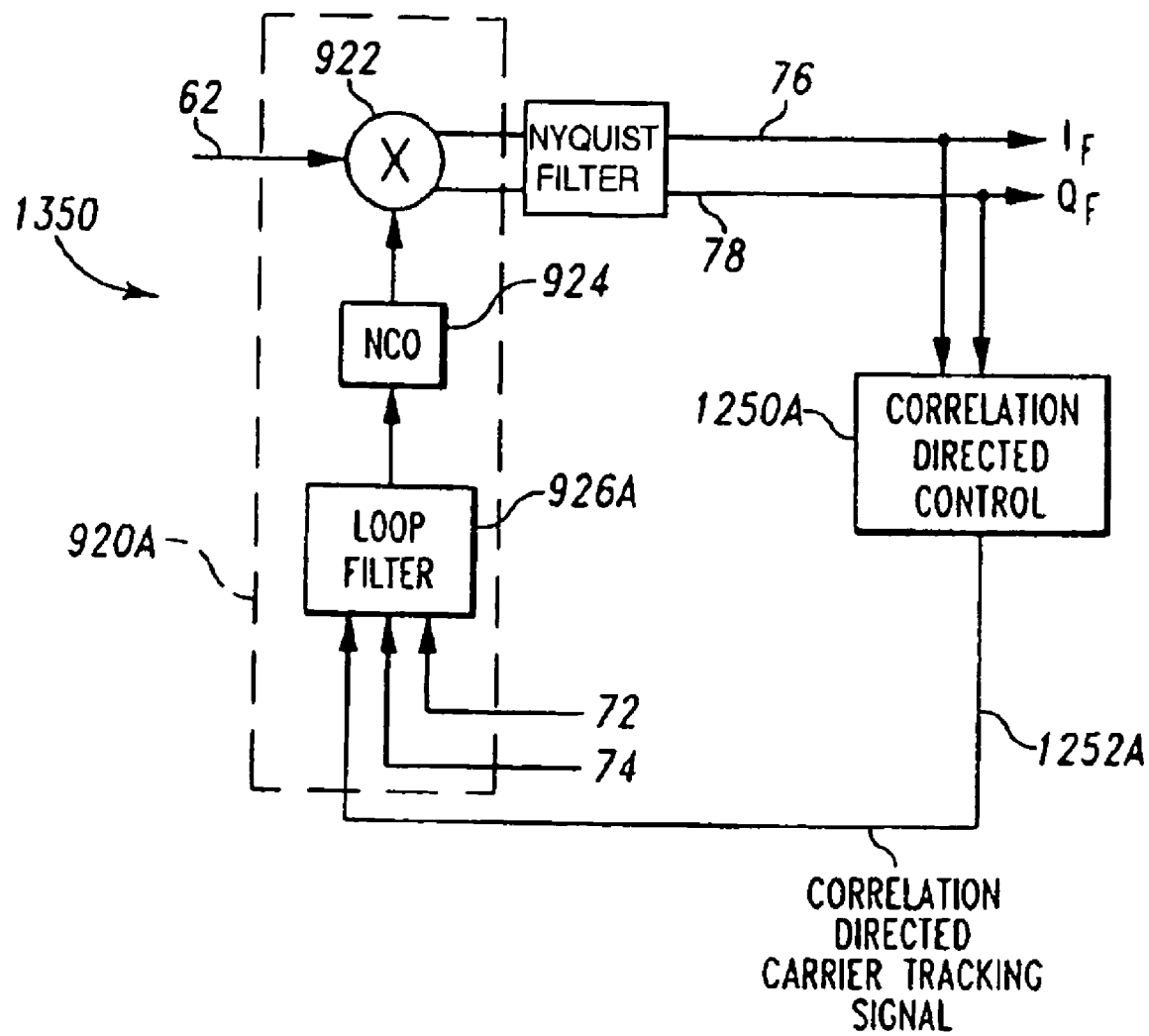
FIG. 43 is a block diagram of an embodiment of a segment sync based correlation directed carrier tracking feedback loop.

As illustrated in FIG. 43, yet another embodiment of system 20 includes a correlation directed carrier tracking system 1350. Correlation directed carrier tracking system 1350 includes demodulator 920A and correlation directed control 1250A. The demodulator 920A is similar in form and function to demodulator 920 of system 900; however, loop filter 926 is replaced by loop filter 926A. As will be explained later, loop filter 926A further includes a third feedback control input 1252A for receiving a correlation directed tracking signal. Correlation directed control 1250A is similar in form and function to correlation directed control 1250; however, similar to CDEU 230B of FIG. 13, CDC 1250A is adapted to correlate both I$_F$ 76 and Q$_F$ 78 with a segment sync sequence.

Demodulator 920A receives digitized near baseband signal 62 and provides the signals I$_F$ 76 and Q$_F$ 78 as outputs to CDC 1250A. Demodulator 920A also receives non-coherent carrier tracking feedback signal 72 and decision directed carrier tracking feedback signal 74. In addition, the demodulator 920A further receives correlation directed carrier tracking signal 1252A from CDC 1250A.

Figure 44:
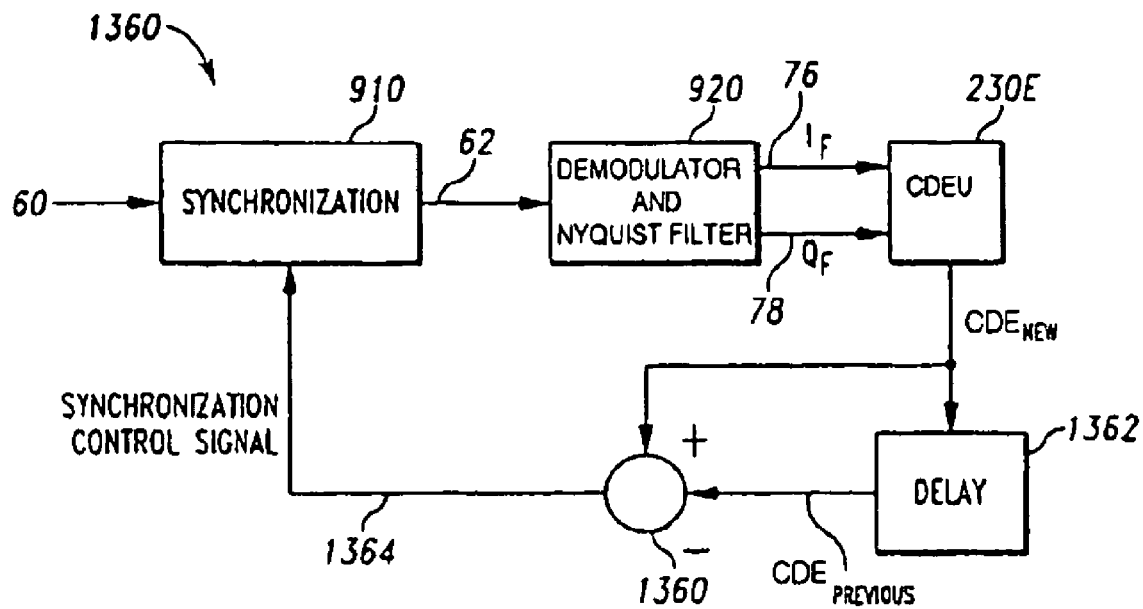
FIG. 44 is a block diagram of an embodiment of a channel delay directed synchronization feedback loop.

As illustrated in FIG. 44, another embodiment of system 20 includes a channel delay directed control system 1360, which includes synchronization 910, demodulator 920, CDEU 230E, subtractor 1360, and delay 1362.

The CIR directed control system 1360 receives an analog near baseband signal 60 at synchronization 910. Synchronization 920 digitizes the analog near baseband signal 60, and provides a digitized near baseband signal 62 to demodulator 920. Demodulator 390 demodulates the digitized near baseband signal 62, and provides I$_F$ 76 and Q$_F$ 78 as inputs to CDEU 230E. CDEU 230E operates on I$_F$ 76 and Q$_F$ 78 to calculate an updated channel delay estimate, CDE$_{NEW}$. CDEU 230E then provides CDE$_{NEW}$ as an input to delay 1362 and the positive input of subtractor 1360. Delay 1362 provides the previously calculated value of channel delay estimate, CDE$_{PREVIOUS}$, as an output to the negating input of subtractor 1360. Synchronization 40 receives synchronization control signal 1364 from subtractor 1360.

Similar to previous embodiments of CDEU 230, CDEU 230E estimates the channel impulse response of a transmission channel by detecting the correlation strength and delay of the ghost signals received at the input of CDEU 230E. Some embodiments of CDEU 230E are similar in form and in function to the previously described embodiments of CDEU 230. Illustratively, some embodiments of CDEU 230E are adapted to estimate the channel delay in an ATSC broadcast system by detecting the correlation strength of received ghost signal frame sync sequence, PN511. Likewise, other embodiments of CDEU 230E are similar to embodiments of CDEU 230 that estimate the channel delay based upon the correlation of the segment sync. However, CDEU 230E is adapted to provide continuously updated channel delay estimates. Illustratively, while some embodiments of CDEU 230 provide a single channel delay estimate, used to set up and adapt an overlapped equalizer, embodiments of CDEU 230E provide continuous channel delay estimate updates. Some embodiments of CDEU 230E provide an updated channel delay estimate every frame or field sync period. Other embodiments, which estimate the channel delay based on the receipt of segment sync sequences, provide an updated channel delay estimate after a desired number of segment sync periods. In addition, still other embodiments provide an updated channel delay estimate every segment sync period.

In some embodiments delay 1362 is a latch or register used to store the previously calculated channel delay estimate provided by CDEU 230E. Subtractor 1360 produces synchronization control signal 1364 by subtracting CDE$_{PREVIOUS}$ from CDE$_{NEW}$. The synchronization control signal 1364 represents a change of the channel delay estimate due to movement in the virtual center. Synchronization 910 receives synchronization control signal 1364 and controls the clock frequency used to sample the analog near baseband signal 60. This adjusts the relative delay introduced in the equalizer of system 20, and compensates for movement in the virtual center.

It will be understood that the lengths of the quadrature and transform filter implementations are optimized for the total feedback loop response. Illustratively, in embodiments where the transform filter performing the 90-degree rotation is a Hilbert filter that operates on the received in-phase signal, the length of the Hilbert filter will be adjusted to optimize the phase tracker loop response. Similarly, the resolution of the Hilbert transform can be optimized for hardware complexity and necessary accuracy. Likewise, the phase error integrator 812 can be optimized to balance the need for smoother and more accurate phase error information and the phase tracker bandwidth.

Alternatively, in some embodiments having a fractionally-spaced equalizer, the point at which the data is down sampled prior to the equalizer decision device can be moved to provide greater control loop bandwidth. As illustrated in FIG. 29, in some embodiments of system 900 the carrier tracking post filter 944 receives fractionally spaced samples from FFE 210 prior to down sampling. Decision device 212 effectively down samples the received data by sampling equalizer output signal 88 on a symbol timing basis. In still other embodiments, where the fractionally spaced FFE samples are not related by a n:1 integer relationship, the input to the equalizer decision device is sample rate converted to the appropriate sample rate. It will be understood that some embodiments employ similar techniques to the decision directed phase tracker and decision directed synchronization feedback loops. Additionally, certain embodiments employ a sample rate converter to down sample the output of the fractionally spaced FFE and perform the phase tracker function.

It will be understood that the techniques and devices herein described can also be applied to the modulation techniques having any one-dimensional constellation. Thus, the present invention includes embodiments modified to work with data constellations that have multiple levels. Similarly, the techniques and devices herein described can be applied to the modulation of VSB or Offset QAM, for Offset QAM modulation (where the simple 90-degree phase shift is enough to convert the Offset QAM baseband complex signal into a VSB baseband like real only signal).

Still further, any of the systems and/or methods described herein may be applicable to any broadcast standard. For example, the systems and methods herein are usable with signals compliant with the ATSC standards specified in the following document: "ATSC Digital Television Standard", ATSC Doc. A/53, Sep. 16, 1995.

Alternatively, by way of example, and not by limitation, any of the systems and/or methods described herein are/may be usable with signals compliant with the standards specified in the following document (hereinafter referred to as the "ADTB-T standard"): Zhang, W, et. al. "An Advanced Digital Television Broadcasting System," Supplement to Proceedings 7th International Symposium on Broadcasting Technology, 2001.

It will be understood that in some embodiments, the equalizer acts upon in-phase and quadrature data. Similarly, whereas the embodiments and figures herein show the FFE of the equalizer placed in the baseband region of receiver, other embodiments of the receiver place the FFE in the passband, or IF, region. Illustratively, in some embodiments, the FFE of the equalizer is placed between the synchronization and demodulator components of the system.

Variations in the implementation of the invention will occur to those of skill in the art. Illustratively, some or all of the generation and calculation of signals can be performed by application-specific and/or general-purpose integrated circuits, and/or by discrete components, and/or in software. All publications, prior applications, and other documents cited herein are hereby incorporated by reference in their entirety as if each had been individually incorporated by reference and fully set forth.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

We claim:

1. A method of controlling a feedforward filter that receives a signal resulting from the transmission of a series of symbols through a channel wherein the series of symbols includes a predetermined sequence of symbols, the method comprising the steps of:
    developing a plurality of samples from the received signal wherein a sequence of samples corresponds to the predetermined sequence of symbols;
    estimating a channel impulse response of the channel from the plurality of samples, wherein the channel impulse response estimate is represented by a plurality of correlation values;
    calculating a channel delay by detecting a correlation strength between correlation values of the plurality of correlation values; and
    synchronizing the feed forward filter based upon the calculated channel delay.

2. The method of claim 1, wherein the synchronizing step comprises the step of determining a temporal location of the sequence of samples corresponding to the predetermined sequence of symbols at an output of the feedforward Filter.

3. The method of claim 1 wherein, the predetermined sequence of symbols comprises a synchronization sequence.

4. The method of claim 3 wherein, the synchronization sequence is an ATSC segment synchronization sequence.

5. The method of claim 1, wherein the estimating step includes the step of integrating a plurality of channel impulse response estimates.

6. The method of claim 1, wherein the synchronization is further based on a centroid of the correlation values.

7. The method of claim 1, wherein die calculating step includes the step of selecting a portion of the correlation values having magnitudes that are greater than a predetermined threshold.

8. The method of claim 7, wherein the calculating step includes the further step of determining a centroid of the selected portion of the correlation values.

9. The method of claim 1, wherein the estimating step includes the step of storing correlation values in a buffer representing the estimate of the channel impulse response.

10. The method of claim 1, wherein the developed samples have real and imaginary components and wherein the estimating step includes the step of deriving the channel impulse response using a first correlation buffer and a second correlation buffer, wherein contents of the first correlation buffer are derived from the real components of the developed samples and contents of the second correlation buffer are derived from the imaginary components of the developed samples.

11. The method of claim 10, wherein the estimating step includes the further step of combining the contents of the first correlation buffer and the contents of the second correlation buffer to derive correlation values representing the estimate of the channel impulse response.

12. The method of claim 11, wherein the estimating step includes the further step of storing the derived correlation values in a third buffer.

13. An apparatus for controlling a feedforward filter of an equalizer that receives a signal resulting from the transmission of a series of symbols through a channel wherein the series of symbols includes a predetermined sequence of symbols, comprising:
    means for developing a plurality of samples from the received symbols wherein a sequence of samples corresponds to the predetermined sequence of symbols, comprising;
        means for estimating a channel impulse response from the plurality of samples wherein the channel impulse response estimate is represented by a plurality of correlation values;
        means for calculating channel delay by detecting a correlation strength between correlation values of the plurality of correlation values; and
    means for synchronizing the feedforward filter in accordance with the calculated channel delay.

14. The apparatus of claim 13, wherein the synchronizing means includes means for determining the temporal location of the sequence of samples corresponding to the predetermined sequence of symbols at an output of the feedforward filter.

15. The apparatus of claim 13, wherein the predetermined sequence of symbols comprises a synchronization sequence.

16. The apparatus of claim 15, wherein the synchronization sequence is an ATSC compliant synchronization sequence.

17. The apparatus of claim 13, wherein at least some of the samples have a non-zero imaginary component.

18. The apparatus of claim 13, wherein the synchronization is further based on a centroid of the correlation values.

19. A computer-readable medium for controlling a feedforward filter that receives a signal resulting from the transmission of a series of symbols through a channel, wherein the series of symbols includes a predetermined sequence of symbols having stored executable instructions for implementing:
    a first routine for developing a plurality of samples from received symbols, wherein a sequence of samples corresponds to the predetermined sequence of symbols;

a second routine for estimating a channel impulse response from the plurality of samples wherein the channel impulse response estimate is represented by a plurality of correlation values;

a third routine for calculating a channel delay by detecting a correlation strength between correlation values of the plurality of correlation values; and a fourth routine for synchronizing the feedforward filter in accordance with the calculated channel delay.

20. The computer-readable medium of claim 19, wherein the synchronizing routine includes a routine for determining the temporal location of the sequence of samples corresponding to the predetermined sequence of symbols at an output of the feedforward filter.

21. The computer-readable medium of claim 19, wherein the predetermined sequence of symbols comprises a synchronization sequence.

22. The computer-readable medium of claim 21, wherein the synchronization sequence is an ATSC compliant synchronization sequence.

23. The computer-readable medium of claim 19, wherein at least some of die samples have a non-zero imaginary component.

24. The computer-readable medium of claim 19, wherein the synchronization is further based on a centroid of the correlation values.

* * * * *